US011109706B2

(12) United States Patent
Dumenil

(10) Patent No.: US 11,109,706 B2
(45) Date of Patent: Sep. 7, 2021

(54) COOKING AND/OR MIXING DEVICE

(71) Applicant: Waco Pacific Ltd., Shatin (HK)

(72) Inventor: Malcolm Dumenil, Tai Po (HK)

(73) Assignee: Waco Pacific Ltd., Shatin (HK)

( * ) Notice: Subject to any disclaimer, the term of this patent is extended or adjusted under 35 U.S.C. 154(b) by 430 days.

(21) Appl. No.: 16/085,404

(22) PCT Filed: Mar. 17, 2017

(86) PCT No.: PCT/CN2017/077153
§ 371 (c)(1),
(2) Date: Sep. 14, 2018

(87) PCT Pub. No.: WO2017/157340
PCT Pub. Date: Sep. 21, 2017

(65) Prior Publication Data
US 2019/0082877 A1    Mar. 21, 2019

(30) Foreign Application Priority Data

Mar. 17, 2016  (AU) ................................ 2016901011
Mar. 17, 2016  (HK) ................................ 16103156.6
Aug. 29, 2016  (HK) ................................ 16110272.0

(51) Int. Cl.
*A47J 27/00*    (2006.01)
*A47J 43/046*   (2006.01)
*H05B 6/10*     (2006.01)
*H05B 6/12*     (2006.01)

(52) U.S. Cl.
CPC .......... *A47J 27/004* (2013.01); *A47J 43/046* (2013.01); *H05B 6/105* (2013.01); *H05B 6/1209* (2013.01)

(58) Field of Classification Search
CPC .............................. A47J 27/004; A47J 43/046
See application file for complete search history.

(56) References Cited

U.S. PATENT DOCUMENTS

| 1,545,675 A | 7/1925 | Madsen et al. |
| 4,989,580 A | 2/1991 | Dunham |
| 5,386,102 A | 1/1995 | Takikawa et al. |

(Continued)

FOREIGN PATENT DOCUMENTS

| CN | 201422742 Y | 6/2009 |
| CN | 201360960 Y | 12/2009 |

(Continued)

OTHER PUBLICATIONS

Patent Cooperation Treaty: International Search Report of International Application No. PCT/CN2017/077153, dated Jul. 3, 2017.

*Primary Examiner* — Elizabeth Insler
(74) *Attorney, Agent, or Firm* — Leydig, Voit & Mayer Ltd.; John Augustyn

(57) ABSTRACT

A motorized induction cooking device has a housing including a top surface for supporting a variety of vessels used for chopping, blending, mixing, or heating beverages and food. The top surface has an opening A non-magnetic rotational spindle is rotationally mounted on the housing and below the opening and coupled to a motor. An induction coil is located within the housing and adjacent the top surface. The induction coil includes a winding surrounding the opening and has a central aperture through which the spindle is accessible.

9 Claims, 63 Drawing Sheets

(56) References Cited

U.S. PATENT DOCUMENTS

| | | | |
|---|---|---|---|
| 5,512,733 A * | 4/1996 | Takikawa | H05B 6/062 219/620 |
| 6,805,312 B2 * | 10/2004 | Capp | A47J 27/004 241/199.12 |
| 2002/0027175 A1 | 3/2002 | Capp | |
| 2007/0221068 A1 | 9/2007 | Boussemart et al. | |
| 2008/0257170 A1 | 10/2008 | Ho et al. | |
| 2010/0116820 A1 | 5/2010 | Pan et al. | |
| 2010/0326284 A1 | 12/2010 | Volz et al. | |
| 2012/0160110 A1 | 6/2012 | Gürsel | |
| 2012/0168432 A1 | 7/2012 | Liu | |
| 2013/0001220 A1 | 1/2013 | Alet Vidal et al. | |
| 2013/0153566 A1 | 6/2013 | Gulkanat | |
| 2014/0203010 A1 | 7/2014 | Alet Vidal et al. | |
| 2015/0312969 A1 | 10/2015 | Hazir et al. | |
| 2016/0324359 A1 | 11/2016 | Aboujassoum et al. | |
| 2017/0071413 A1 | 3/2017 | Park | |
| 2017/0367529 A1 | 12/2017 | Metz et al. | |
| 2018/0125280 A1 | 5/2018 | Yaman et al. | |
| 2018/0333004 A1 | 11/2018 | De'Longhi et al. | |

FOREIGN PATENT DOCUMENTS

| | | |
|---|---|---|
| CN | 201422742 Y | 3/2010 |
| CN | 205458189 U | 1/2016 |
| CN | 207940797 U | 10/2018 |
| CN | 208725556 U | 4/2019 |
| CN | 109864547 A | 6/2019 |
| DE | 9401578 U1 | 5/1994 |
| EP | 0634127 A1 | 1/1995 |
| EP | 0759279 A1 | 2/1997 |
| EP | 1669013 B1 | 9/2008 |
| EP | 3510905 A1 | 7/2019 |
| ES | 2319085 B1 | 3/2010 |
| GB | 2466336 A | 6/2010 |
| JP | 2011-86521 A | 4/2011 |
| JP | 2012-10720 A | 1/2012 |
| TW | M359169 | 6/2009 |
| WO | WO 2006/131688 A2 | 12/2006 |
| WO | WO 2014/075923 A1 | 5/2014 |
| WO | WO 2015/100709 A1 | 7/2015 |
| WO | WO 2016/181208 A1 | 11/2016 |
| WO | WO 2018/100387 A1 | 6/2018 |
| WO | WO 2019/000016 A1 | 1/2019 |

* cited by examiner

Dough Mixing

Blending

Single Cup

Juice Extracting

Ice-Cream Making

Coffee and Spice Grinding

Chop, Stir and Induction Cooking
5 L Capacity

Chop, Stir and Induction Cooking
3 L Capacity

Motorized Induction Stir frying

Induction Stove Top

Baking Skillet

Baking Skillet

Multi - Purpose Oven

Multi - Purpose Oven

Multi - Purpose Oven

Contact Grilling

Contact Grilling

Induction Wave Roasting

Induction Wave Baking

Induction Stove Top Cooking

Induction Stove Top - Skillet

Grilling

Chop, Stir and Induction Cooking
2 L Capacity

Induction Stir Frying

Chop, Stir and Induction Cooking

Blending

Grilling

COOKING AND/OR MIXING DEVICE

FIELD OF THE INVENTION

The present invention relates to a cooking or mixing device, or more particularly to a motorized induction device. The invention also relates to vessels or apparatus for use with such a cooking device.

BACKGROUND TO THE INVENTION

Induction cooking heats a cooking vessel by magnetic induction instead of by thermal conduction from a flame, or an electrical heating element. The cooking vessel may be made of, or contain, a ferromagnetic metal such as cast iron or stainless steel. An induction cooker comprising a coil of copper wire is placed under the cooking vessel and an alternating electric current is passed through the coil. The resulting oscillating magnetic field induces a magnetic flux which repeatedly magnetises the ferromagnetic metal of the vessel. This produces large eddy currents in the vessel which because of resistance heats the vessel directly. Because inductive heating directly heats the vessel very rapid increases in temperature can be achieved. Alternatively, a ferromagnetic plate can be used between the coil and a non-ferromagnetic vessel to act like a hot plate.

SUMMARY OF THE INVENTION

According to one aspect of the invention there is provided a motorized induction cooking device having a housing comprising a top surface that in use supports the variety of vessels used for chopping, blending, mixing or heating beverages and food. The top surface has an opening in the top surface. A non-magnetic rotational spindle is rotationally mounted with the housing and below the opening and coupled to a driving means. An induction coil is provided within the housing and adjacent the top surface. The induction coil comprises a winding about the opening and has a central aperture through which the spindle is accommodated.

According to another aspect of the invention there is provided a vessel including a rotatable paddle engageable with and driven by the motorized spindle when the vessel is mounted on the motorized induction cooking device.

According to another aspect of the invention there is provided an adapter plate including an adapter coupling for adapting the upper surface of the motorized induction cooking device for accommodating one or more of a variety of chopping, blending, mixing or stirring vessels.

According to another aspect of the invention there is provided a non-electric induction oven accessory having a convection fan engageable with and driven by the motorized spindle when the oven accessory is mounted on the motorized induction cooking device.

According to another aspect of the invention there is provided a non-electric induction deep fryer accessory having a convection fan engageable with and driven by the motorized spindle when the oven accessory is mounted on the motorized induction cooking device. In some embodiments the deep fryer accessory has overflow reservoirs.

According to another aspect of the invention there is provided a method of operating a motorized induction cooking device to alternately or simultaneously operate a motorized spindle and an induction coil according to a predetermined operational mode.

Other aspects of the invention are set out in the appended claims.

Further aspect of the invention will become apparent from the following description and drawings which are given by way of example only to illustrate the invention.

BRIEF DESCRIPTION OF THE DRAWINGS

Various aspects and embodiments of the invention are shown in the accompanying drawings, in which.

DETAILED DESCRIPTION OF PREFERRED EMBODIMENTS OF THE INVENTION

Various aspects and embodiments of the invention will now be described to illustrate the invention. The terminology used is for illustrative purposes only and is not intended to limit the scope and/or use of the invention unless the context clearly requires otherwise. In this description references to mixing or stirring or chopping and like terminology are interchangeable unless the context clearly requires otherwise. Likewise, references to a vessel or bowl or similar container, or to a blade or paddle or similar device are interchangeable unless the context clearly requires otherwise. That is to say, the rotating spindle of the device can operate a blender or mixer or food processor or similar food preparation accessory and reference to one or other such accessory is not intended to limit the scope of use or functionality of the invention.

The cooking device using induction cooking as set out in PCT application PCT/IB2016/000609 filed 9 May 2016 and claiming priority from Hong Kong short term applications 15104388.5 filed on 8 May 2015 and 15106371.9 filed on 3 Jul. 2015 is included herein and forms part of this disclosure.

Figure 1:
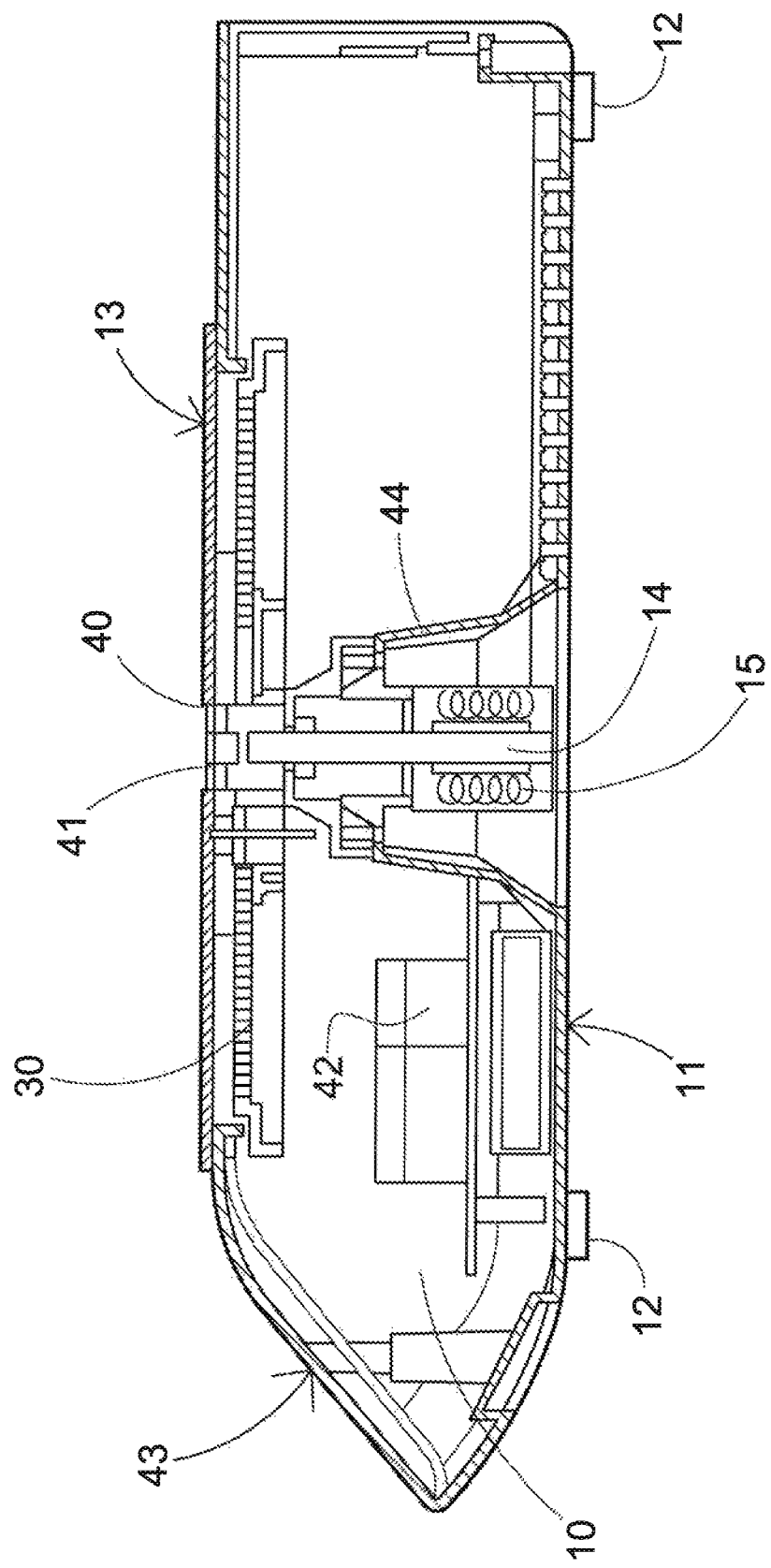
FIG. 1 is a sectional side view of an embodiment of a motorized induction device according to the invention.

FIG. 1 shows an exemplary embodiment of the motorized induction heating (cooking) device 10 of the present invention. The device 10 can be used for chopping, blending, mixing and/or heating beverage or food items in a variety of vessels. A vessel used for heating is made of, or contains, a ferromagnetic metal such as cast iron or stainless steel that may be directly heated by magnetic induction.

The motorized induction cooking device 10 comprises a housing comprising base member 11 with feet 12 for supporting the base member on a work surface, and a top surface 13 that in use supports the variety of vessels used for chopping, blending, mixing or heating beverages and food. The top surface 13 may be made of a suitable non-ferromagnetic material such as glass or ceramic and has an opening 40 in the top surface 13. A non-magnetic rotational spindle 14 is rotationally mounted with the housing and below the opening 40. At a first, top, end of the spindle is a drive coupler 41 located concentrically within the opening 40. The drive coupler 41 is rotatable by the spindle 14. At the second, opposite, end of the spindle 14 is a driving means 15, such as motor. The driving means 15 may be mounted in a support frame 44 located within the housing, and optionally, the support frame may be covered or lined with a conductive shielding material to surround the motor. The driving motor 15 may also be spaced apart from the non-magnetic rotational spindle 14 by at least 25 mm. The motor 15 is rotationally coupled to and therefore drives the non-magnetic rotational spindle 14 to produce a rotational movement of the drive coupler 41.

A first induction coil 30 is provided within the housing and adjacent the lower surface of top surface 13. The induction coil 30 comprises a winding about the opening 40 in surface 13 and has a central aperture through which the spindle 14 and drive coupler 41 are accommodated. An alternating electric current when passed through the first induction coil 30 results in a first oscillating magnetic field adapted to induce a magnetic flux in a ferromagnetic vessel supported on the top 13.

The motor 15 and induction coil 30 are operated by one or more controllers 42 located within the device housing. A user interface panel 43 provides user inputs for manipulating the operation of the motor 15 and induction coil 30 either to a selected or pre-programmed operating mode. In the case of the motor, operation may be by a pulse width modulation (PWM) controller for controlling the on-off state of the motor and its speed. The induction coil 30 is controlled via a control system set out in aforementioned PCT application PCT/IB2016/000609. The skilled addressee will understand that in a heating- or cooking-only mode of operation a ferromagnetic induction cooking vessel may be placed on top of the top heating surface 13 of the housing and can be inductively heated via operation of the induction coil 30.

Figure 2:
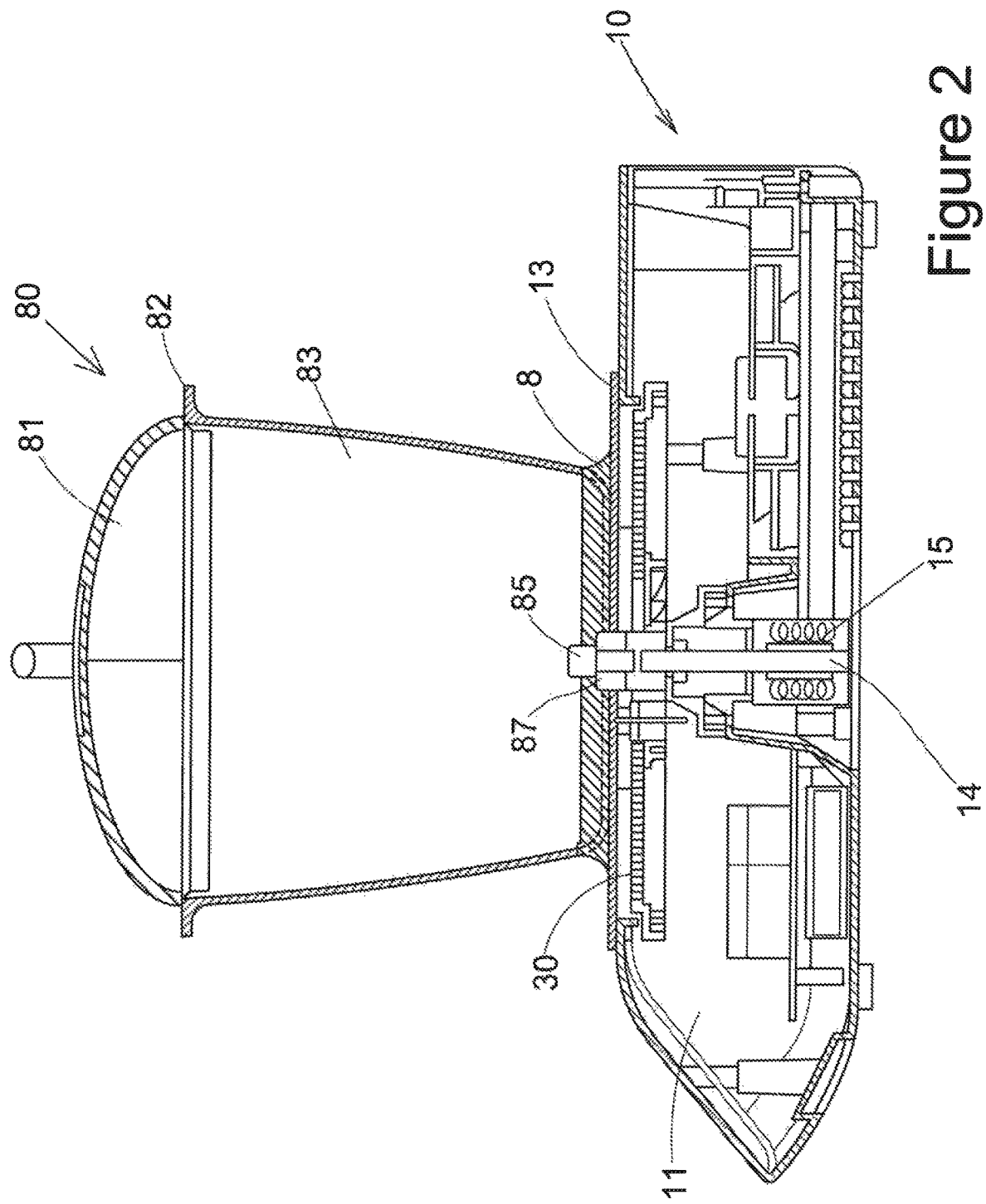
FIG. 2 is a sectional side view of an embodiment of a motorized induction device according to the invention.

FIG. 2 illustrates a separate element of an adapter assembly 8 disposed on the upper surface 13 of the motorized induction device 10 to be adapted to connect with the non-magnetic rotational spindle 14 for receiving a vessel having a chopping, blending, mixing or stirring blade. The adapter assembly 8, more particularly shown in FIG. 4b, has a support plate 45 having a lower surface 46 adapted to rest on the upper surface 13 of the cooking device 10, and an upper surface 47 adapted to support a vessel having a chopping, blending, mixing or stirring blade. Centrally supported in the adapter plate 45 is an adapter coupling 48. A protecting lower end 50 of the adapter coupling 48 is provided to matingly engage with the drive coupler 41 of the spindle 14. The upper end of adapter coupling 48 is provided with a clutch coupler 49 for engaging with a clutch coupling of the chopping, blending, mixing or stirring vessel. The components of the adapter 8 are preferably made of a non-ferromagnetic material. As will become evident later the upper vessel support surface 47 of the adapter 8, and the clutch coupler 49 may take any one of a number of forms adapted to suit the type of chopping, blending, mixing or stirring vessel to be used—for example see the various embodiments in FIGS. 7 through 17. The chopping, blending, mixing or stirring vessel, such a vessel 80, contains a rotational boss 85 coupled to a clutch coupling or a rotator 87 to allow for rotational mating with the adapter clutch coupler 49. The adapter assembly 8 not only provides support to the vessel 80, it is also coupled to the rotator 87 when the vessel 80 is received, and in turn rotationally connected with the spindle 14 of the motorized induction device 10. The driving member 15 would then be able to drive and rotate the rotational boss 85 within the vessel 80. A chopping, blending, mixing stirring paddle or a blade assembly, for example the chopper blade 1500 (FIG. 4), can be provided on the shaft in order to stir or blend the food items in the vessel.

FIG. 2 illustrates a motorized induction device 10 in combination with a vessel 80 made of, or containing, a ferromagnetic metal such as cast iron or stainless steel. Quite often the case, in order to optimize processing of food items, dual functions of heating and mixing are preferred to take place at the same time.

The vessel 80 comprises a base portion 83 and a lid portion 81 with a handle 82. The base portion 83 of the vessel 80 includes a ferromagnetic metal base portion which rests on the top surface 13 and is heated by the first induction coil 30. The vessel 80 also includes a rotational shaft which, when used in combination with the motorized induction device 10, would enhance the food processing. In order to facilitate more even heating and cooking for food items in the vessel the lid portion 81 of the vessel is made of a ferromagnetic metal which is indirectly heated by convection from the base portion 83 of the vessel 80. Diametrically opposite portions of the side walls 84 of the vessel base portion 83 are made of, or contain, a ferromagnetic metal such as cast iron or stainless steel such that the side walls are also indirectly heated by convection from the base portion 83 of the vessel 80.

Figure 5:
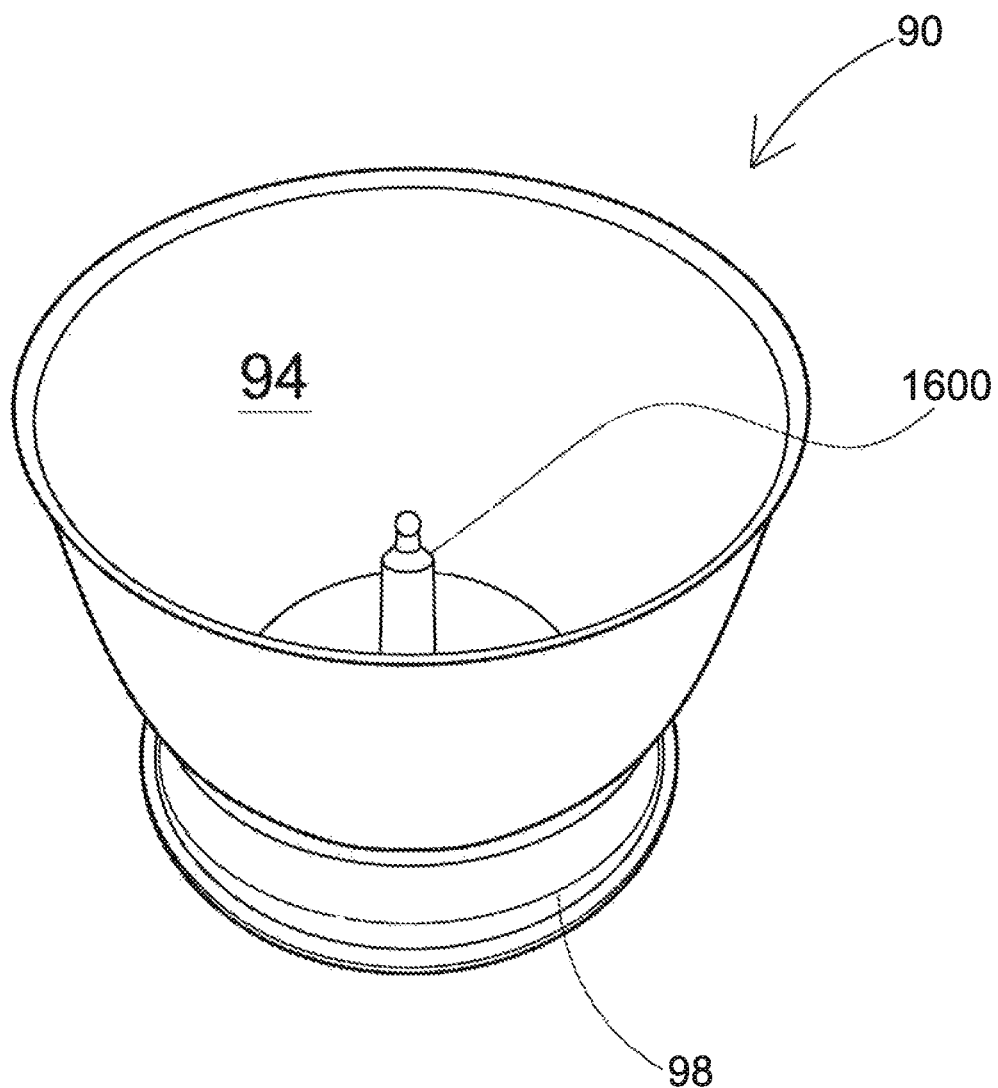
FIG. 5 is a perspective view of an embodiment of a vessel for use with a motorized induction device.

FIGS. 2 and 5 show two embodiments of the vessel 80, 90. In order to allow for mixing and heating, the vessel 80, 90 is required to include a rotational boss 85 coupled to a rotator 87 to allow for rotational motion. A separate element of adapter assembly 8, 98 has rotational means (not shown) rotationally to-be-coupled with the rotator of the vessel 80, 90 drives the rotator of the vessel 80, 90 to produce a rotational motion when the rotational means of the adapter assembly is driven by an external driver, and thereby transmits the rotational motion to the rotational boss 85 upon receipt of the vessel 80, 90. In addition, the adapter assembly 8, 98 provides support to the vessel 80, 90 when in use. A stirrer or a blade assembly can be provided on the shaft in order to stir or blend the food items in the vessel.

Figure 3:
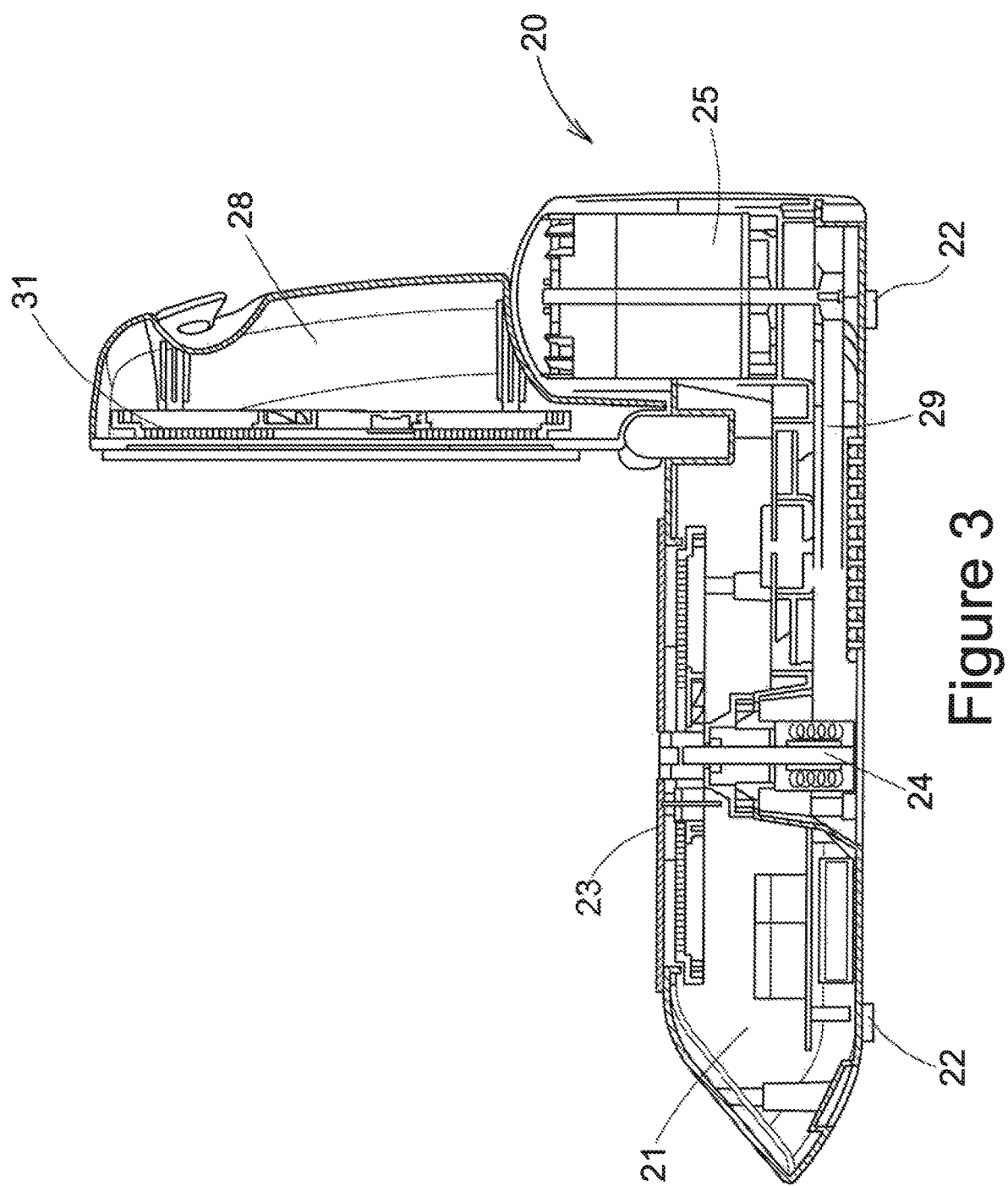
FIG. 3 is a sectional side view of an embodiment of a motorized induction device according to the invention.

In a second embodiment of the motorized induction device 20 as shown in FIG. 3, a side member 28 extends upwardly from adjacent side of the base member 21, and orthogonally to the base member 21. A second induction coil 31 is located in the first side member 28 and, upon passing an alternating electric current through the second coil 31, produces a second magnetic field having a second field direction parallel to the base member 21. The second field direction is orthogonal to the first field direction. When in use, the side member 28 is adjacent to a side of the vessel 80 supported on the base member 21.

The motorized induction device 20 comprises a base member 21 with feet 22 for supporting the base member on a work surface, and a top 23 that in use supports a vessel. The top 23 may be made of a suitable non-ferromagnetic material such as glass or ceramic. A non-magnetic rotational spindle 24 and a driving member 25, such as motor, are provided in the base member 21 of the motorized induction device 20. The driving member 25 is rotationally coupled to and therefore drives the non-magnetic rotational spindle 24 to produce a rotational movement. The driving member 25 is spaced apart from the non-magnetic rotational spindle 24 and preferably by at least 25 mm. In one embodiment the motor may be concentric with the spindle but sufficiently below the induction coil so as to be outside of its effect. In a second embodiment the motor may be to one side of the induction coil. The non-magnetic rotational spindle 24 communicably connected to the motor/driving member 25 via a belt 29 and thereby driven by the driving member 25.

Figure 4:
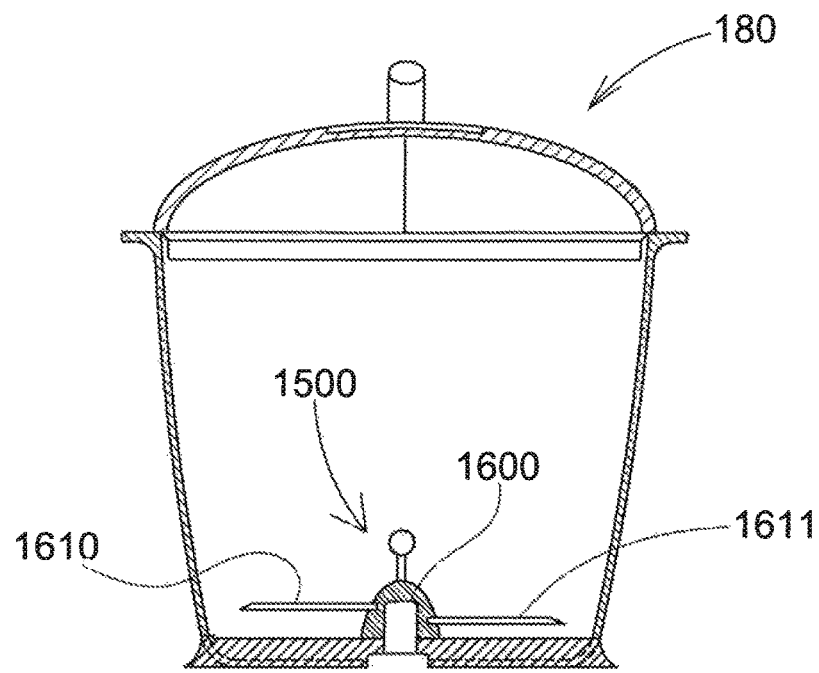
FIG. 4 is a sectional side view of one embodiment of a vessel.
Figure 4A:
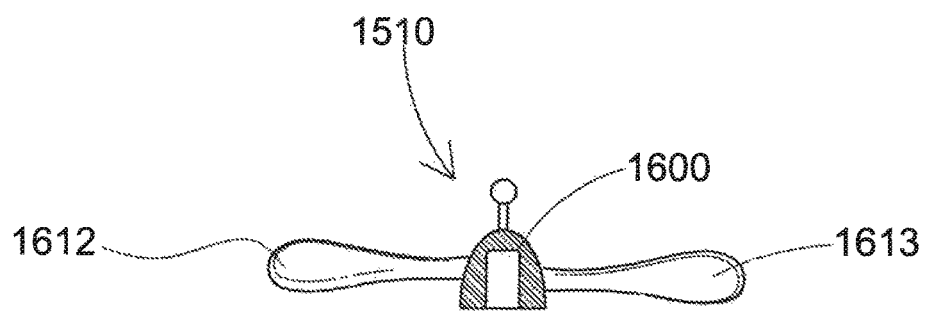
FIG. 4*a* illustrates a set of stirring paddles for the vessel of FIG. 4.
Figure 4B:
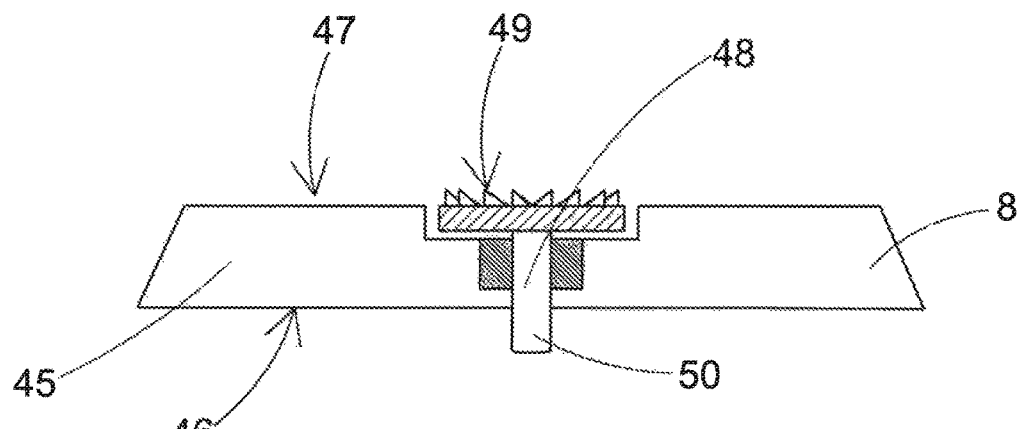
FIG. 4*b* illustrates an adapter assembly for a vessel.

FIG. 4 further illustrates an embodiment of a vessel 180 according to the invention having a first chopper blade 1500 for chopping, blending or pureeing the contents of the vessel 180. The first chopper blade includes a hub member 1600 removably engageable with the rotational boss in the vessel base. A pair of chopper blades 1610 and 1611 extended diametrically opposite each other from the hub member 1600. In a preferred embodiment the pair of blades may be offset from one another laterally such that they occupy different levels within the vessel for more consistent chopping of items in the vessel. In use, food items to make, for example a soup, may be loaded into the vessel mounted in combination with the motorized induction device 10 and the first chopper blade 1500. An operation mode of the motorized induction device 10 engages operation of the spindle at a first speed such that the chopper blade 1500 is rotated to cause chopping or pureeing the contents of the vessel 180. After a predetermined or present chopping time the chopper blade 1500 is stopped. A user can then interchange the chopper blade 1500 for a second set of stirring paddles 1510. A second mode of the motorized induction device 10 is initiated in which the induction coils are energised to heat the vessel. In combination with energising the induction coils to heat the vessel the motorized induction device 10 also engages operation of the spindle at a second speed to rotate the stirring paddles 1510 for stirring or mixing the contents of the vessel while it is heated. The spindle may be engaged continuously or intermittently by a preset or predetermined operating sequence for continuously or intermittently stirring or mixing the contents of the vessel. The speed of operating time of the spindle may be varied or determined by the operating power of the induction coils. This embodiment of the motorized induction device 10 and vessel are further illustrated in at least FIGS. 14 and 15.

Figure 6:
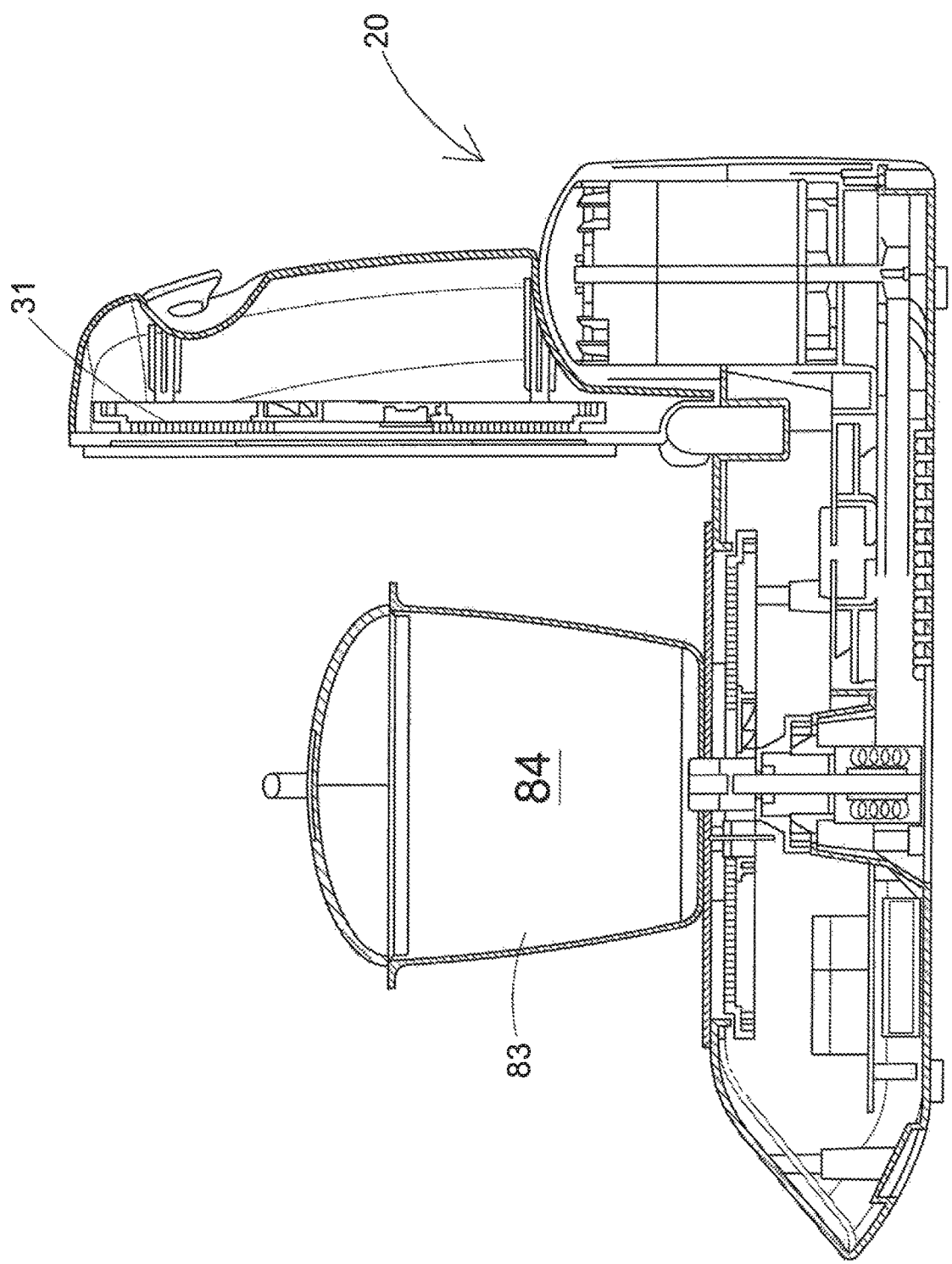
FIG. 6 is a sectional view of an embodiment of the motorized induction device of FIG. 3 in combination with one embodiment of a vessel.
Figure 7:
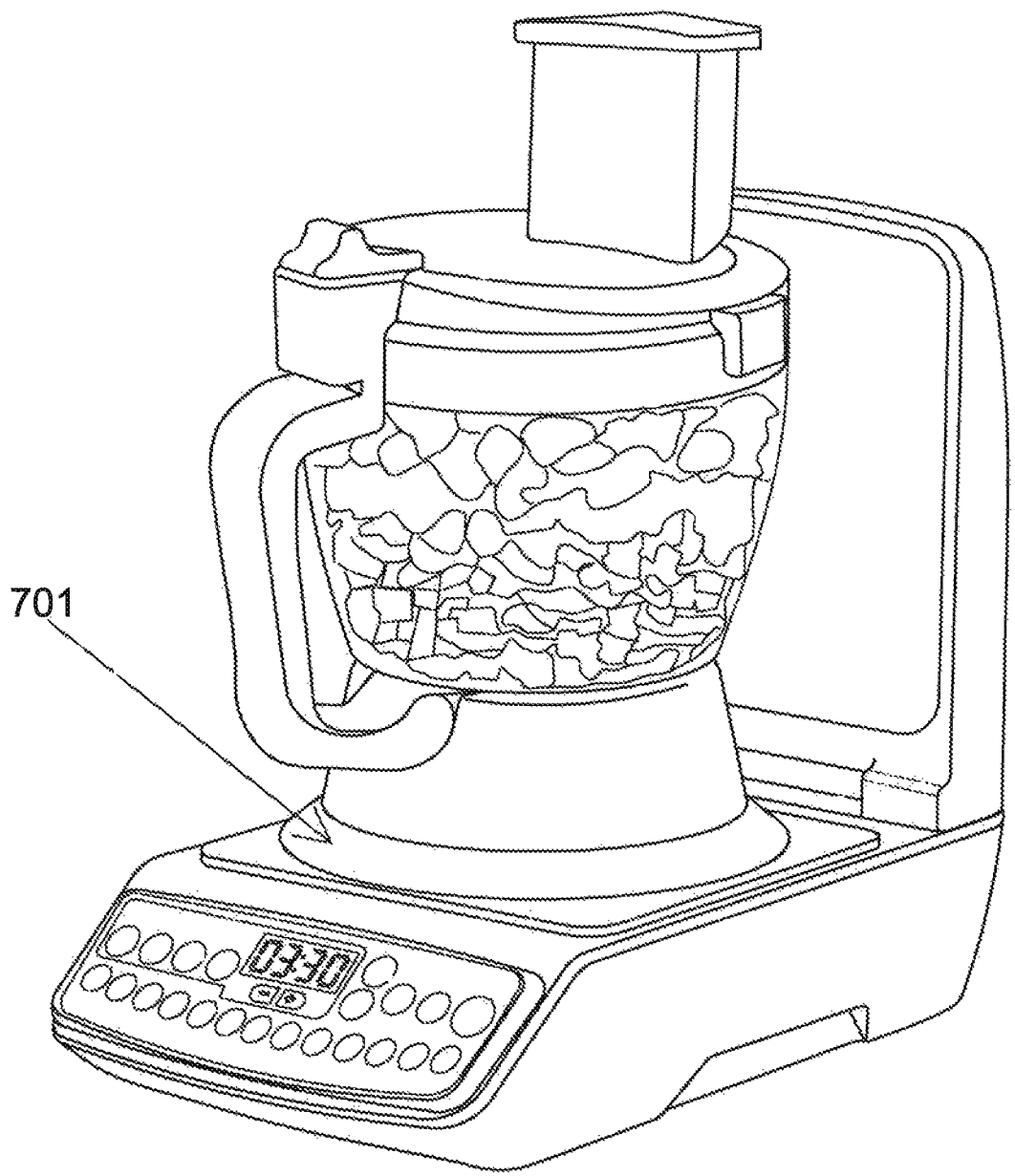
FIGS. 7, 8, 9, 10, 11, 12, 13, 14, 15, 16, 16*a*, 17, 18, 19, 20, 20*a*, 21, 22, 23, 24, and 25 illustrate various uses of a motorized induction device according to the invention in combination with various blender or mixer or food processor or similar food preparation accessories.
Figure 8:
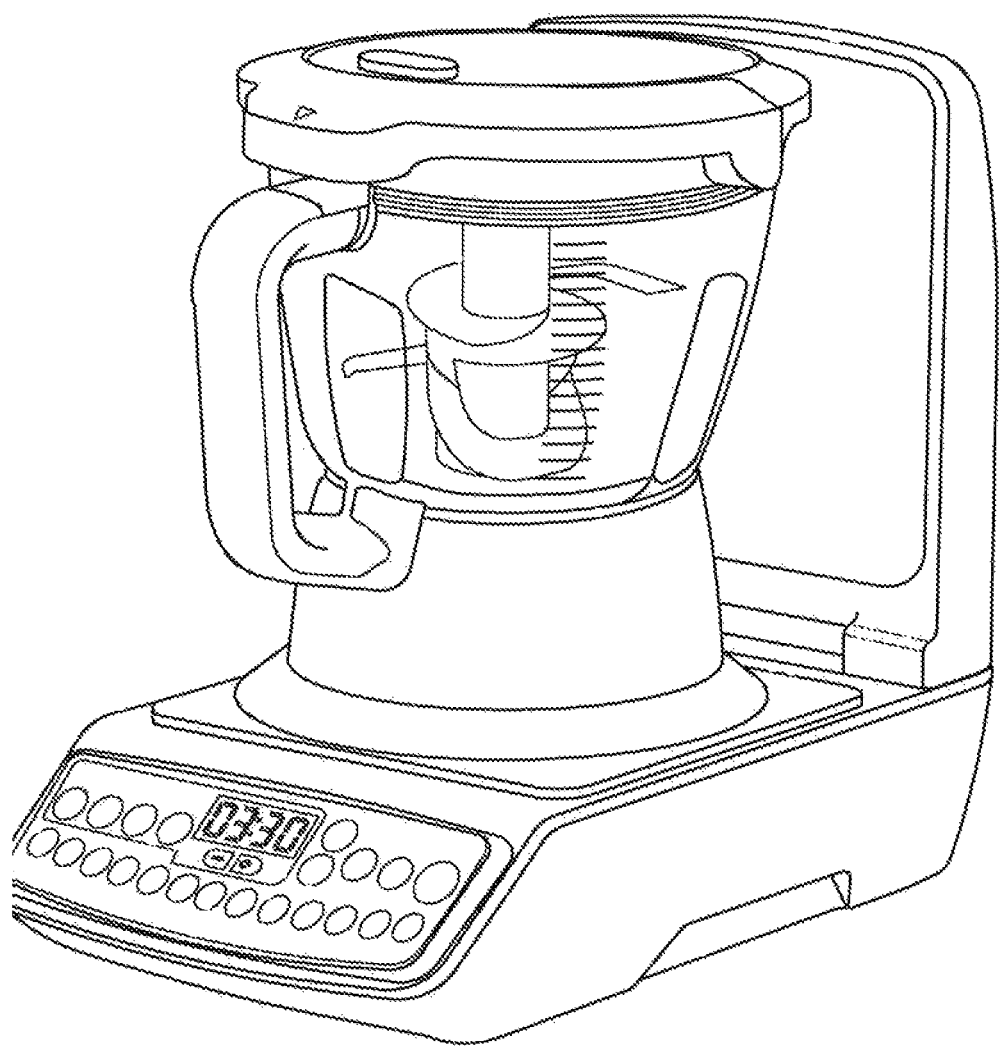
Figure 9:
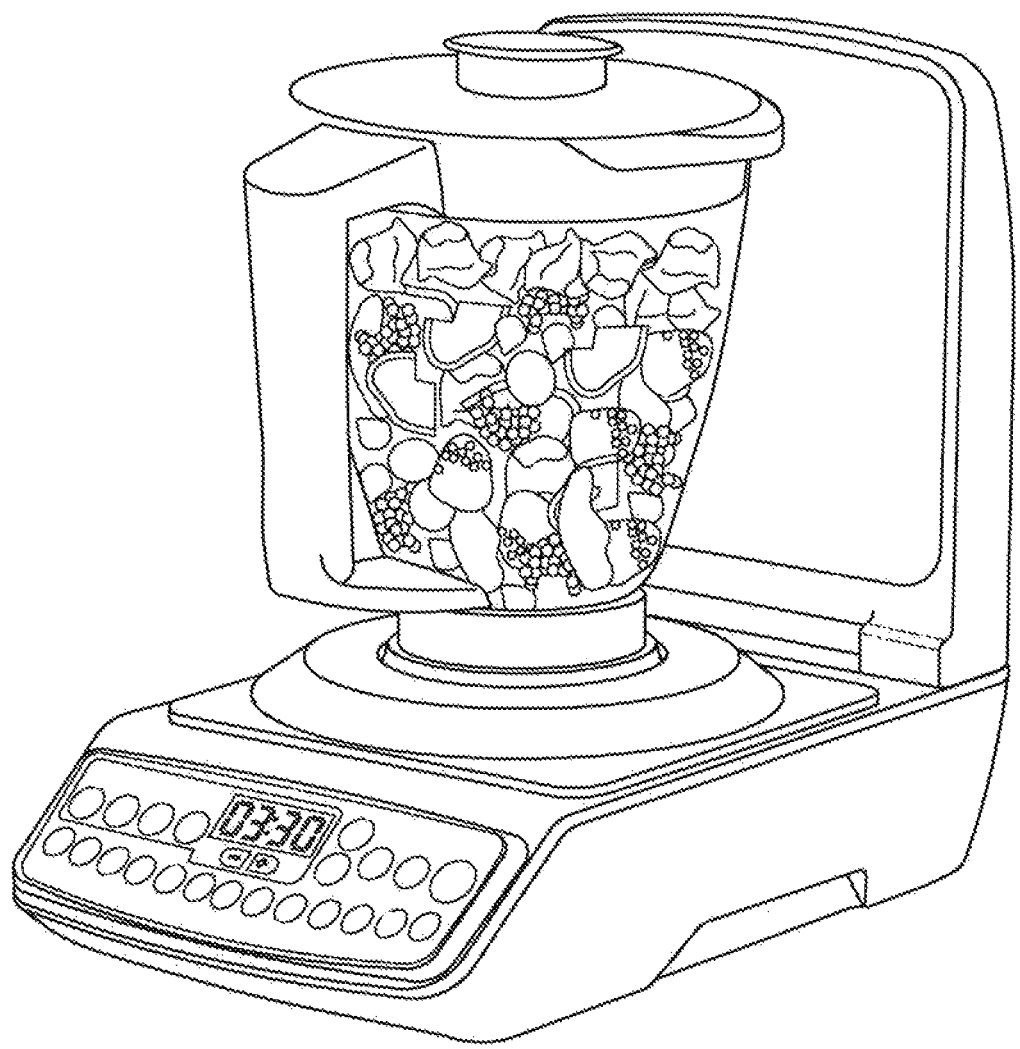
Figure 10:
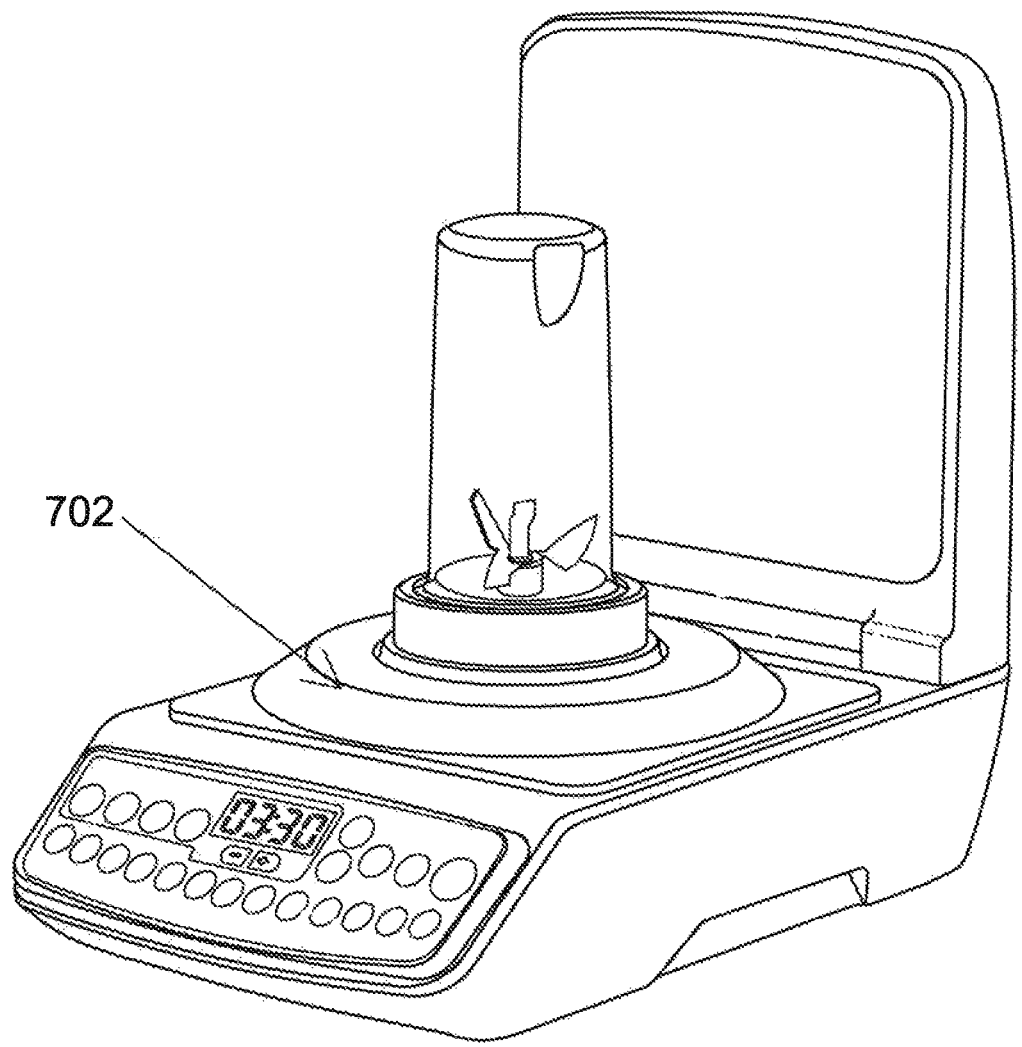
Figure 11:
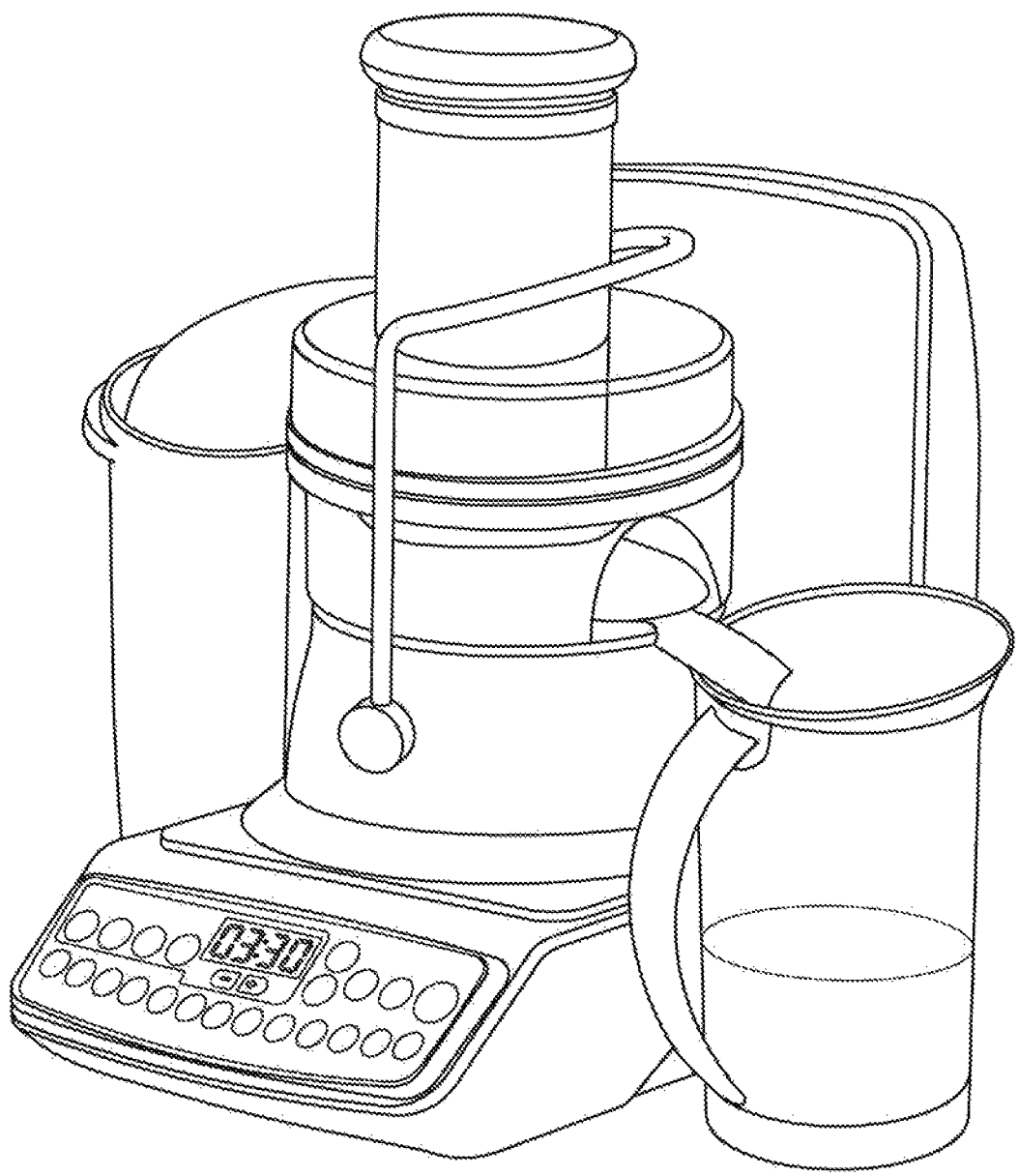
Figure 12:
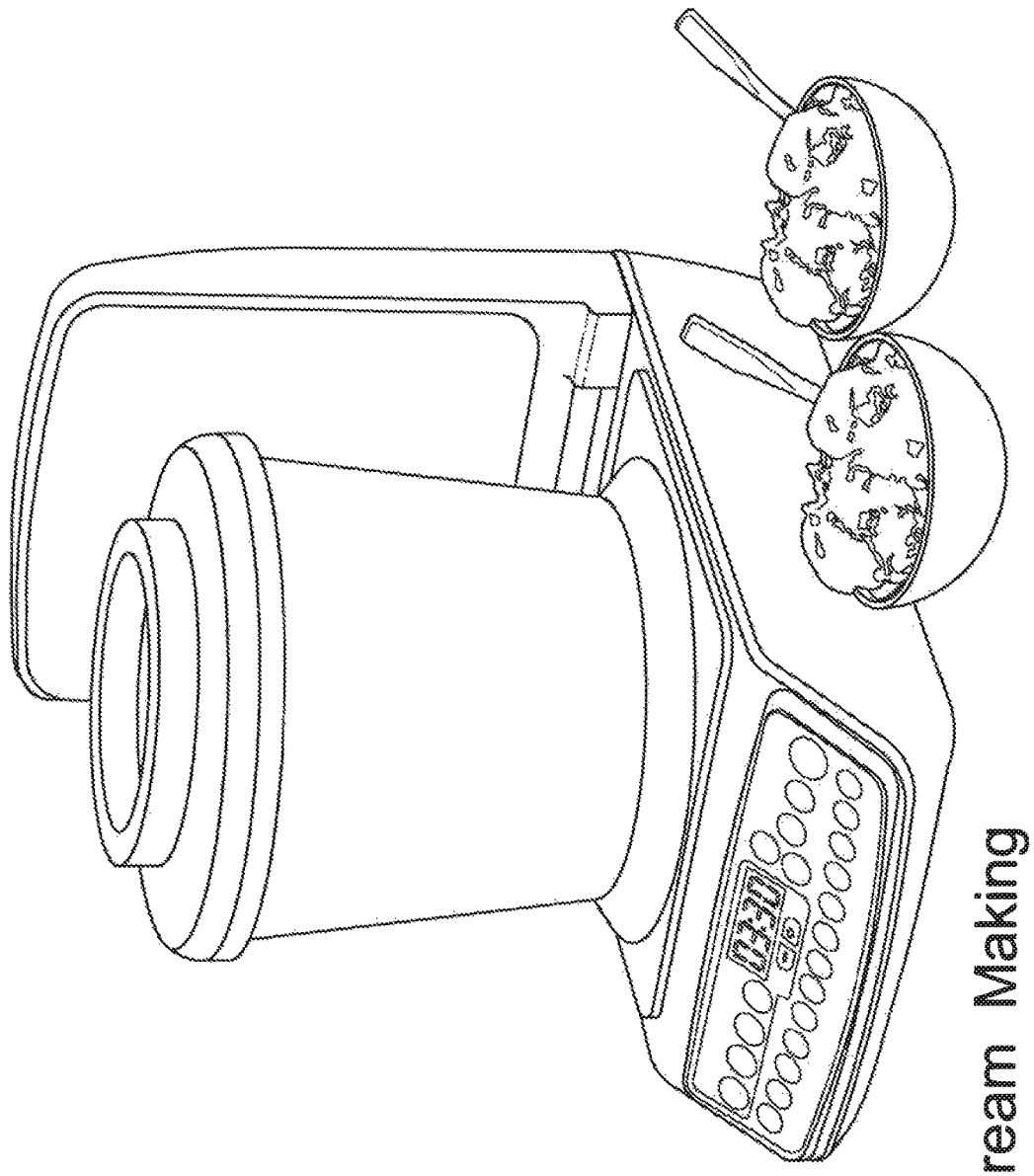
Figure 13:
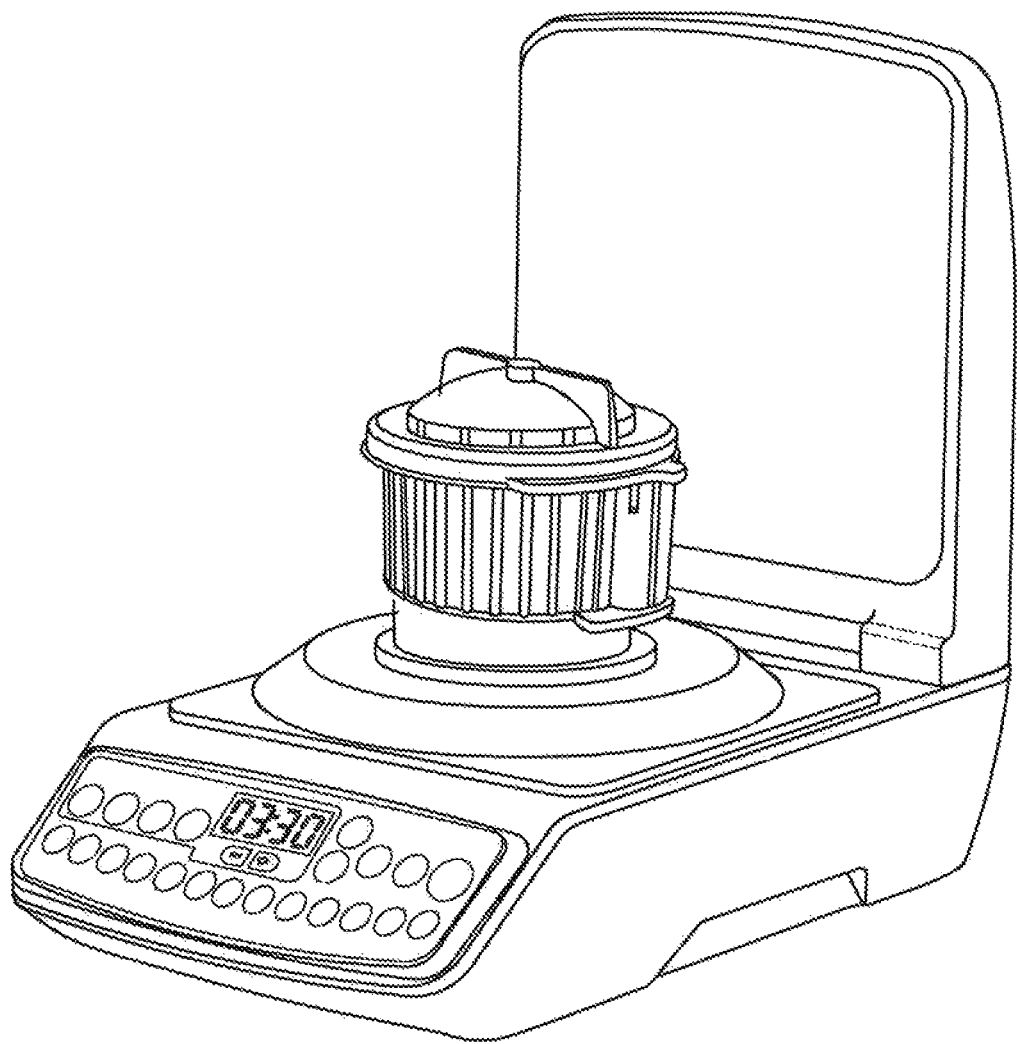
Figure 14:
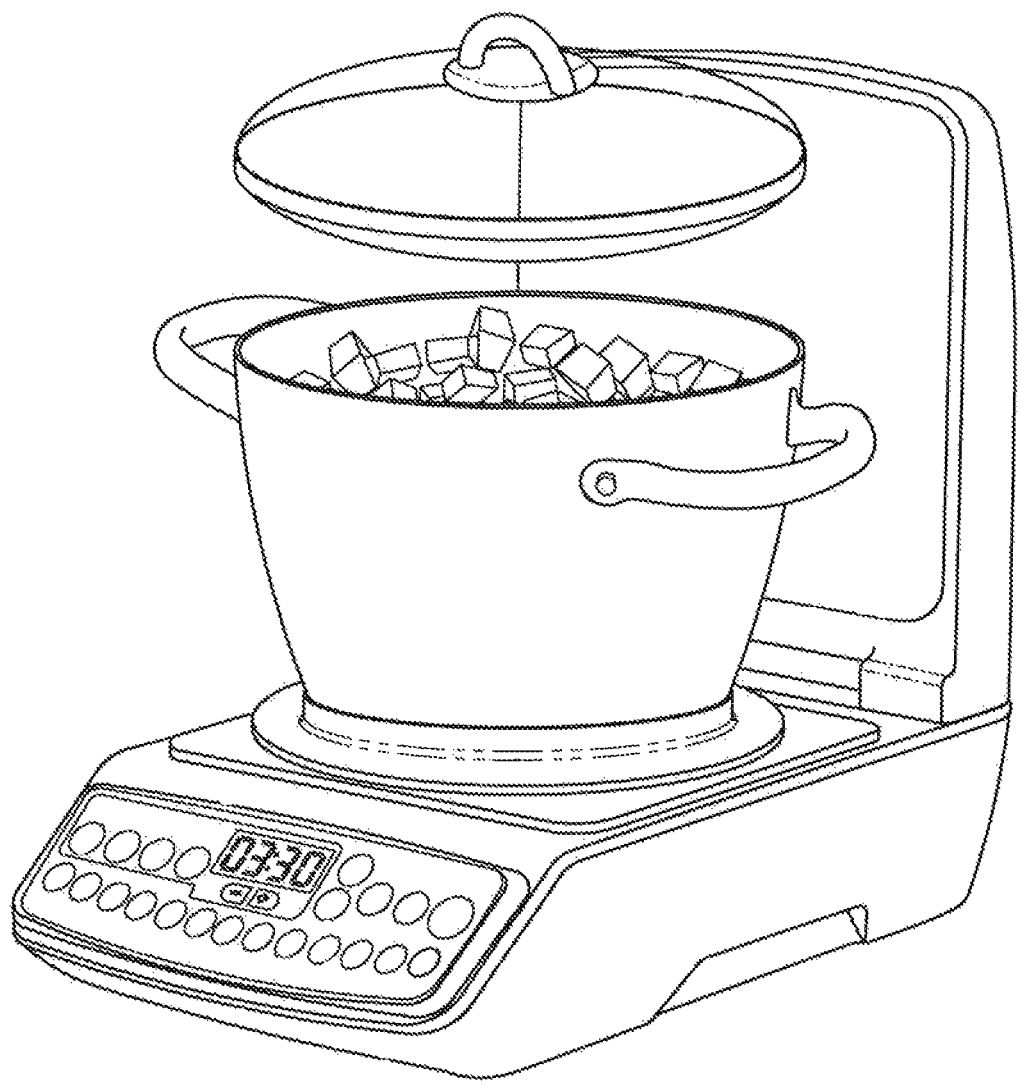
Figure 15:
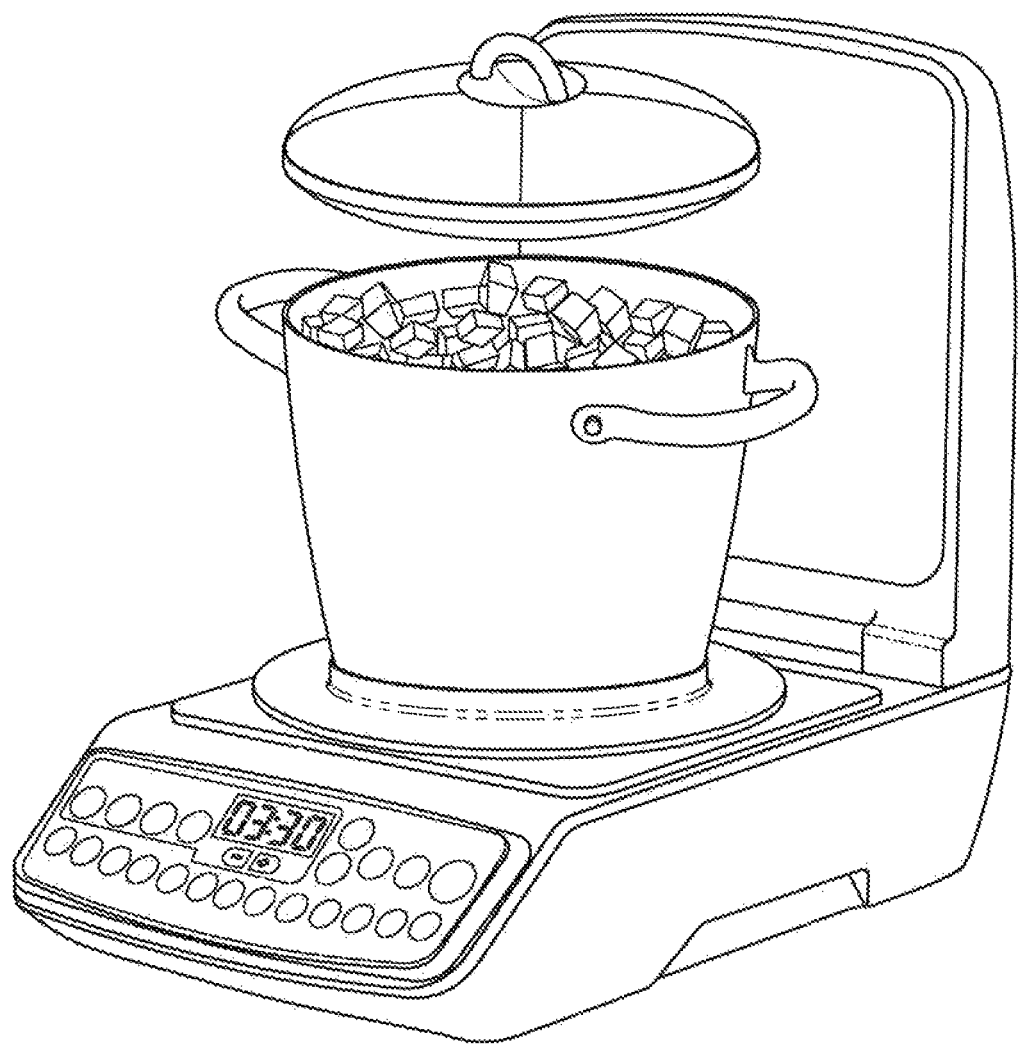

FIG. 6 shows a second embodiment of the motorized induction device 20 in combination with a vessel made of, or containing, a ferromagnetic metal such as cast iron or stainless steel. Diametrically opposite portions of the side walls 84 of the vessel base portion 83 are made of, or contain, a ferromagnetic metal such as cast iron or stainless steel such that the side walls 84 are directly heated by the second induction coil 31 in the side of the motorized induction device 20.

Figure 16:
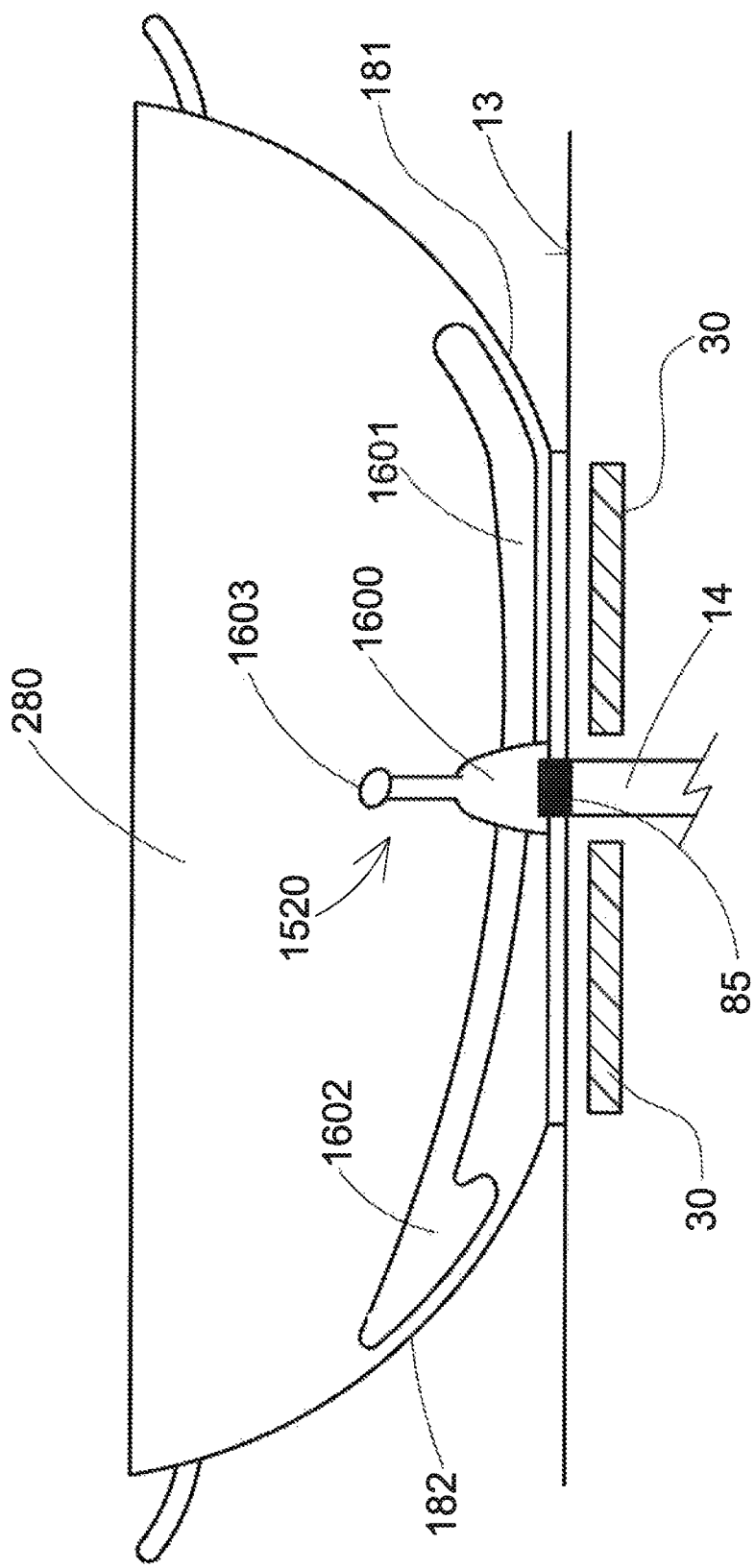

FIG. 16 illustrates another embodiment of the vessel 280 in the form of a wok for sautéing or stir flying vegetable, meats and the like. The third sautéing paddle 1520 includes a hub member 1600 removably engageable with the rotational boss 85 in the vessel base. A pair of sautéing paddles 1601 and 1602 extended diametrically opposite each other from the hub member 1600. In a preferred embodiment the pair of sautéing paddles may be offset from one another laterally such that they occupy different levels within the vessel for more consistent turning of items in the vessel. One blade, say 1601, may be positioned lower for turning food items from the lower bottom part of the vessel and a second blade, say 1602, may be positioned higher for turning food items higher in the vessel. One or more of the blades may also have a portion extending close to a wall 181, 182 of the vessel for moving food items near the edge of the vessel inwardly toward the centre of the vessel.

Figure 16A:
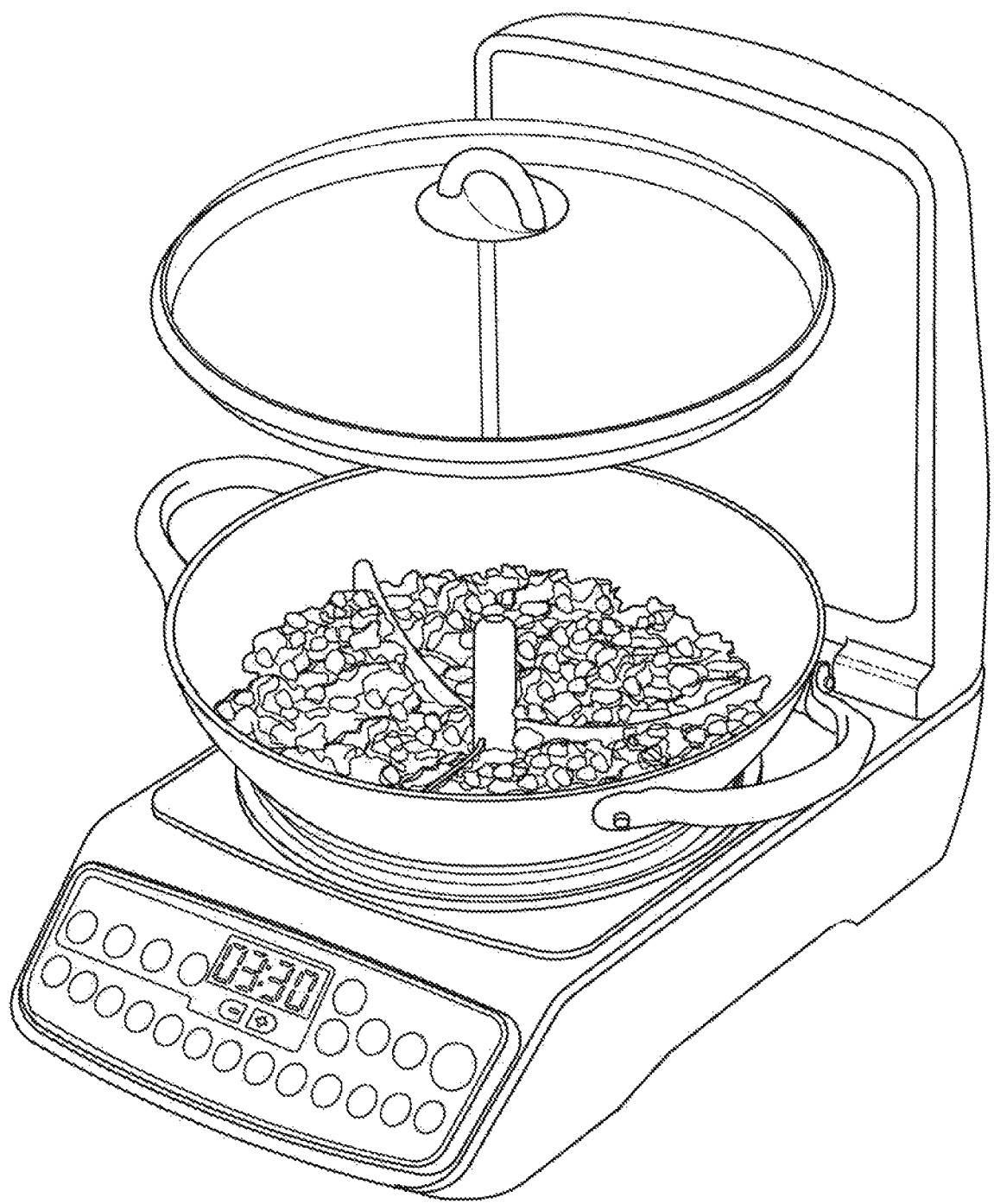
Figure 17:
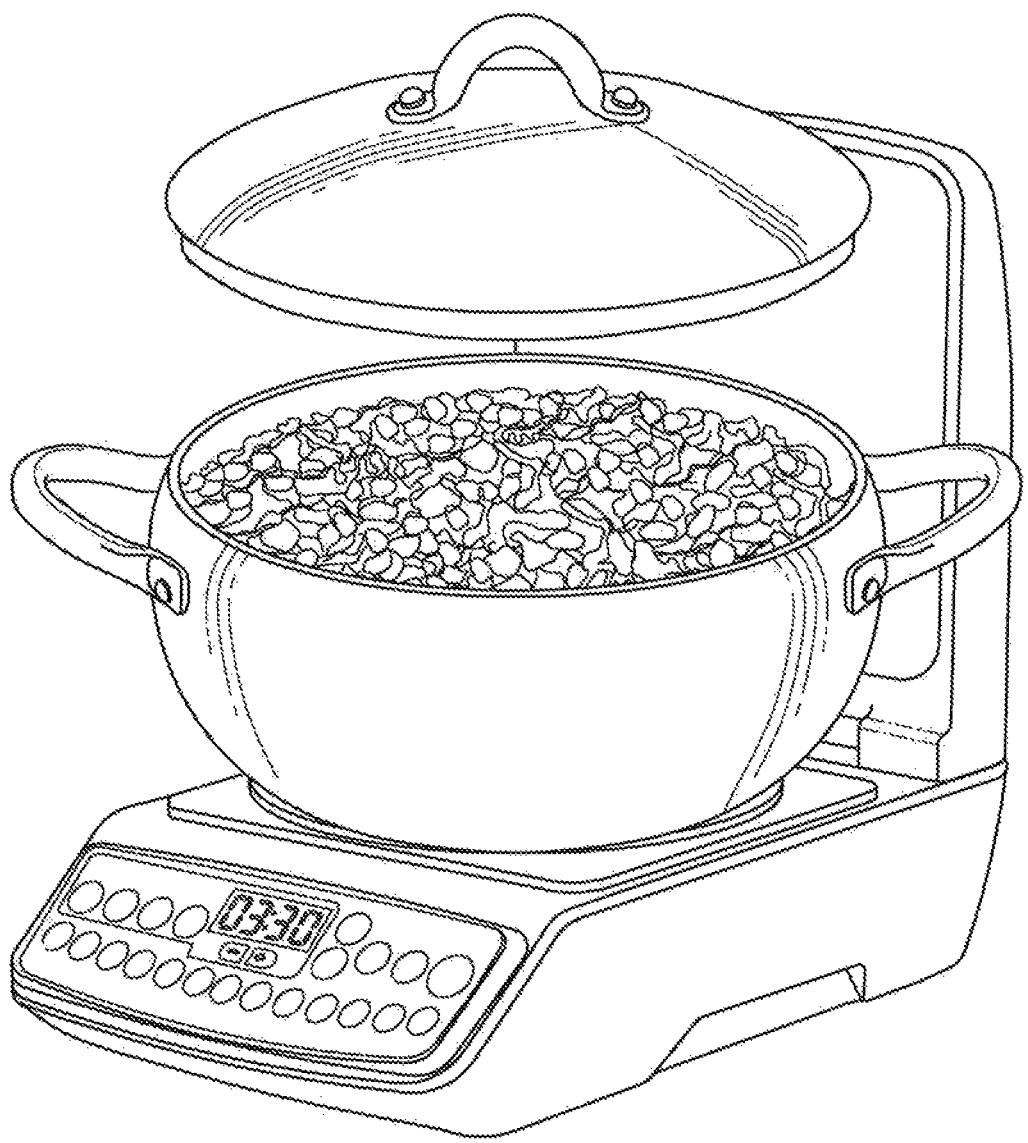
Figure 18:
Figure 19:
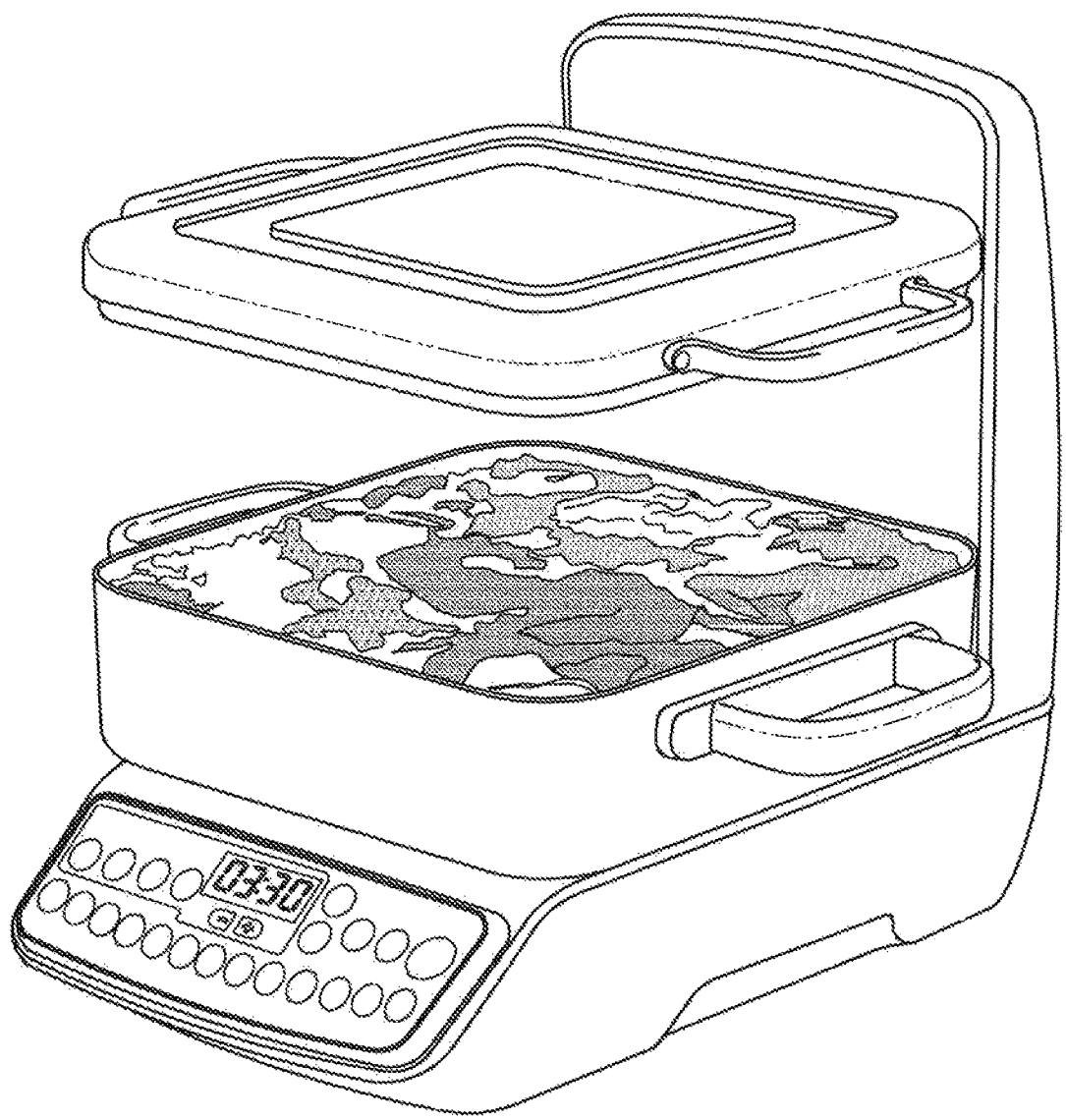

In combination with energising the induction coils to heat the vessel 280 the motorized induction device 10 also engages operation of the spindle 14 at a speed to rotate the sautéing paddles 1601 and 1602 for turning the contents of the vessel while it is heated. The spindle may be engaged continuously or intermittently by a preset or predetermined operating sequence for continuously or intermittently turning the contents of the vessel. For example the sautéing paddles 1601 and 1602 may be operated for 10-second and stopped for 10-second, or any other suitable le combinations of time. The speed of operating time of the spindle may be varied or determined by the operating power of the induction coils. This embodiment of the motorized induction device 10 and vessel are further illustrated in at least FIGS. 16*a* and 17.

Figure 20:
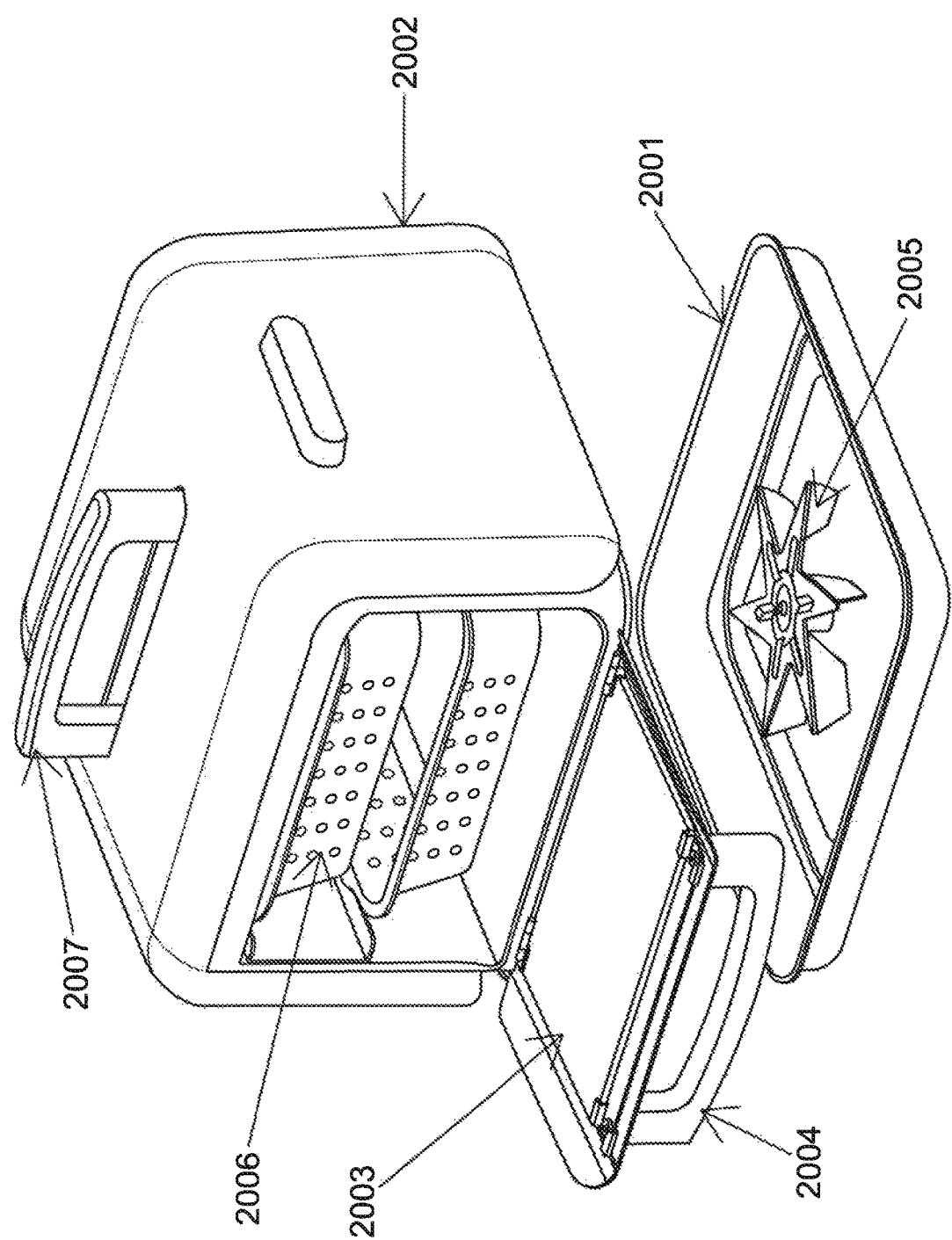

FIG. 20 illustrates a non-electric induction oven accessory for use on an induction device of motorized induction device 10. The oven has no electrical parts and so may be submersed for cleaning or cleaned in a dishwasher for example. The oven comprises an open base portion 2001 and a removable upper oven portion 2002 which locates on the base portion 2001 with the oven portion 2002 and base portion 2001 communicating about an equator to form a closed oven compartment. The upper oven portion 2002 has a handle 2007 for manipulating it on and off the base portion 2001, and a front opening closed by a hinged door 2003 with a door handle 2004. Food items may be loaded into and removed from the oven compartment by lifting the upper oven portion 2002 from the base or through the door opening as is more convenient for the circumstances. One or more cooking trays 2006 may be located into racks of the upper oven portion 2002 or a free standing cooking rack may be supported upon the base and access by lift of the upper oven portion 2002. The oven may be heated from the base and one or more sides using two or orthogonally located induction coils as previously described or disclosed in PCT/IB2016/000609. Optionally but not exclusively there one or more side walls or top of the upper oven portion 2002 to improve heating efficiency.

Figure 20A:
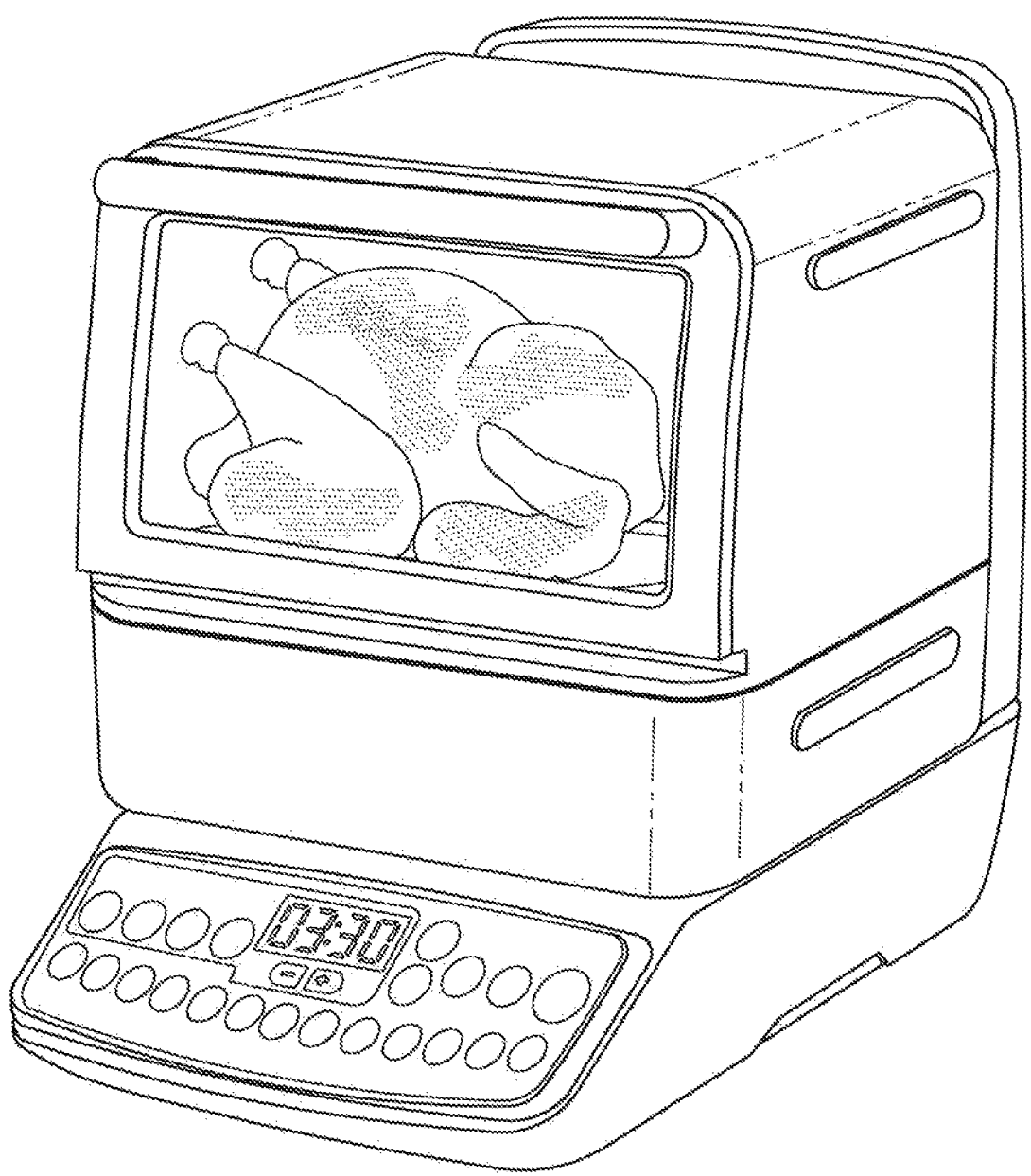
Figure 21:
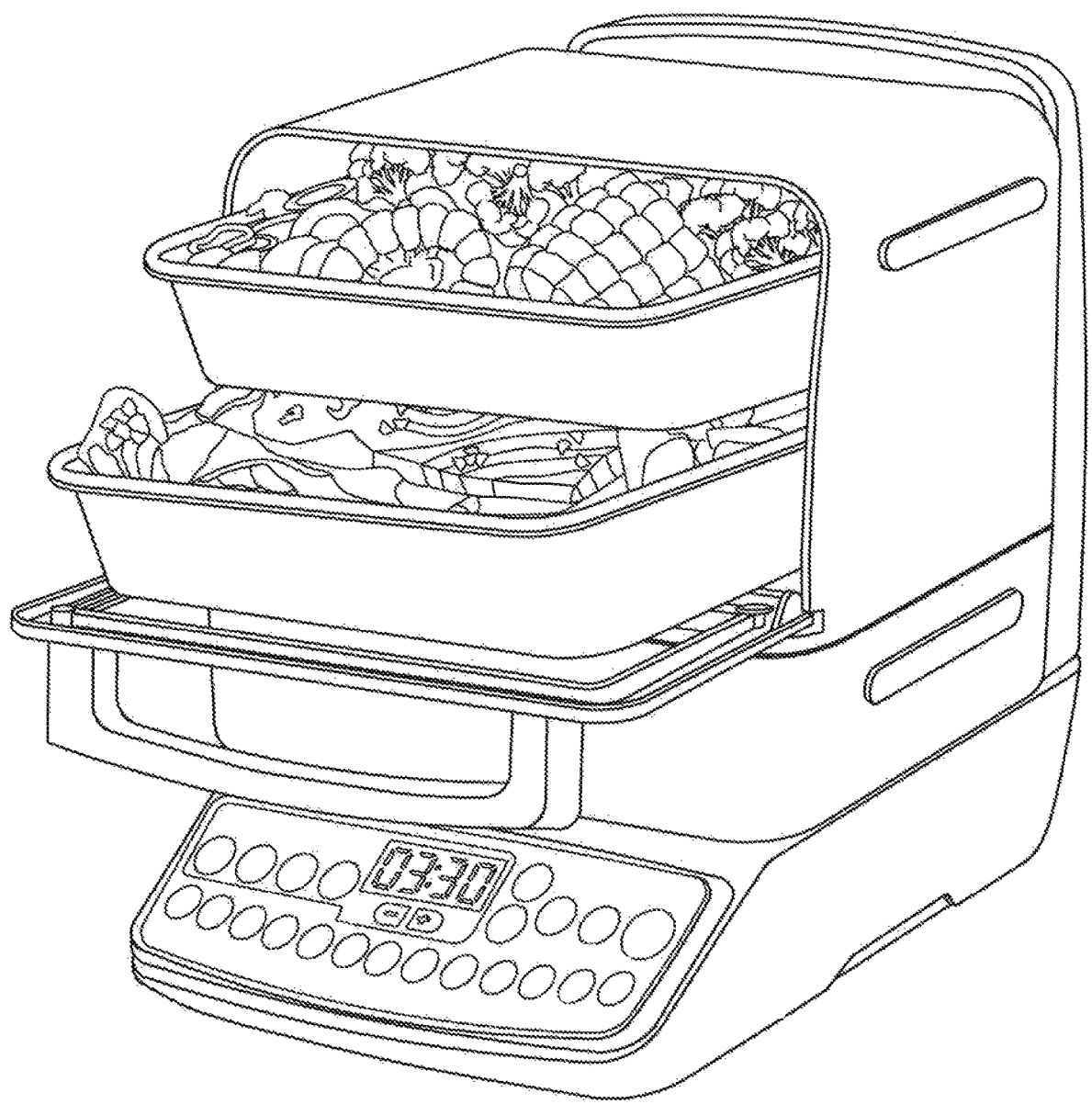
Figure 22:
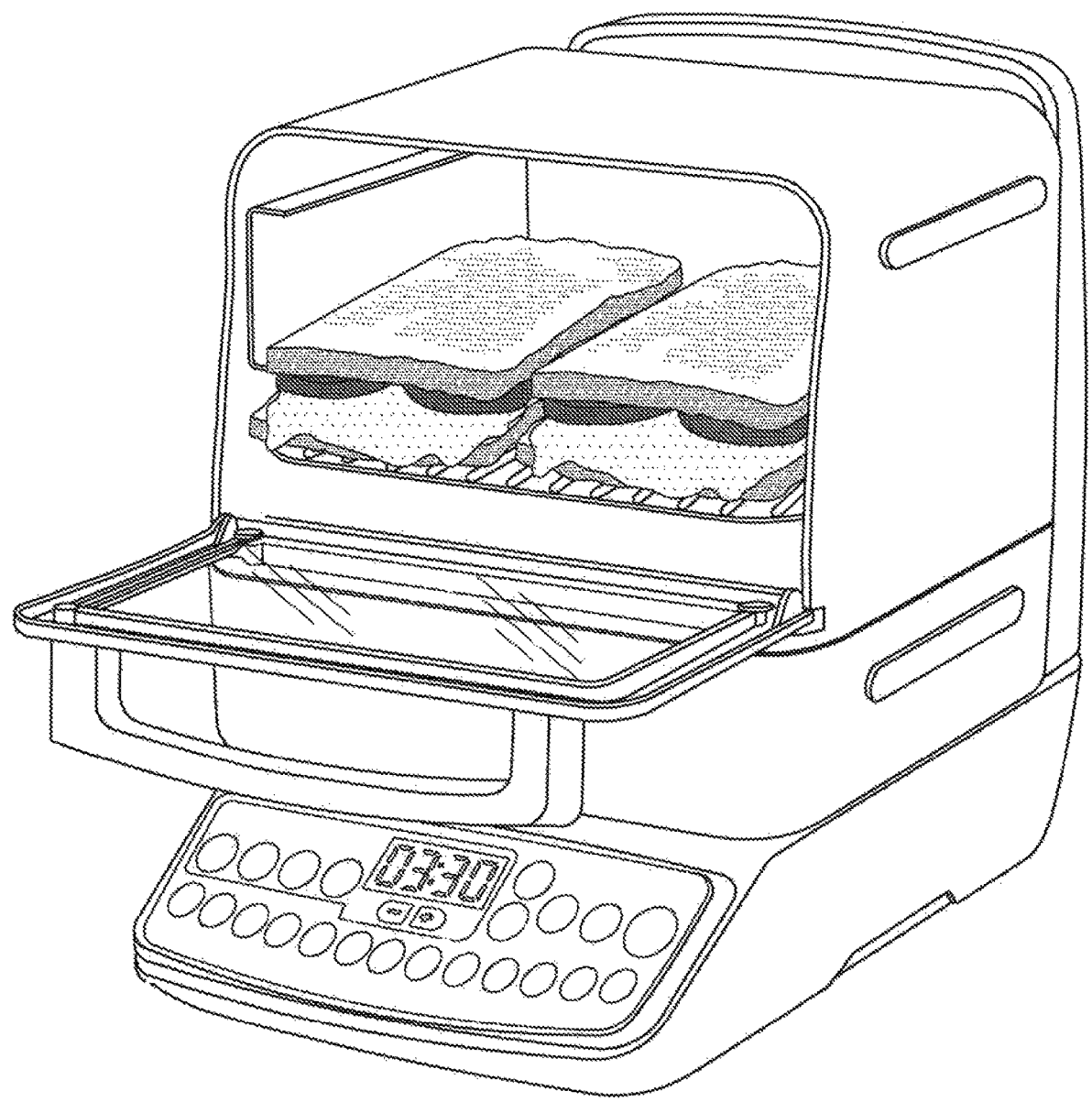
Figure 23:
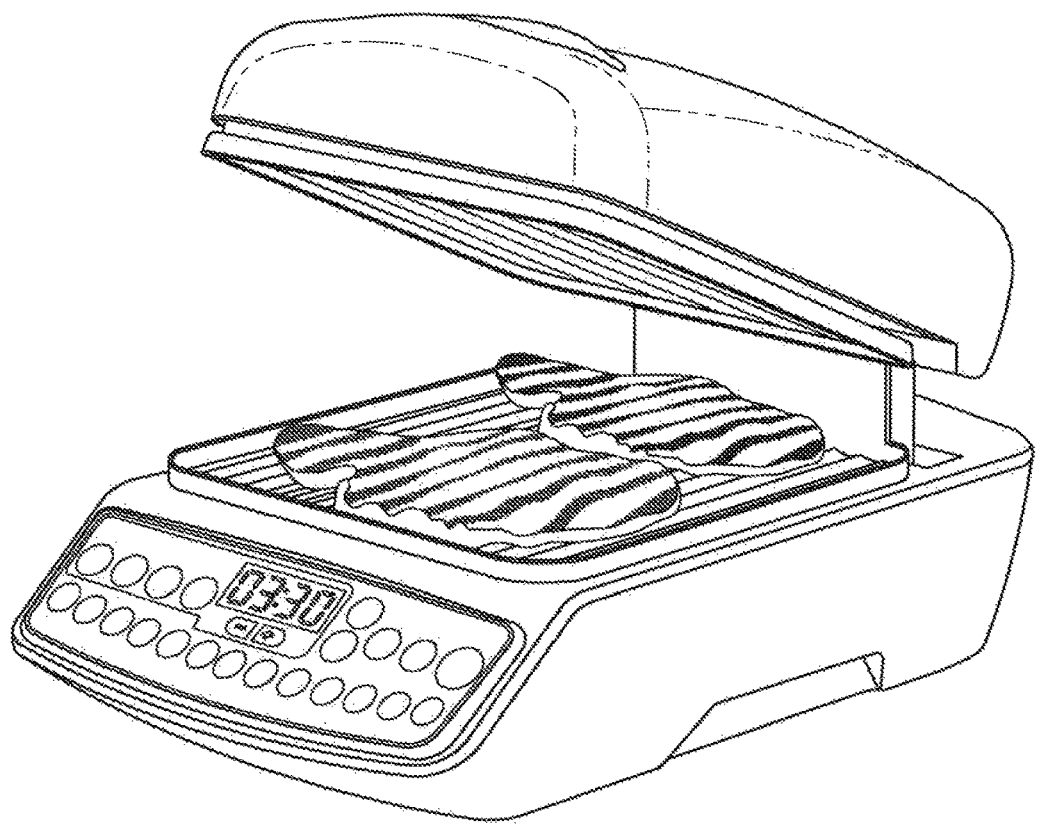
Figure 23:
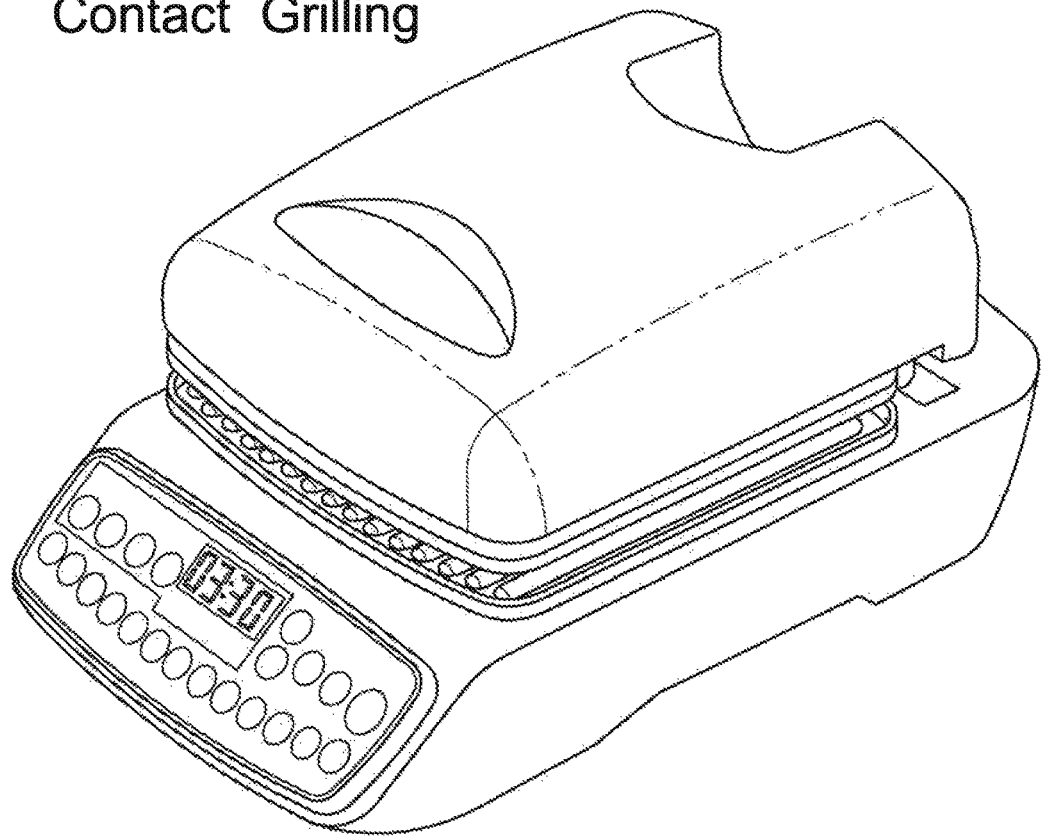
Figure 24:
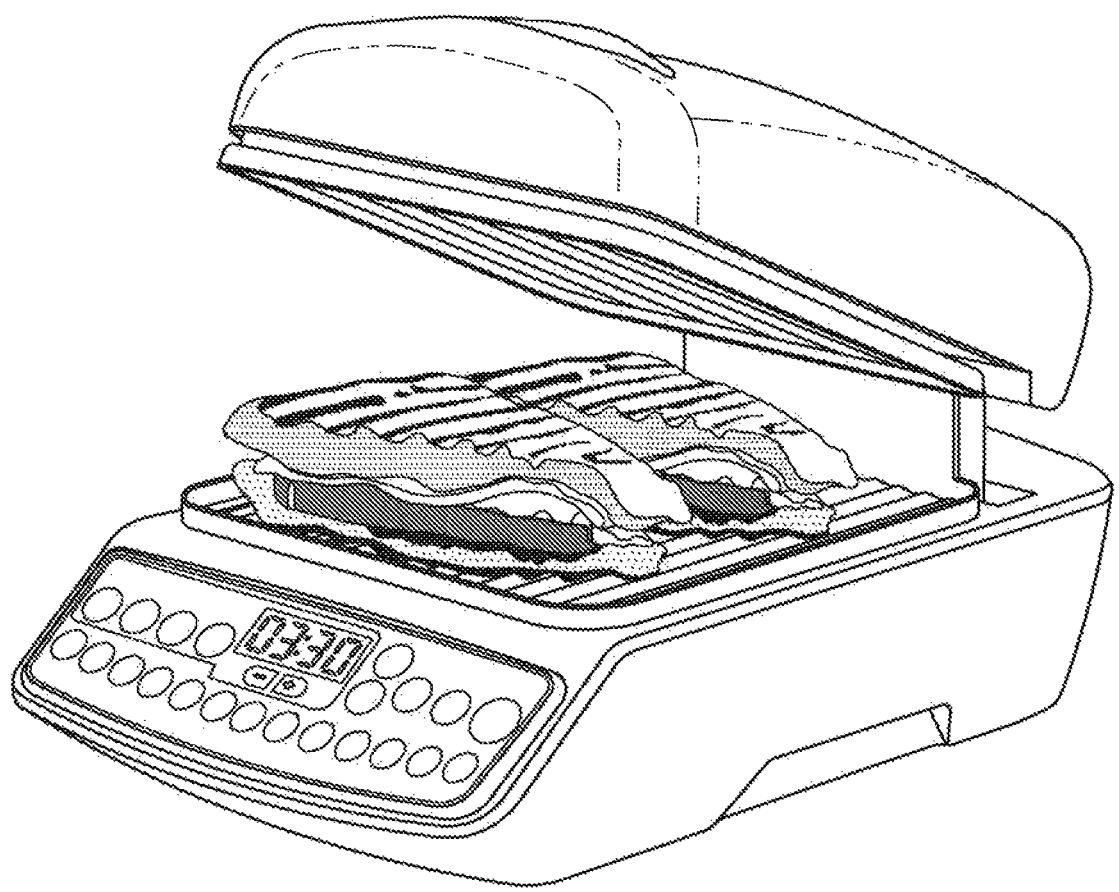
Figure 25:
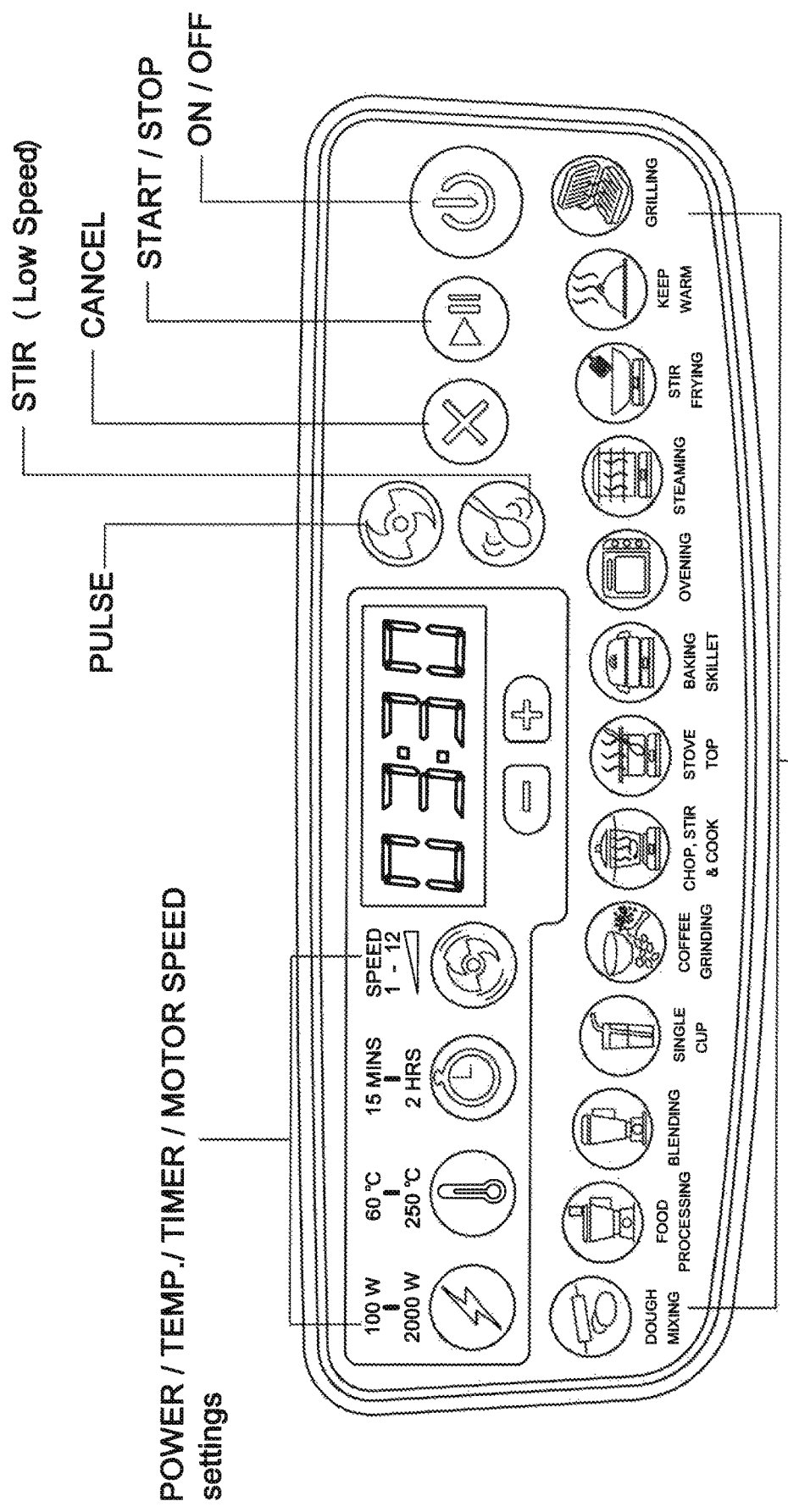
Figure 26:
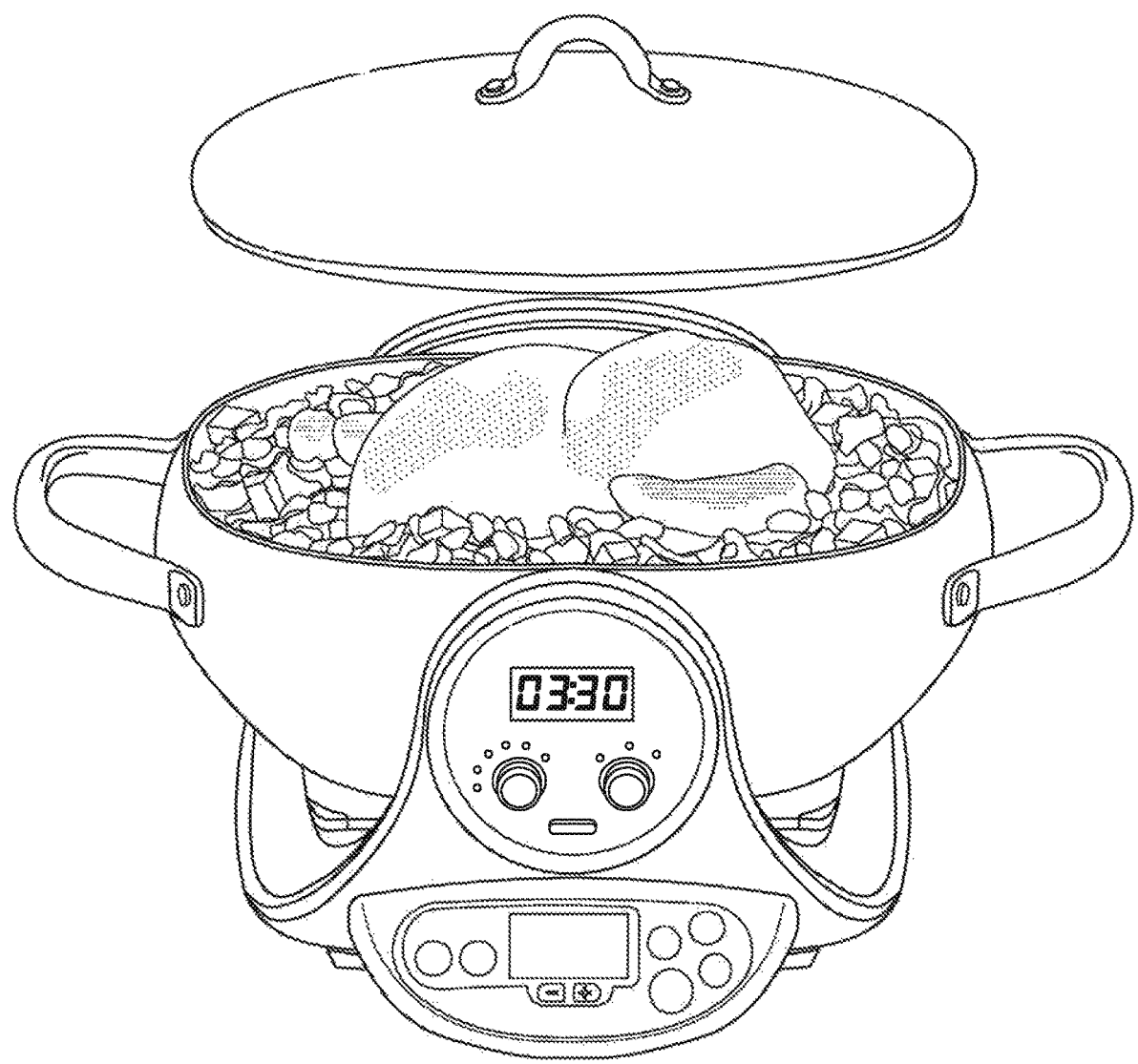
FIGS. 26, 27, 28, 29, 30, 31, 32, and 33 illustrate an induction cradle, of the type disclosed in PCT/IB2016/000609, in combination with a rotational spindle according to the invention.
Figure 27:
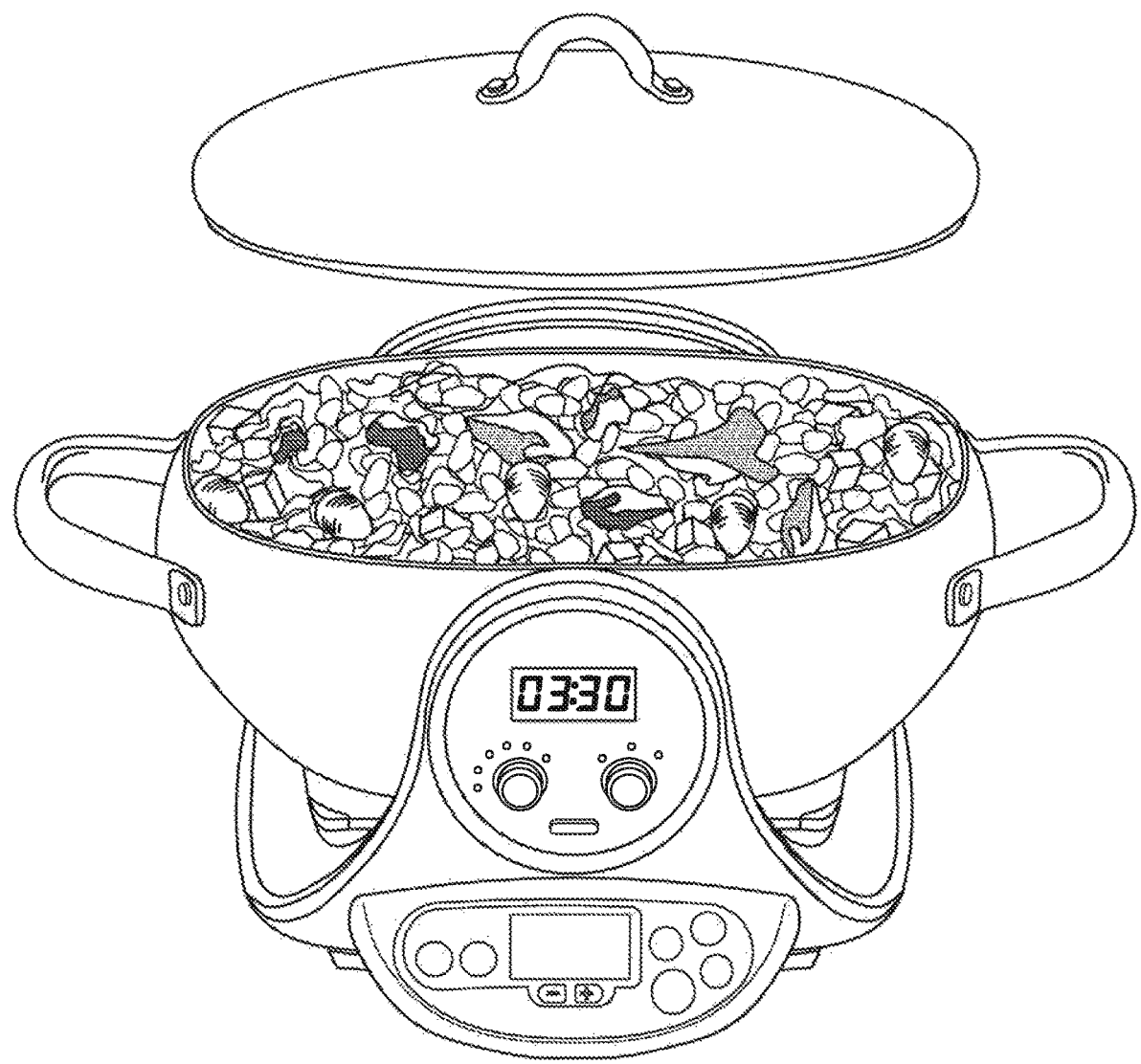
Figure 28:
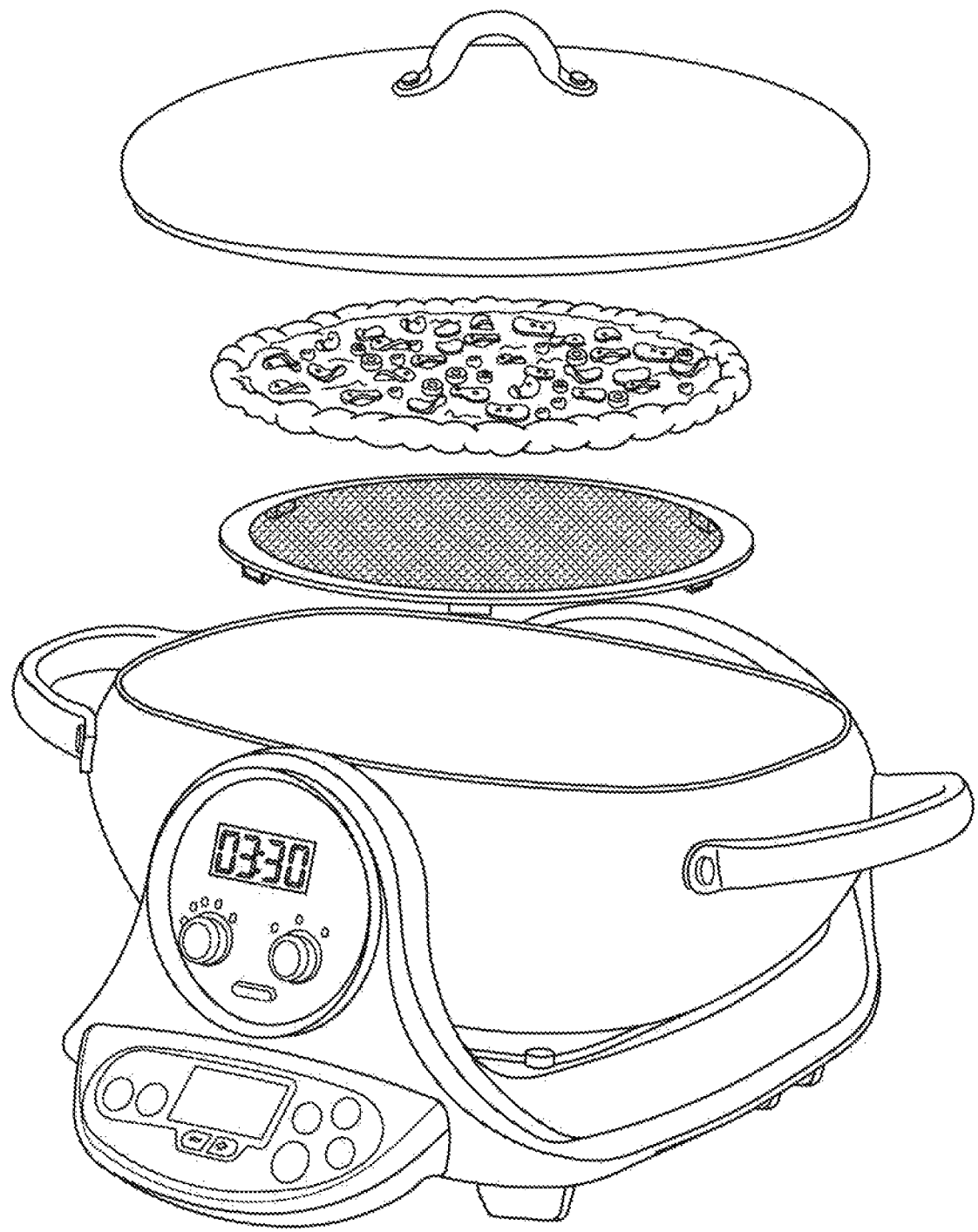
Figure 29:
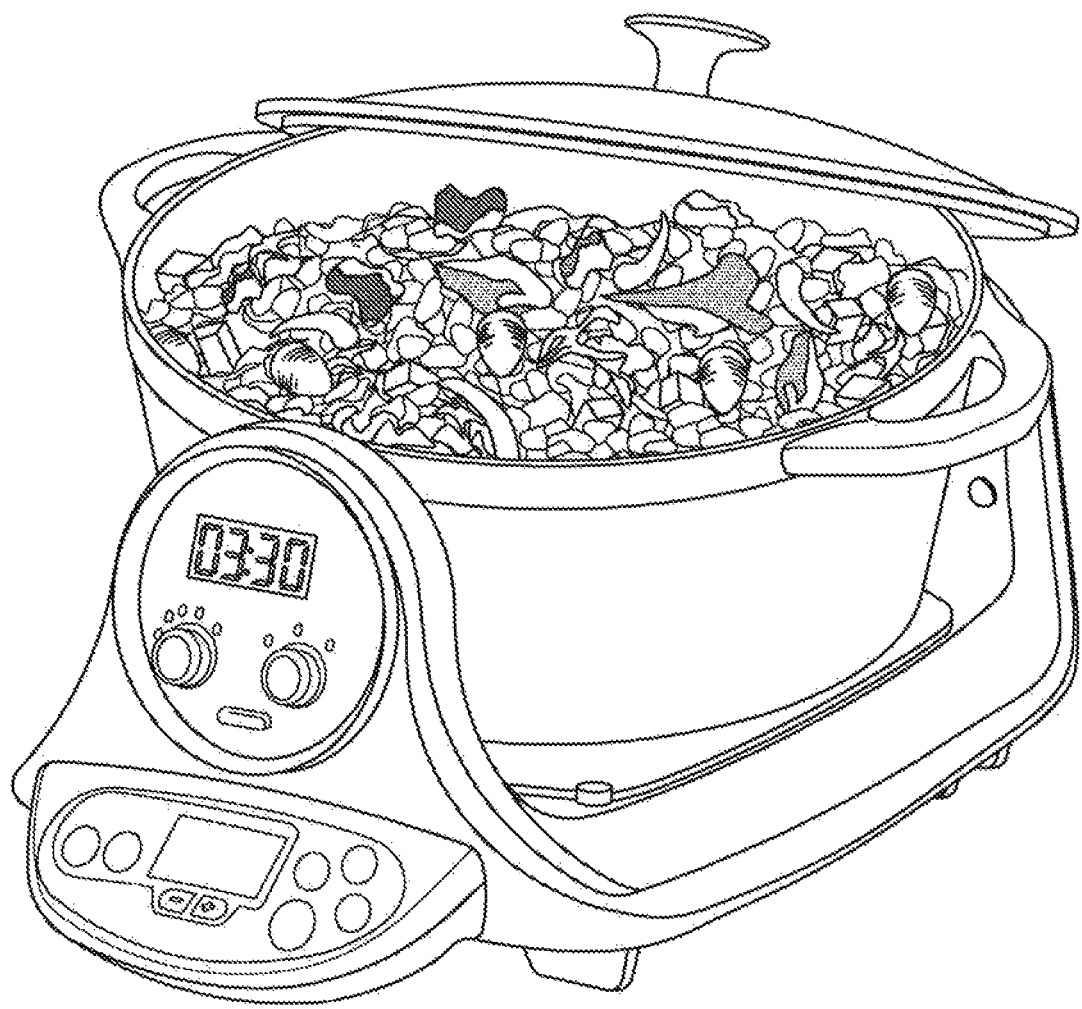
Figure 30:
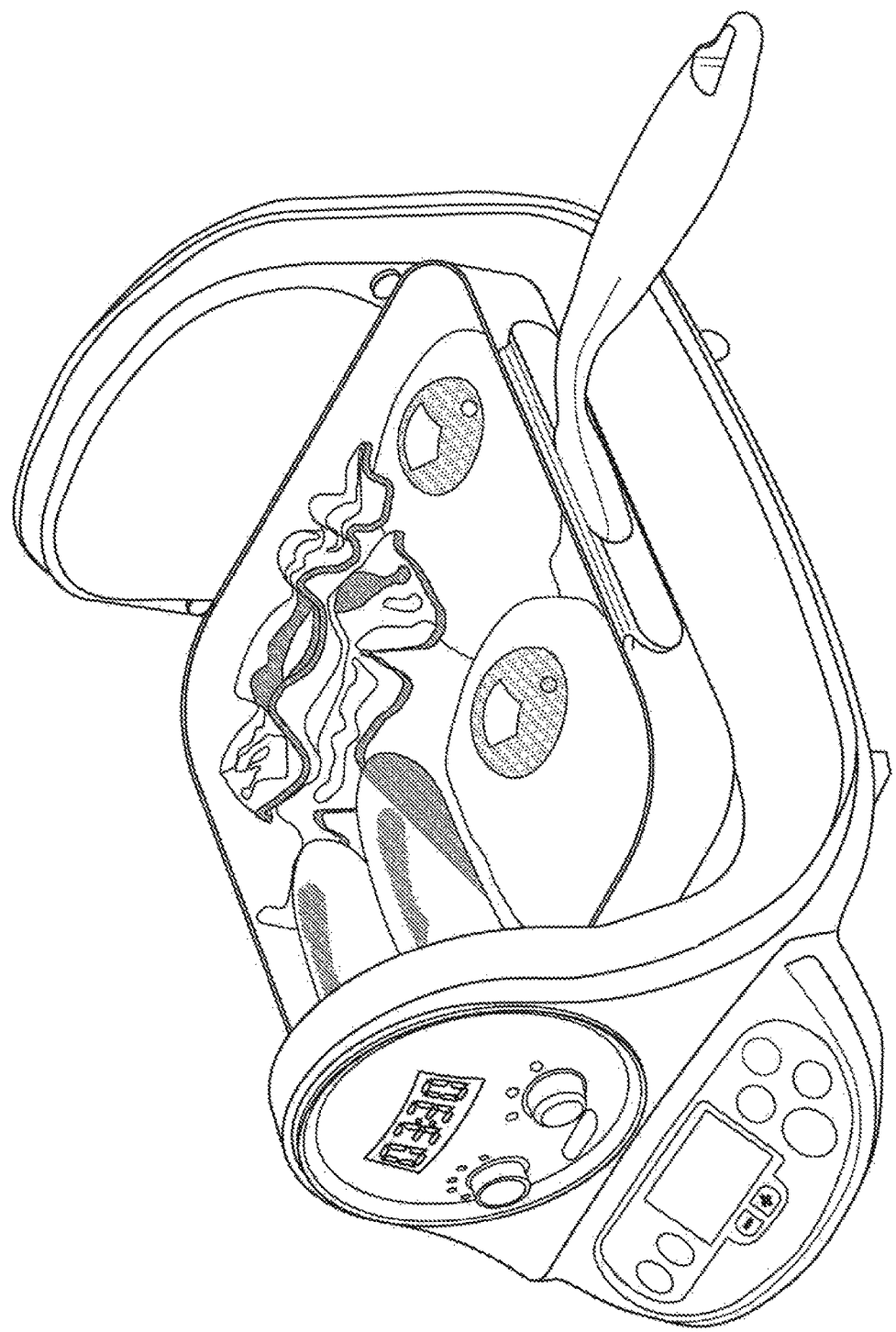
Figure 31:
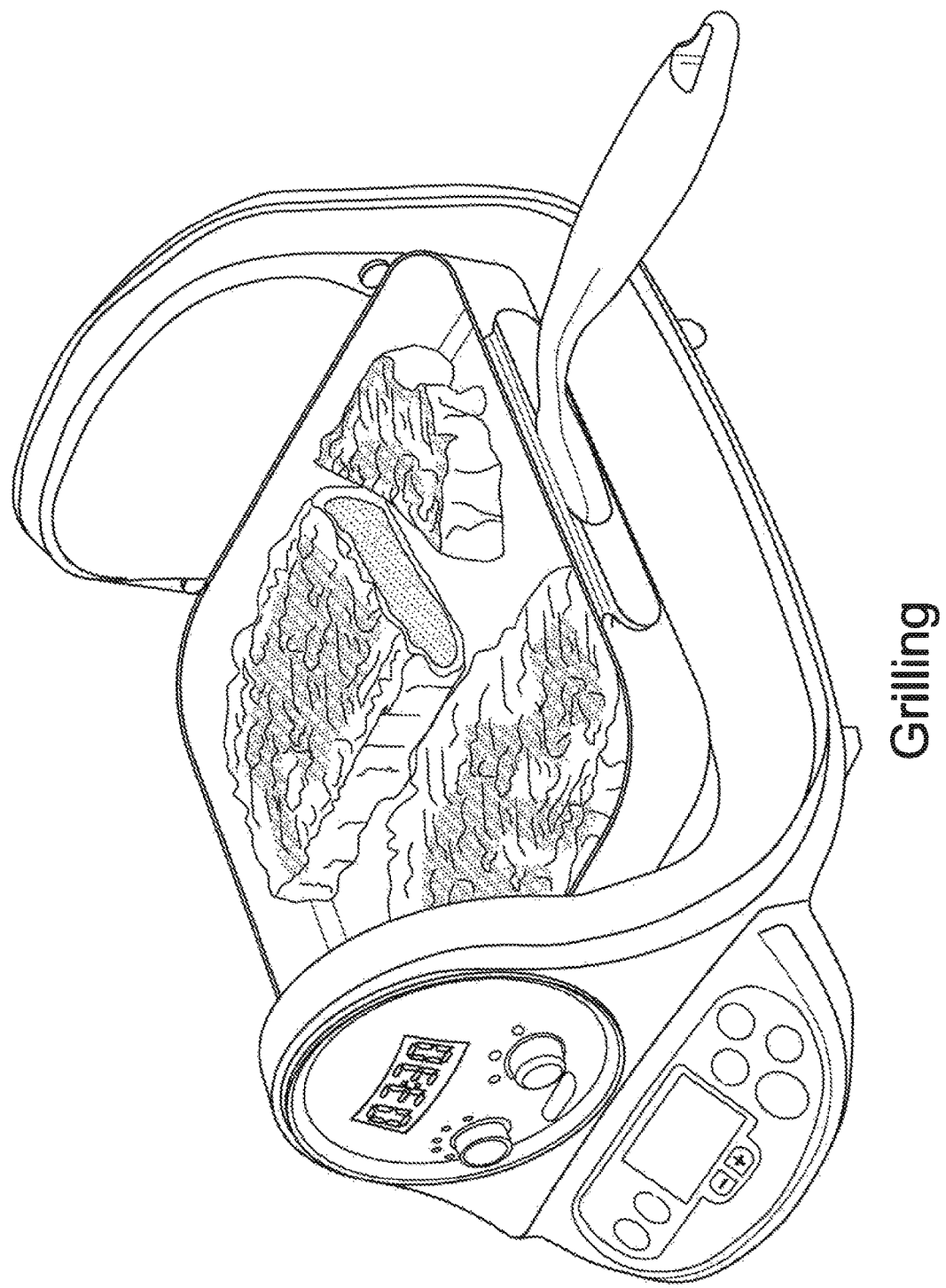
Figure 32:
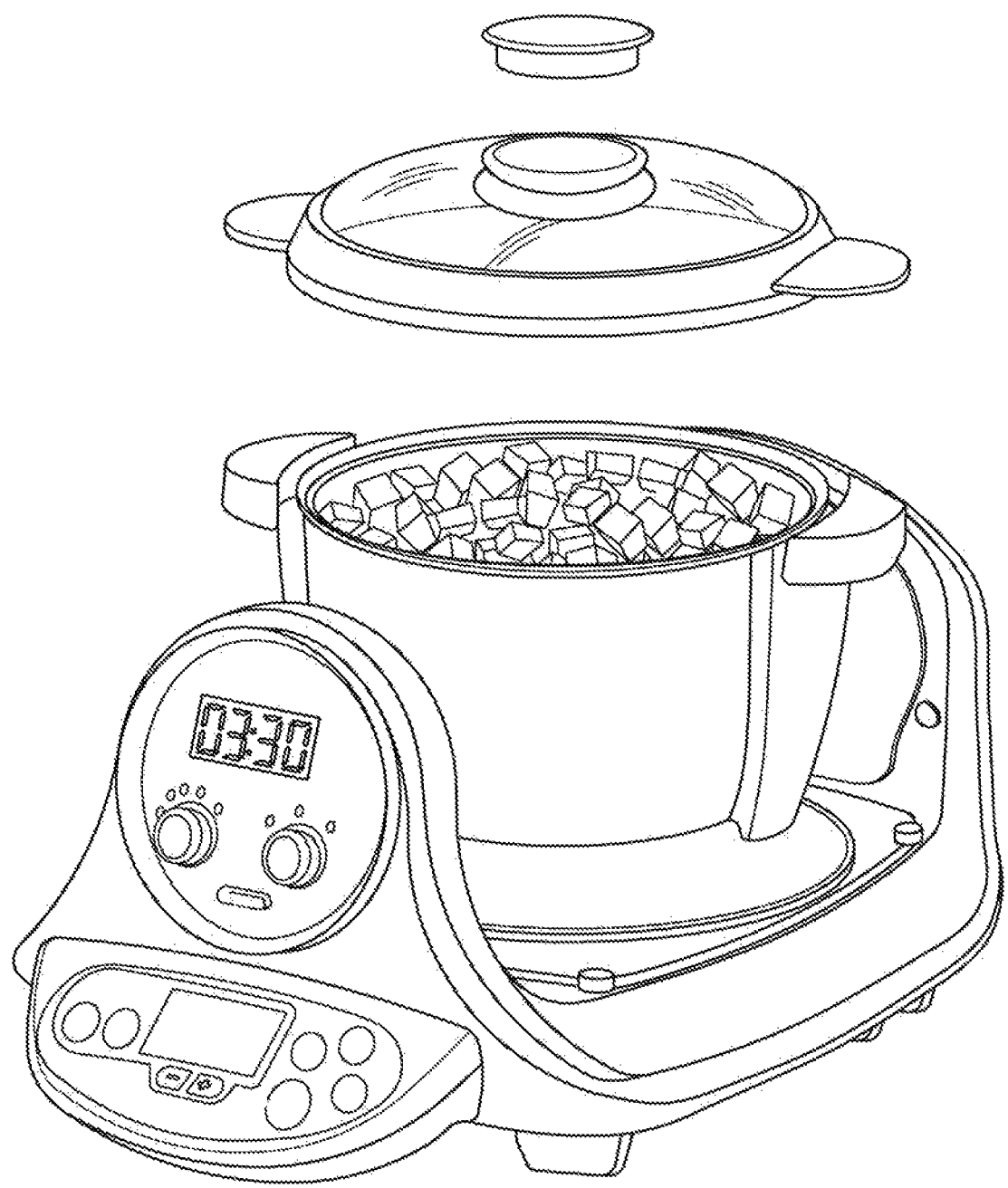
Figure 33:
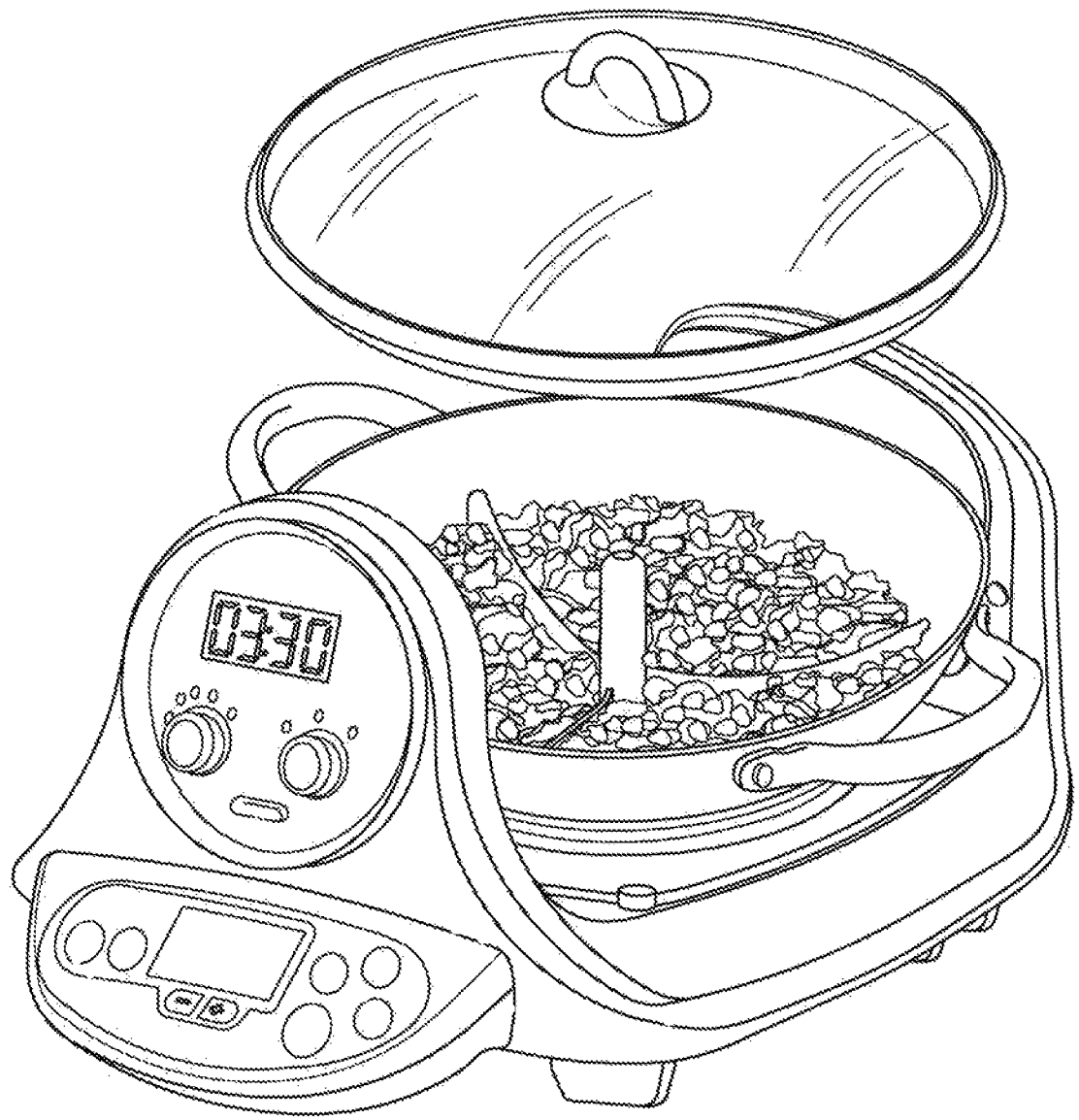

In one embodiment the base portion 2001 of the non-electric induction oven accessory includes a boss for engaging a circulating fan 2005. In combination with energising the induction coils to heat the base portion 2001 the motorized induction device 10 also engages operation of the boss and circulating fan 2005 to circulate hot air within the closed oven compartment further increasing heating efficiency. The fan 2005 boss includes a coupling to matingly engage the coupler 41 of the spindle such that the fan is driven by the motorized induction device 10. In another embodiment an adapter, such as adapter 8, may be located between the motorized induction device 10 and oven, and include an adapter coupling 48 for driving the fan 2005 from the motor 15 and spindle 14. In yet another embodiment the base portion 2001 is adapted to contain water which is heated to steam for using the non-electric oven as a steamer. The non-electric oven has no electrical parts to be affected by the generation of large quantities of steam within the oven compartment. Further examples of a non-electric oven in combination with a motorized induction device 10 are illustrated in FIGS. 20*a*, 21 and 22.

FIGS. 7 through 12 illustrate other useful embodiments of the motorized induction device 10 in combination with accessories for blending, chopping, mixing or pureeing foods. An adaptor plate 701/702 for example has a first lower face which engages on the top of the motorized induction device 10 and a second side adapted for example to receives food processor or blender jar and couple the food processor or blender blade to the motorized induction device 10 spindle 14 for rotation of the food processor or blender blade. The coupling is via an adapter coupling, such as adapter coupling 48 in FIG. 4*b*, with protecting lower end provided to matingly engage with the drive coupler 41 of the spindle 14. The upper end of adapter coupling is provided with a clutch coupler for engaging with a clutch coupling of the chopping, blending, mixing or stirring vessel as the case may be. The upper surface of the adapter may be suitably shaped and/or adapted to one of the vessel or container types illustrated. Such vessel or container types are known in the art and will be readily understood by the skilled addressee. Further embodiments illustrating uses in combination with stirring devices such as an ice-cream maker, or grinders or juicer are illustrated in respective illustrations.

FIGS. 26 to 33 illustrate an induction cradle of the type disclosed in PCT/IB2016/000609 in combination with a rotational spindle according to the invention. Such a combination device can be used with a cooking vessel having a stirring paddle for mixing and stirring food as it cooks, such as in FIG. 33 where the stir-fry wok has paddles to stir food mechanically (as opposed to by hand) as it cooks. The device has a lower control panel for controlling the motorized rotational spindle. Stir times and speeds can be set and controlled alone or in combination with cooking temperature or times.

Figure 34A:
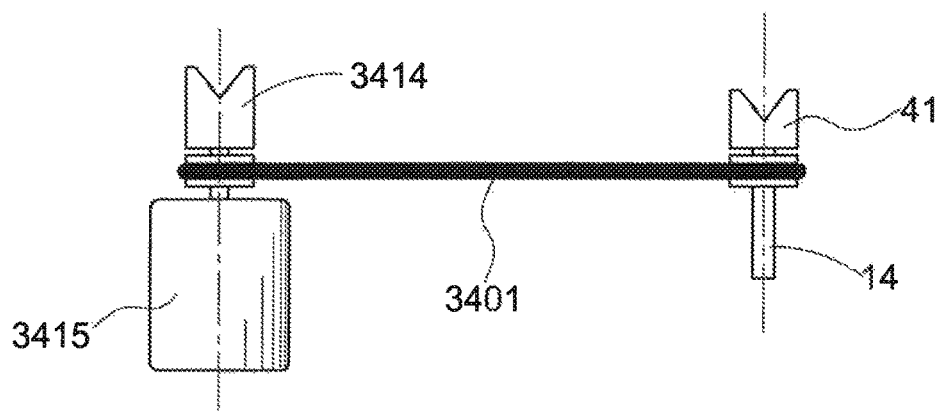
FIGS. 34, 34*a*, 35, 36, and 37 illustrate an induction contact grill, for example of a type disclosed in PCT/IB2016/000609, in combination with a rotational spindle according to the invention.
Figure 34:
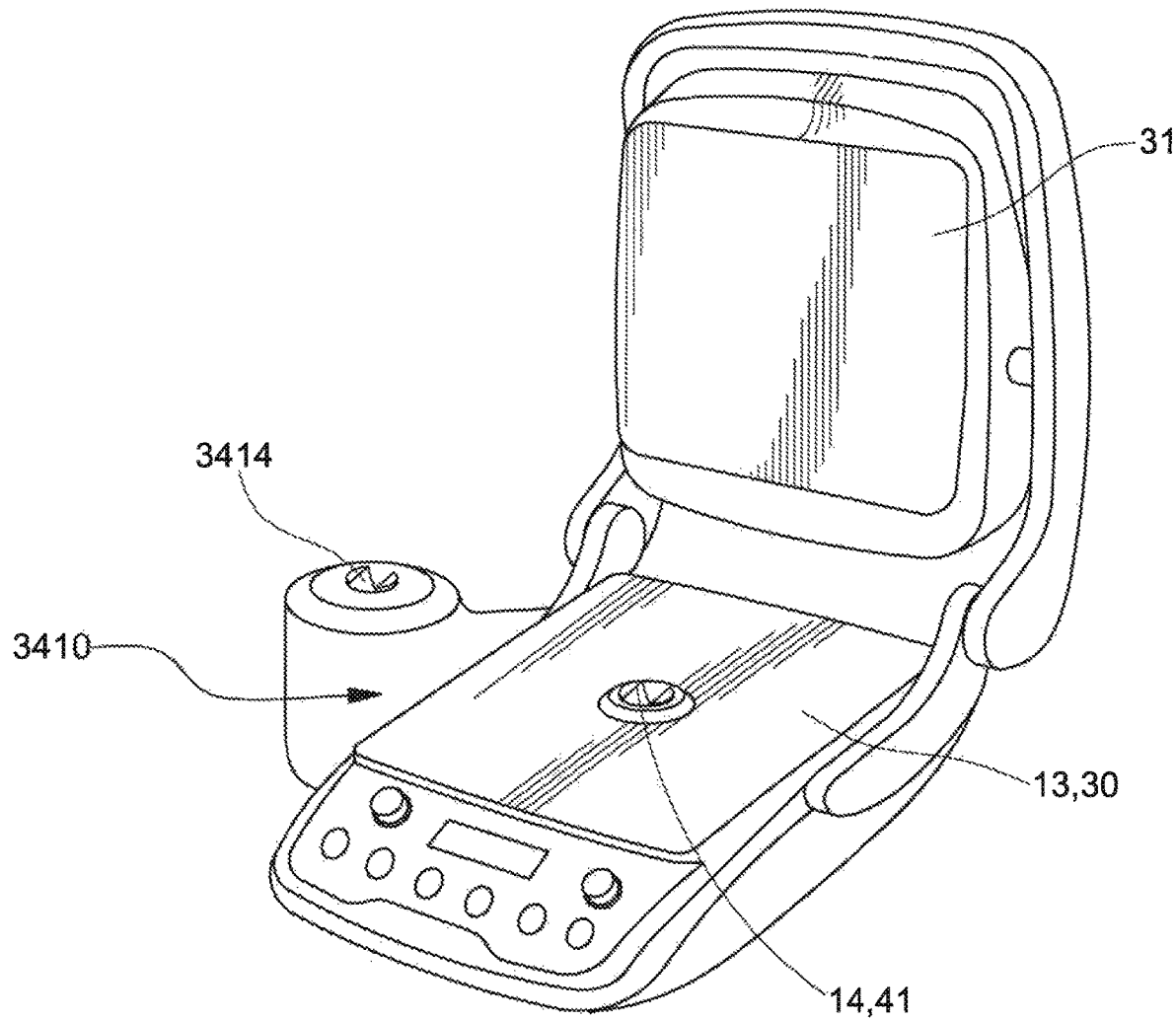
Figure 35:
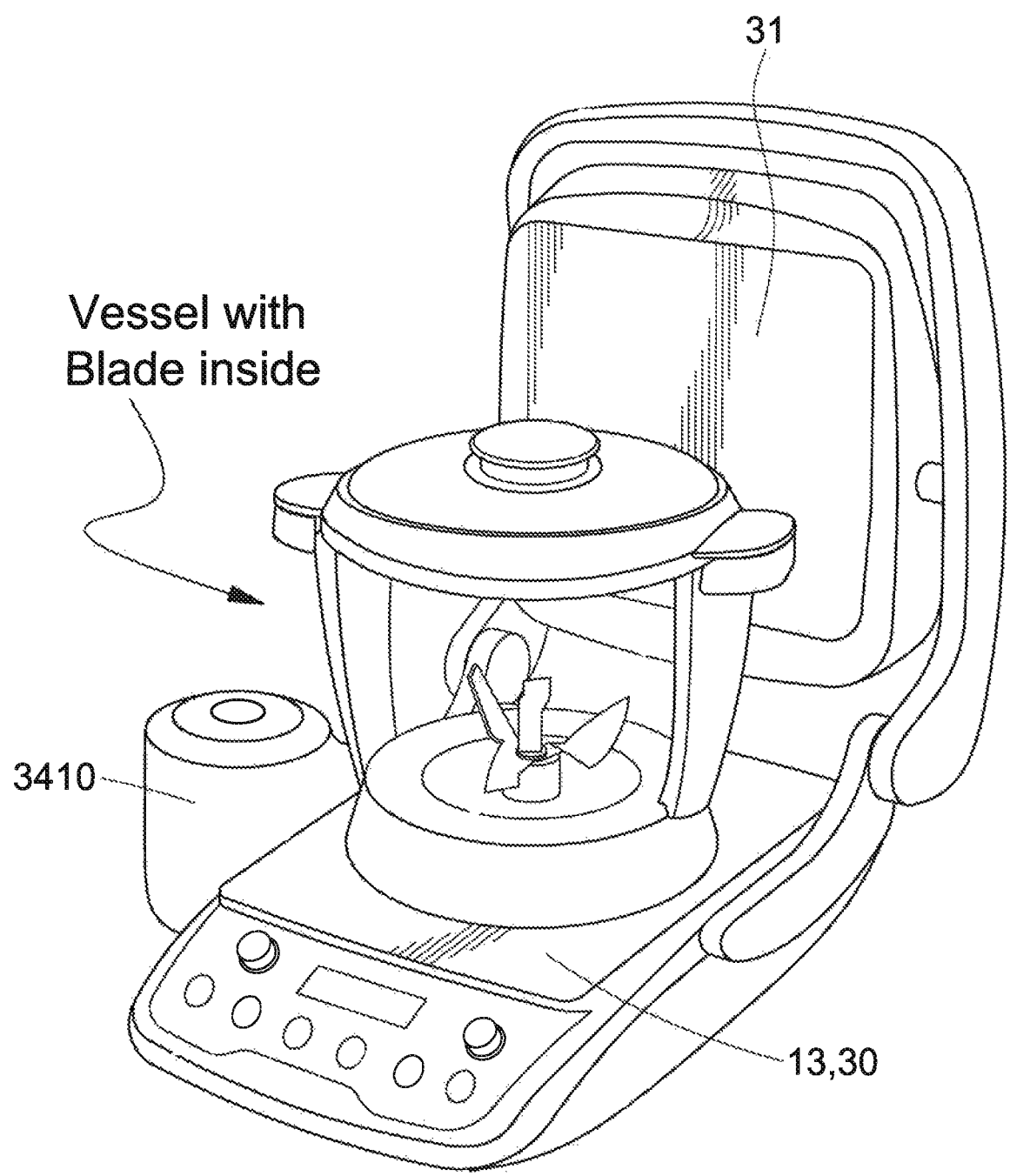
Figure 36:
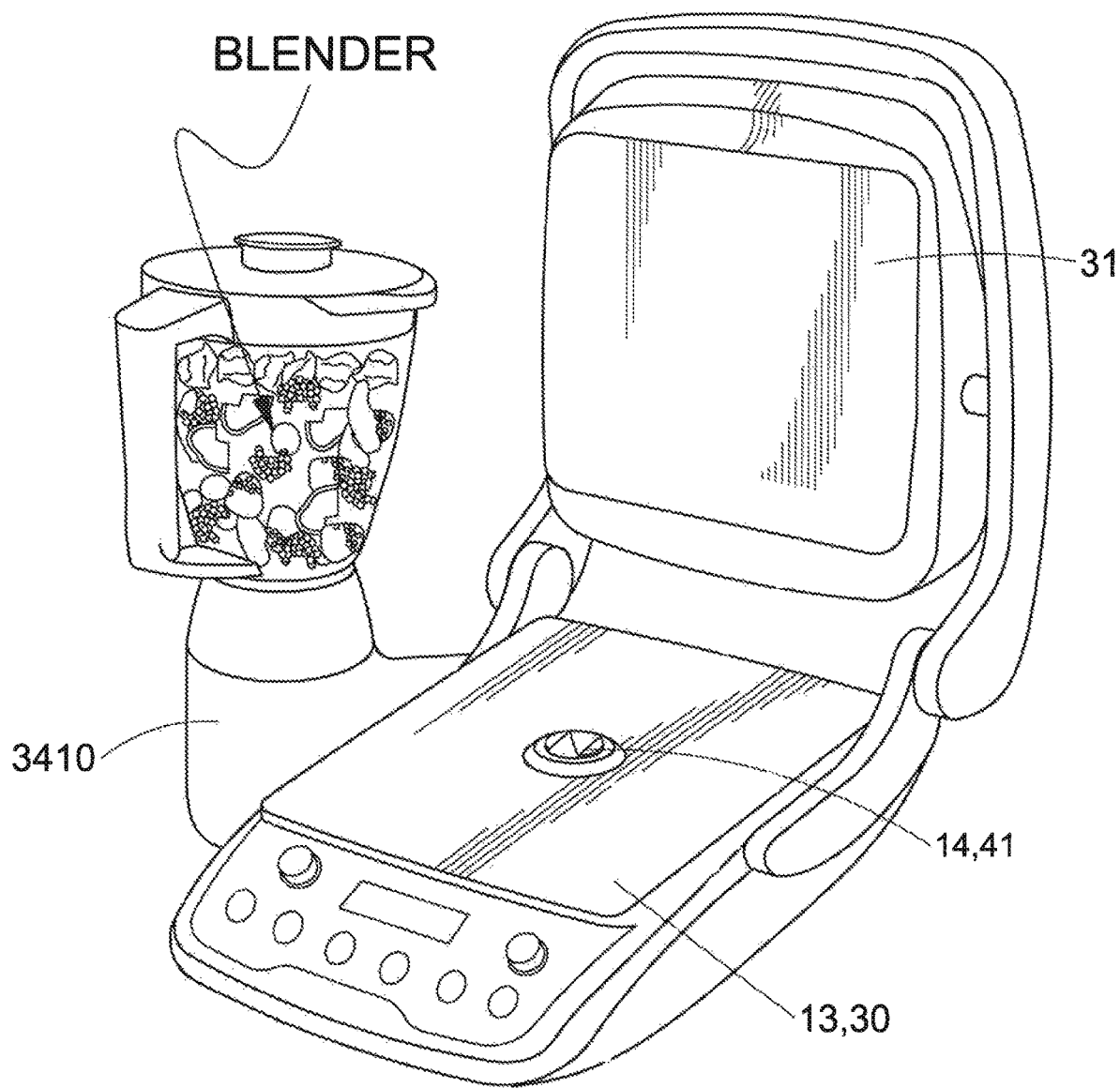
Figure 37:
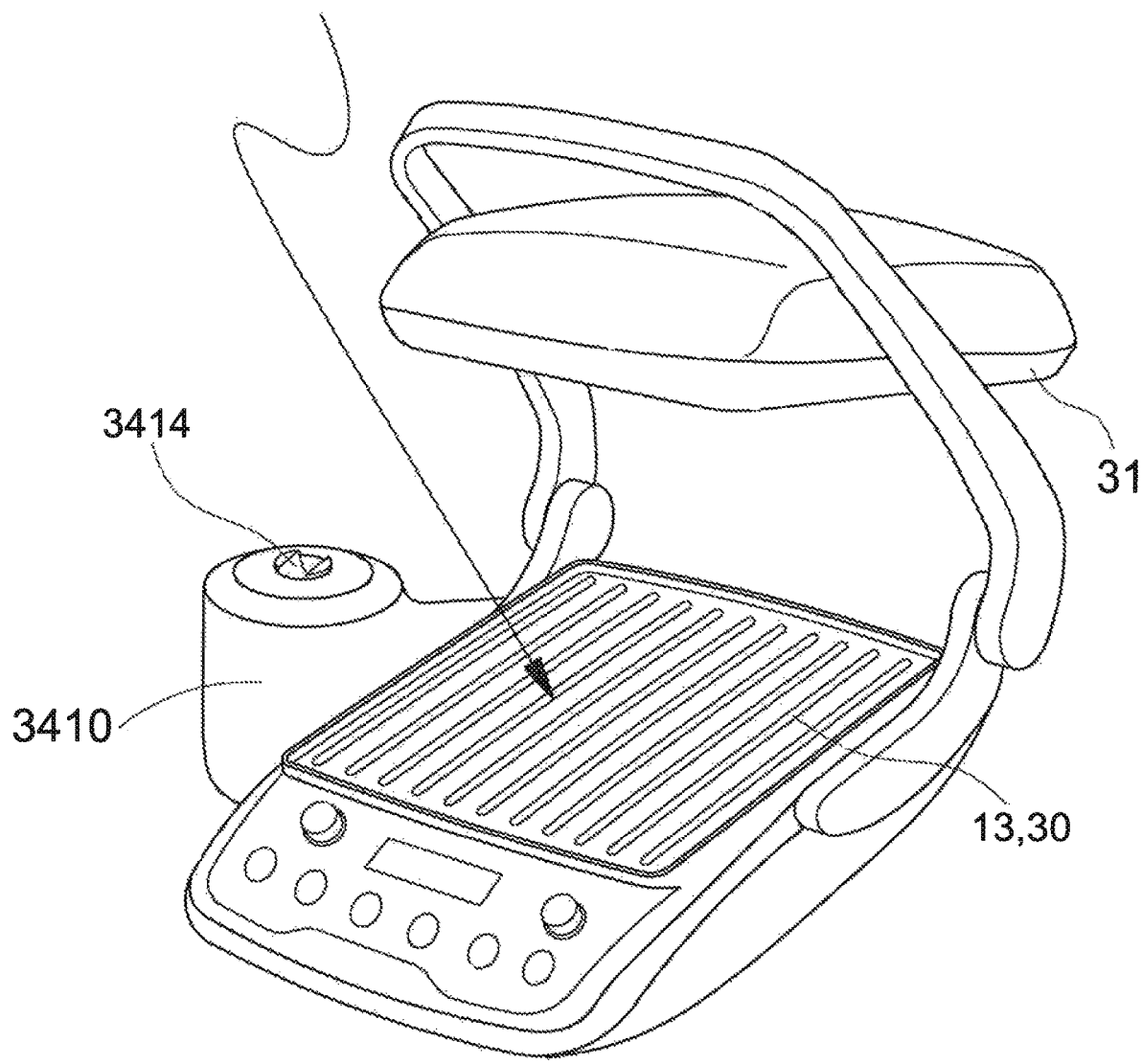

FIGS. 34 to 37 illustrate an induction contact grill, for example of a type disclosed in PCT/IB2016/000609 in combination with a rotational spindle according to the invention. The device can be used in combination with various blender or mixer or food processor or similar food preparation accessories. In these embodiments the device may have a motorized spindle 14 associated with an induction cooking surface 13 and induction coil 30, and also optionally, a second motorized spindle 3414 device in a housing extension 3410 coupled to the side of the main device housing. In some embodiments the motorized spindle 14 may be driven by a belt and pulley arrangement 3401 from the motor 3415 located in the housing extension 3410 as schematically illustrated in FIG. 34*a*.

Figure 38:
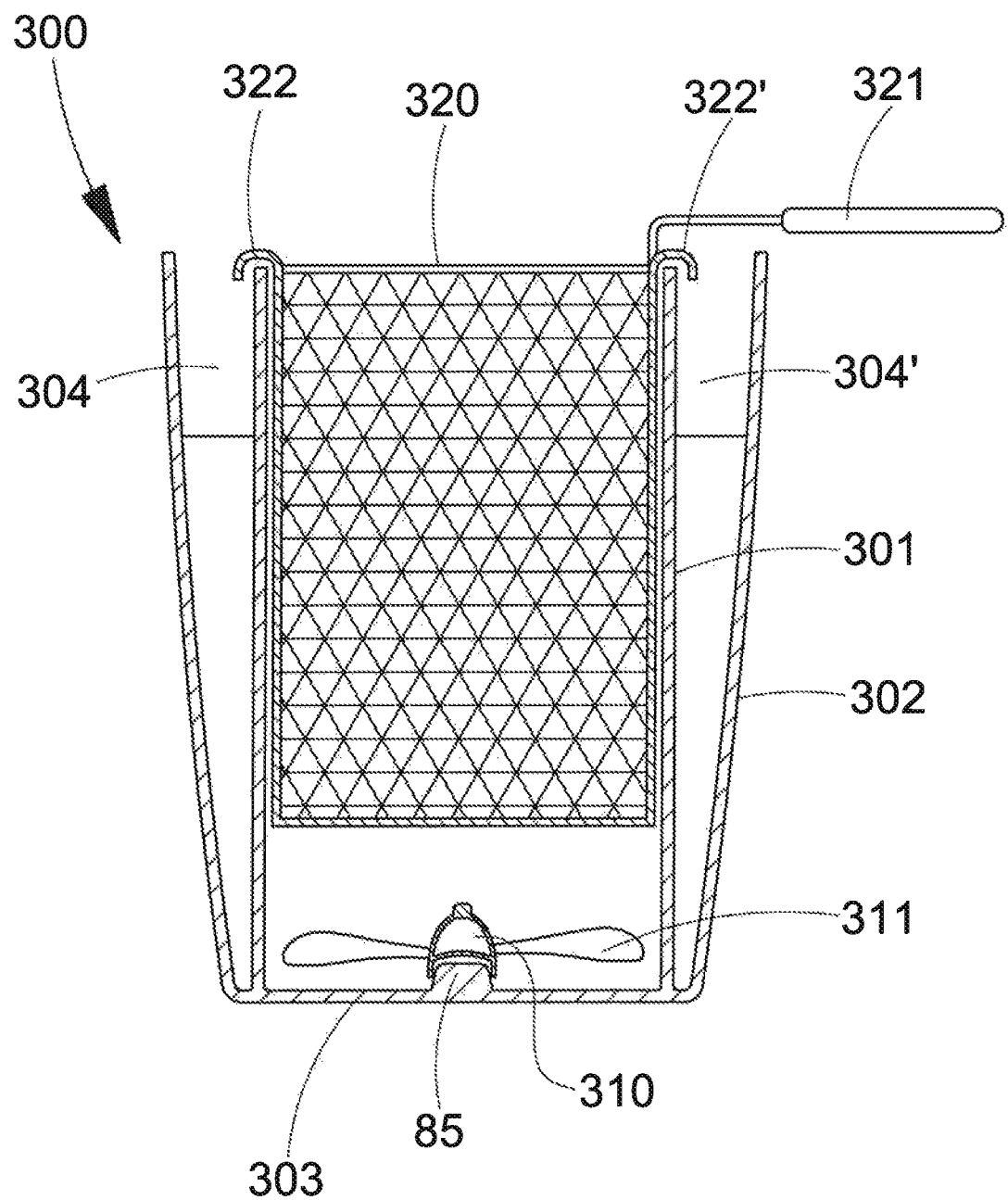
FIG. 38 illustrates a deep-fryer accessory.
Figure 39:
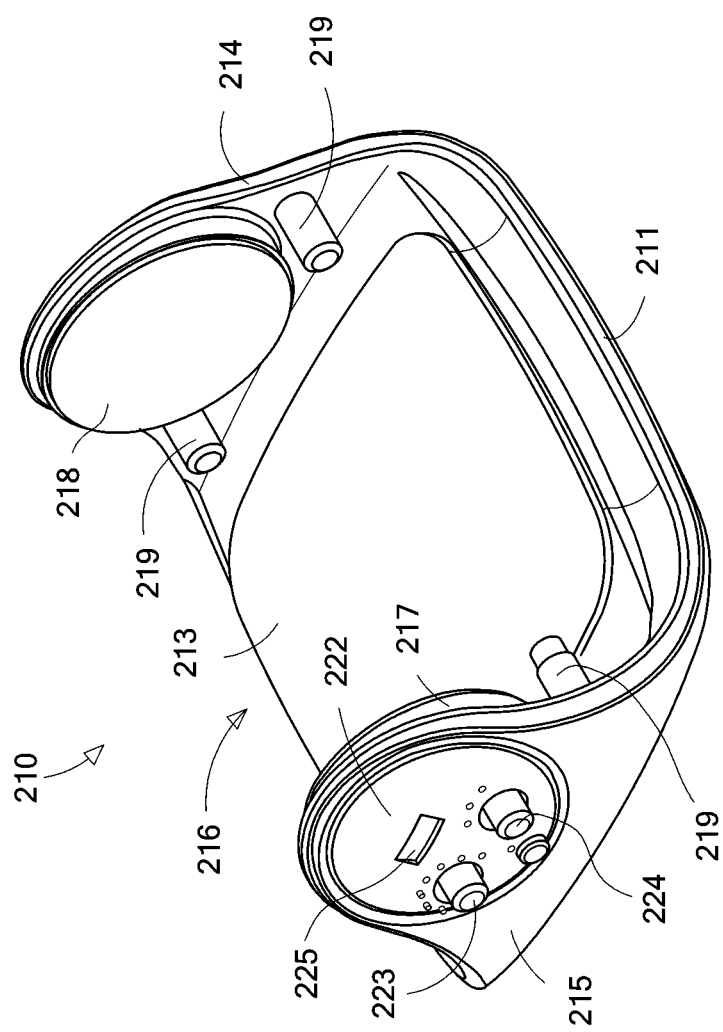
FIG. 39 is a perspective view of an induction cradle.
Figure 40:
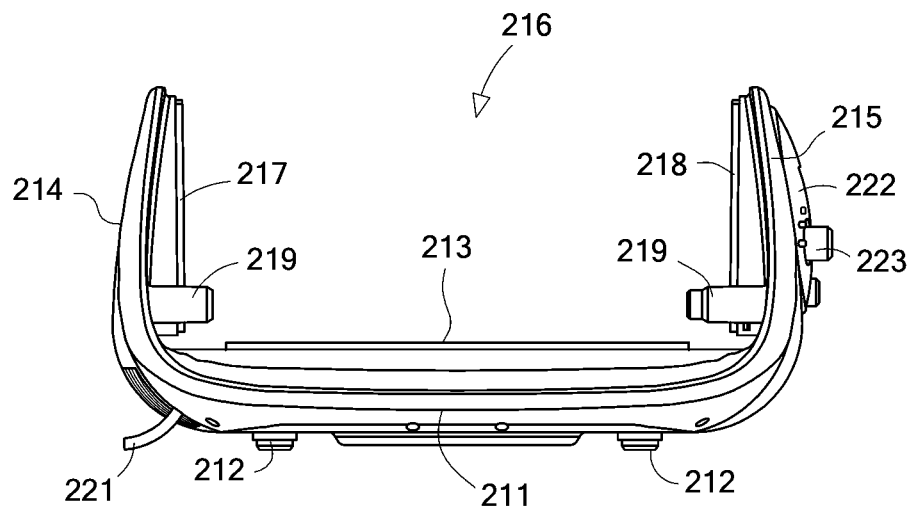
FIG. 40 is a front view of the induction cradle of FIG. 39.
Figure 41:
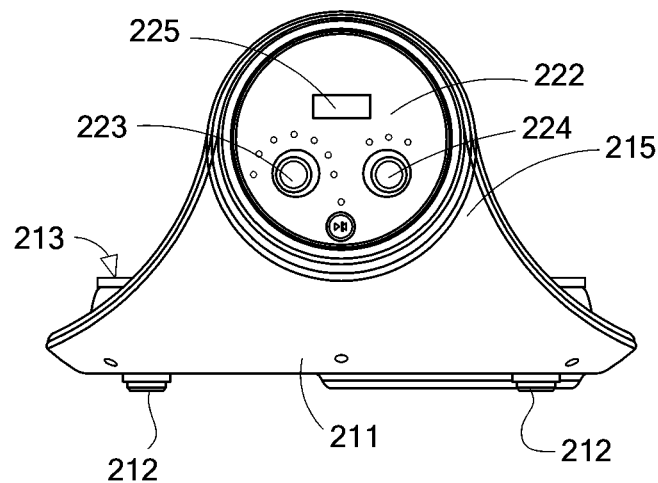
FIG. 41 is a side view of the induction cradle of FIG. 39.
Figure 42:
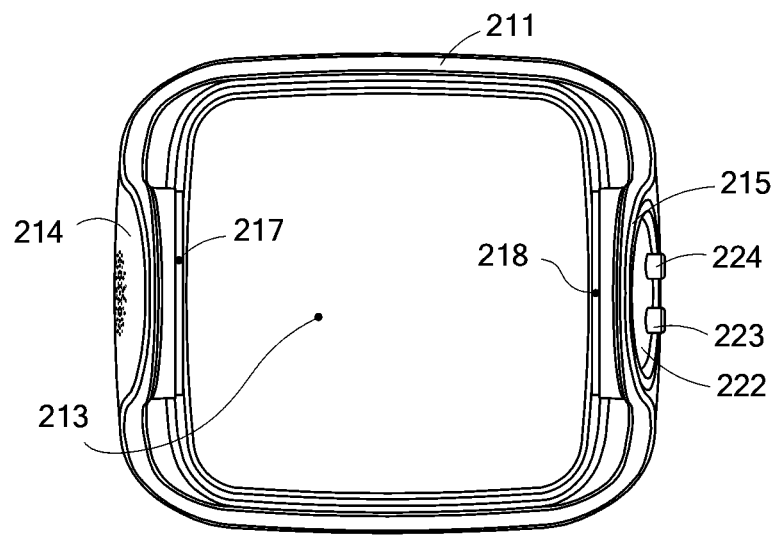
FIG. 42 is a top view of the induction cradle of FIG. 39.
Figure 43:
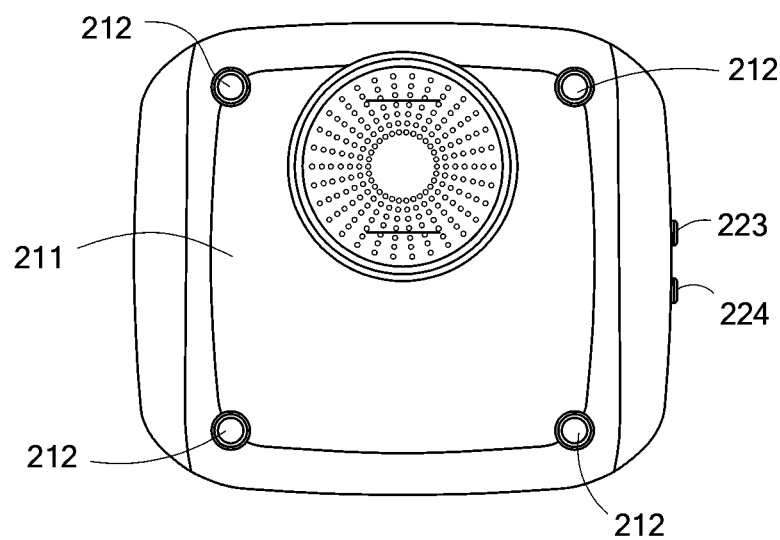
FIG. 43 is a bottom view of the induction cradle of FIG. 39.
Figure 44:
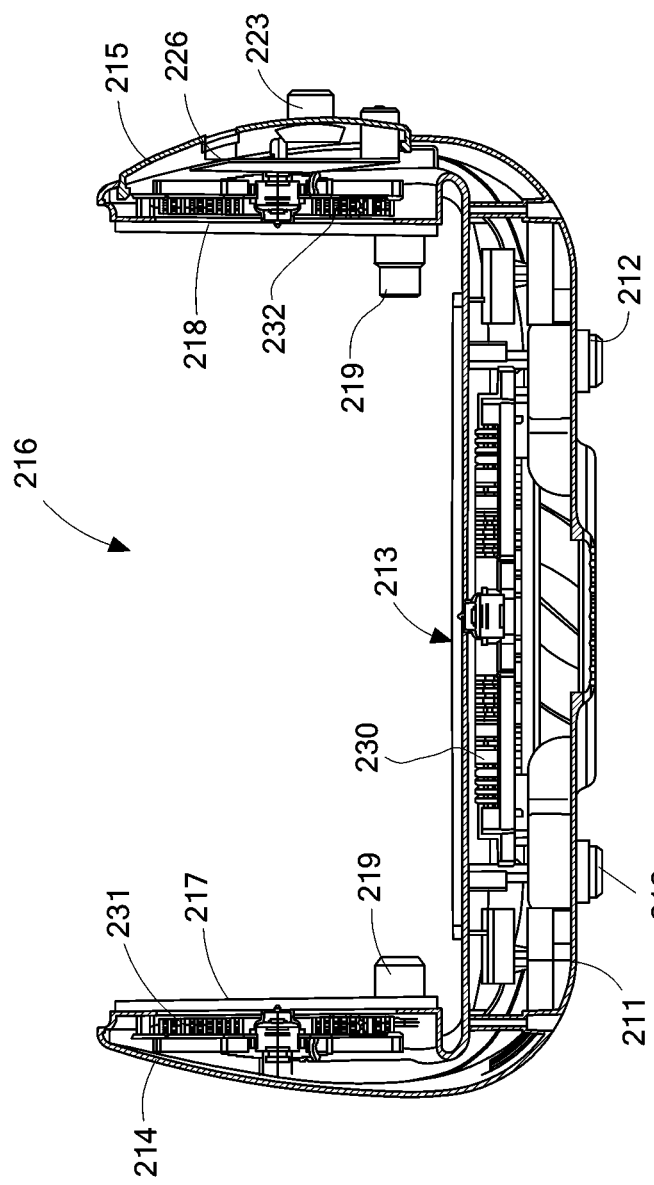
FIG. 44 is a section view through the induction cradle of FIG. 39.

FIG. 38 illustrates a deep-fryer accessory 300 for use in combination with an induction cooker and preferably a motorized induction device 10. The deep-fryer accessory comprises a vessel having a first vessel wall 301 and base 303 forming an open top chamber for heating of cooking oil by induction heating of the base 303. Food items are cooked in a basket 320 having a handle 321 and supports 322 for engaging the top of the vessel wall 301. The boss 85 of the base 303 supports a hub 310 and circulation blades 311 for circulation of cooking oil to improve heating and cooking efficiency. In at least one embodiment of the deep-fryer accessory 300 the vessel further includes second wall 302 extending about at least an upper portion of the vessel and forming in combination with the first wall 301 and overflow reservoir 304. The overflow reservoir 304 provides a safety overflow area for hot cooking oil that overflows the top of the first vessel wall 301. Such overflows are common if the vessel is overfilled with oil; or frozen food items containing excess water and introduced to hot cooking oil.

Referring to the FIGS. 39 to 58, there shown is an induction cradle 210, 101 for supporting a cooking vessel 280 made of, or containing, a ferromagnetic metal such as cast iron or stainless steel to be directly heated by magnetic induction. The cradle 210 comprises a base 211 with feet 212 for supporting the base on a work surface, and a top 213 that in use supports a cooking vessel. The top 213 may be made of a suitable non-ferromagnetic material such as glass or ceramic. Extending upwardly from adjacent sides of the base 211, and orthogonally to the base 211, are first and second side members 214, 215. The second side member 215 extend from a second side of the base 211 opposite the first side member 214 such that the first and second side members 214, 215 define between them an induction cooking space 216 above the base 211. Positioning members 219 in the form of posts extending inwardly from respective side members 214, 215 facilitate central location of a cooking vessel on the cook top 213 centrally between the side members 214, 215. The positioning members 219 are preferably but not essential features of the invention. In some embodiments the positioning members 219 may be optionally removable for use with some cooking vessels but not others, and/or the positioning members 219 may be adjustable in length and or position to accommodate different types of cooking vessel.

A first induction coil 230 is provided with the base member for producing a first magnetic field having a first field direction orthogonal to the base 211. An alternating electric current is passed through the first coil 230 resulting in a first oscillating magnetic field that induces a magnetic flux in a cooking vessel supported on the top 213.

Figure 46:
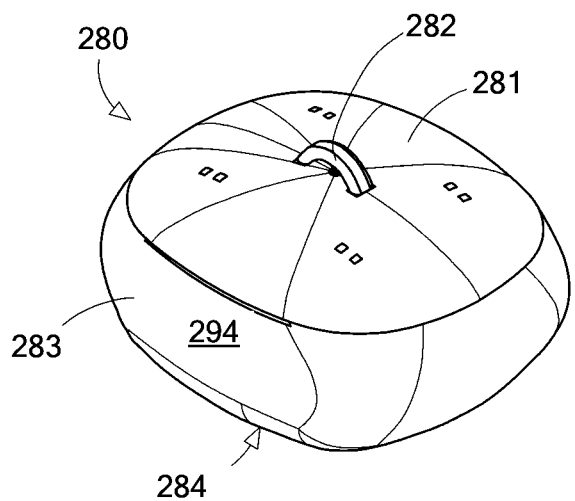
FIG. 46 is a perspective view of the cooking vessel of FIG. 45.
Figure 47:
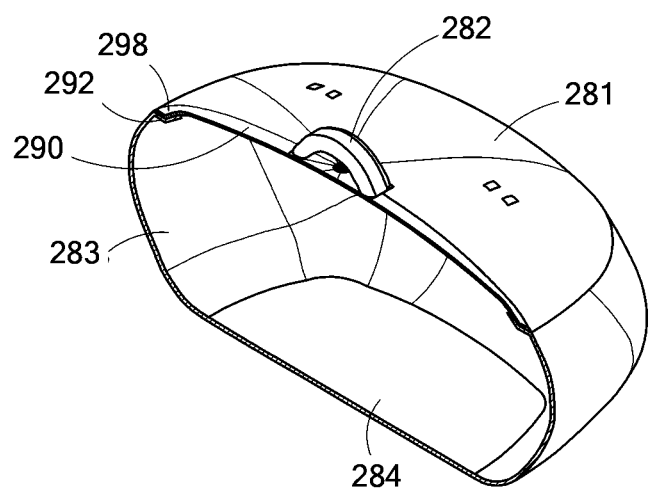
FIG. 47 is a section view through the cooking vessel of FIG. 46.
Figure 48:
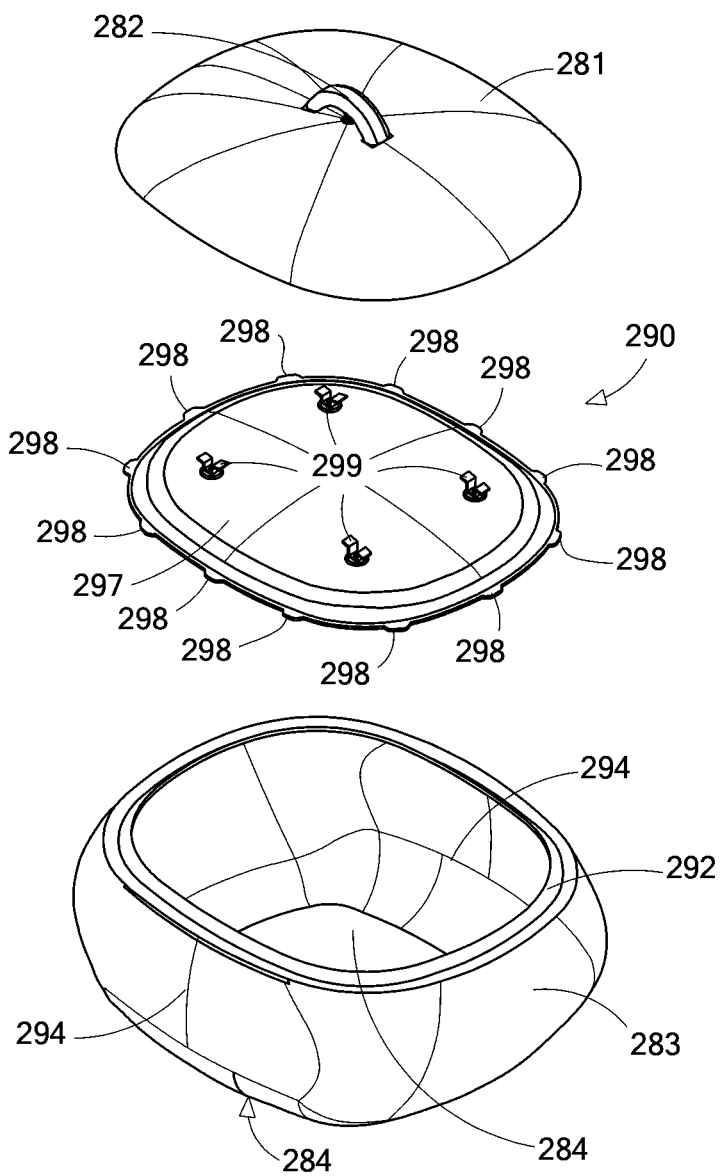
FIG. 48 is an exploded view of the cooking vessel of FIG. 46.

A second induction coil 231 is located in the first side member 214 and, upon passing an alternating electric current through the second coil 231, produces a second magnetic field having a second field direction parallel to the base 211. The second field direction is orthogonal to the first field direction. A third induction coil 232 is located in the second side member 215 and, upon passing an alternating electric current through the third coil 232, produces a third magnetic field having a third field direction parallel to the base 211. The third field direction is orthogonal to the first field direction. The third field direction is parallel and opposite to the second field direction. The second and third induction coils may be enclosed in coil enclosures 217, 218 of respective side members 214, 215. The coil enclosures 217, 218 may be made of a suitable non-ferromagnetic material with a surface such as glass or ceramic. When a cooking vessel such as the vessel described below with reference to FIGS. 46 to 48 is supported on the top 213 within the induction cooking space 216 it is subjected to the three magnetic fields, namely the first oscillating magnetic field, the second oscillating magnetic field and the third oscillating magnetic field.

Figure 54:
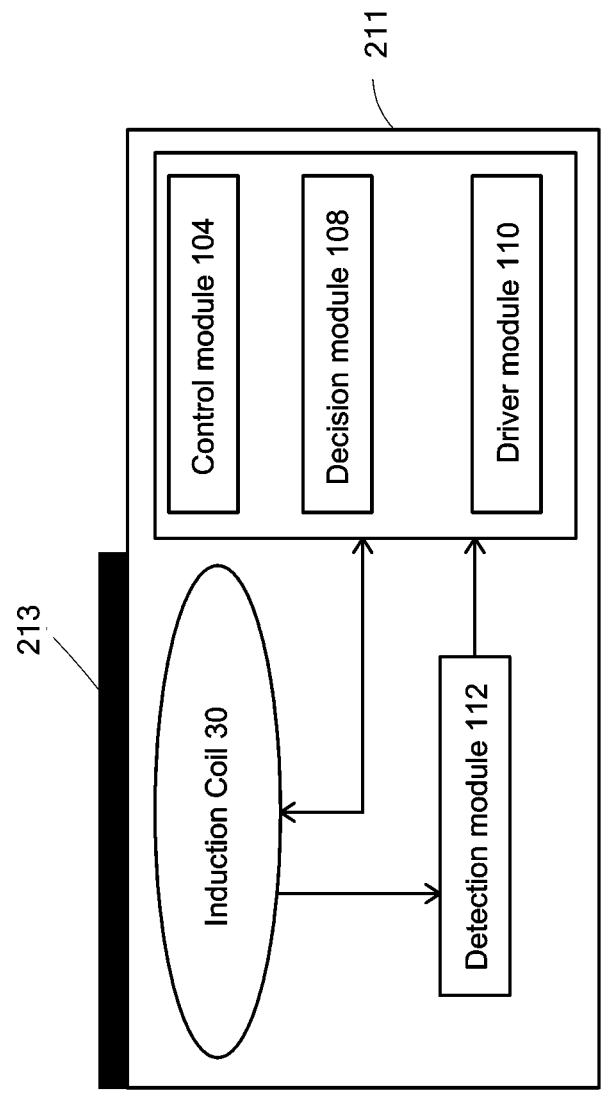
FIG. 54 is a block diagram showing control of an induction cradle.
Figure 55:
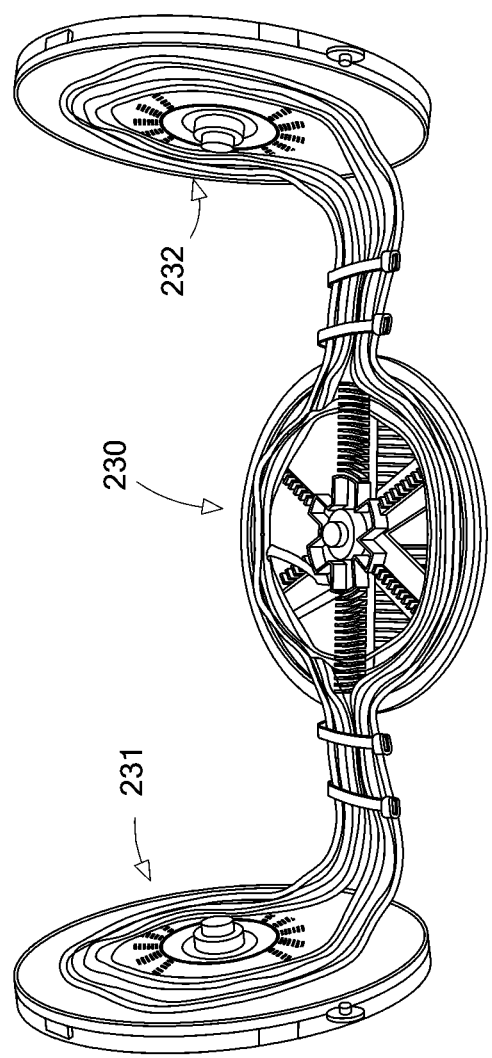
FIGS. 55 to 58 illustrate various coil arrangements.

FIG. 54 is a block diagram illustrating a control system for one of the induction coils 230. The control of second and third induction coils 231, 232 is the same. The induction coil 230 is arranged to convert electrical energy (i.e. an alternating electrical current) to magnetic energy (i.e. an oscillating magnetic field). Electrical energy is supplied to the induction cradle 210 via a power cord 221 which has a standard domestic plug (not shown) at its distal end for connection with a domestic alternating current (AC) power supply. In some enforcements the induction cradle may alternatively be supplied with electrical energy from a portable direct current (DC) source such as an external automotive or other battery, or an internal rechargeable battery. A control module 104 is arranged to control the conversion of the electrical energy by the coil 230. The control module 104 is further arranged to protect the coil and/or the control module 104 from being damaged by an additional energy supplied to the coil, by for example an additional electromotive force (emf) induced in the first coil by a proximate or adjacent varying magnetic fields of adjacent coils 231, 232.

The control module 104 may comprise various components arranged to convert an input power delivered to the induction cradle 210 to an electrical energy in a suitable form so as to precisely control the output of the induction coil 230, and hence control the temperature and/or the heating pattern of a cooking vessel. For example, the control module 104 may comprise a converter arranged to convert the input power to an alternating current which may be further fed to the induction coil 230 such that a repeatedly varying magnetic flux will be generated. The control module 104 may also include a microcontroller or a microprocessor for controlling the different electrical/electronic components of the cradle 210 to operate appropriately as desired. In addition, the control module 104 may include or connect to different sensors and/or detectors so as to monitor the operations and/or the conditions of the cradle 210 or cooking vessel, and to protect the cradle from various improper operations such as improper power supply, improper cookware, and other improper working condition such as overheating and high humidity. Preferably, the control module 104 may further comprise a decision module 108 for use in a protection mechanism. The control module may also comprise a driver module 110 arranged to drive the induction coil 230. In addition, a detection module 112 connected to both the induction coil 230 and the control module 104. A control interface 222 is provided on one of the side member 214, 215 for receiving user inputs via input controls 223, 224 to control conversion of electrical energy to magnetic energy. The input controls 223, 224 are mounted to a printed circuit board (PCB) 226 with the control interface 222 and in the side member. In some embodiments one or more input controls may be provided. Inputs controls may include controls for one or more of on/off, cooking (e.g. energy conversion) power, cooking mode (such as use of one or more induction coils 230, 231, 232), cooking time or cooking programs. A digital or other display 225 is provided on the control interface 222 for indicating one or more control or cooking parameters to the user. The control module 104, decision module 108 and a driver module 110 for each induction coil may also be mounted with the PCB 226.

Figure 45:
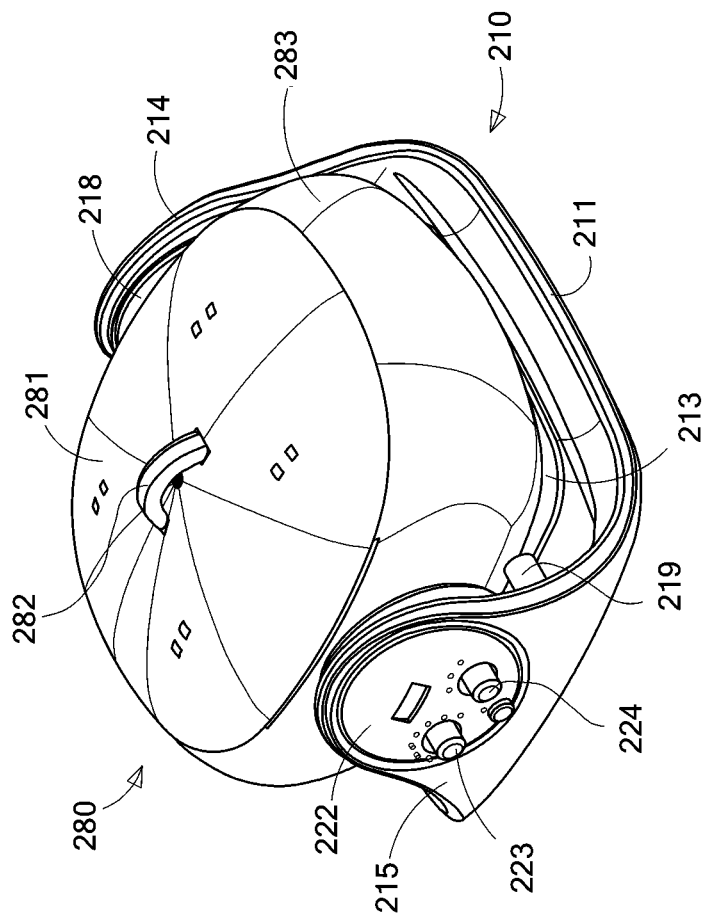
FIG. 45 is the induction cradle of FIG. 39 in combination with a cooking vessel.

FIG. 45 illustrates an induction cooker comprising the induction cradle 210 in combination with a cooking vessel 280 made of, or containing, a ferromagnetic metal such as cast iron or stainless steel. The vessel 280 comprises a base portion 283 and a lid portion 281 with a handle 282. The base portion 283 of the vessel 280 includes a ferromagnetic metal base portion 284 which rests on the top 213 and is heated by the first induction coil 230. FIGS. 46 to 48 illustrate one embodiment of a cooking vessel 280 according to the invention. In order to facilitate more even heating and cooking for food items in the vessel the lid portion 281 of the vessel is provided with a ferromagnetic metal lid portion 290 which is indirectly heated by convection from the vessel base portion 283. Diametrically opposite portions of the side walls 294 of the vessel base portion 283 are made of, or contain, a ferromagnetic metal such as cast iron or stainless steel such that the side walls are directly heated by the second and third induction coils 231, 232 in the side members 214, 215 of the cooking cradle 210. The upper circumferential lip of the vessel base portion 283 is provided with a heat transfer flange 292 made from a thermally conductive and also preferably ferromagnetic metal which is heated both directly by the second and third induction coils 231, 232 and indirectly via convention from the diametrically opposite portions of the side walls 294. The ferromagnetic metal lid portion 290 comprises a plate 297 shaped to follow the profile of the lid portion 281. Securing tabs 299 secure the ferromagnetic metal lid portion 290 within the underside of the lid portion 281. Extending from the peripheral edge the plate 297 are a plurality of radially extending and circumferentially spaced heat transfer tabs 298. When the lid portion 281 is located on the vessel base portion 283 the heat transfer tabs 298 are in thermally conductive contact with the heat transfer flange 292 of the base portion 283 to transfer heating to the lid portion 290 by convection heating. It is to be understood that the ferromagnetic metal lid portion 290 may also be heated directly by one or more of the oscillating magnetic fields as well as receiving conduction heating from the heat transfer flange 292. The vessel 280 is heated in its ferromagnetic metal base portion 284, sidewalls and lid portion 281, 290 by the oscillating magnetic fields and by convention to surround the food items(s) in the vessel 280 by heated portions of the vessel which heat the from items from top and sides by radiant heat transfer as well as convective heat transfer. Cooking with radiant heat transfer from the sides and the top provides an overall browning effect on meat items (such as fish, poultry and red meat for example) as well and more even internal cooking of all food items.

Figure 49:
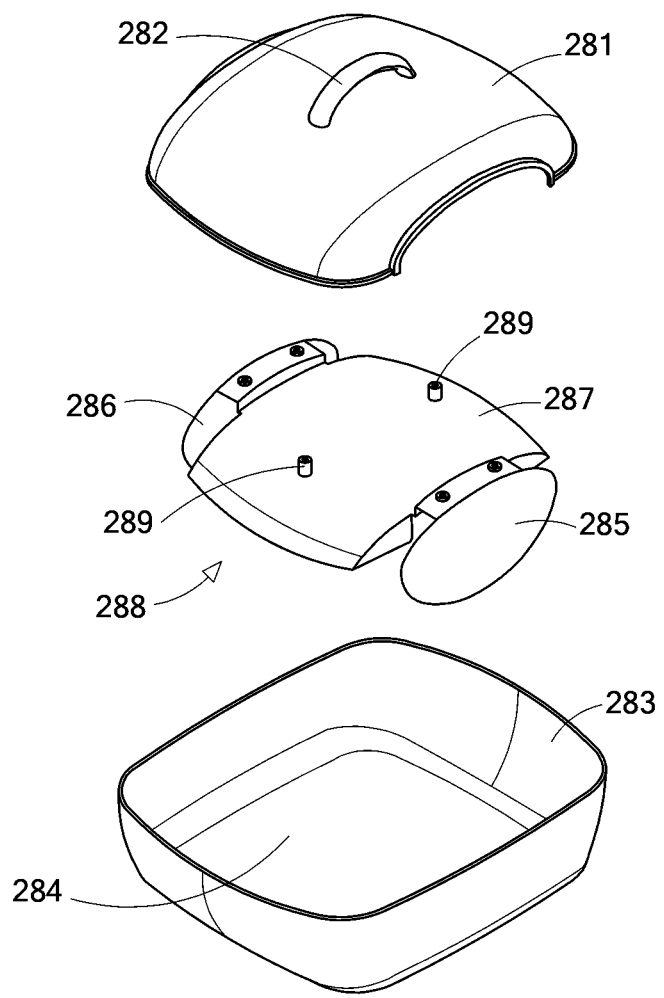
FIG. 49 is an exploded view of another embodiment of a cooking vessel.

FIG. 49 is an exploded view of another embodiment of a cooking vessel according to the invention. The cooking vessel 280 is made of, or contains, a ferromagnetic metal such as cast iron or stainless steel. The vessel 280 comprises a base portion 283 and a lid portion 281 with a handle 282. The base portion 283 of the vessel 280 includes a ferromagnetic metal base portion 284 which rests on the top 213 and is heated by the first induction coil 230. In order to facilitate more even heating and cooking for food items in the vessel the lid portion 281 of the vessel is provided with a ferromagnetic metal lid portion 288 which is directly heated by the second and third induction coils 231, 232 in the side members 214, 215 of the cooking cradle 210. The ferromagnetic metal lid portion 288 comprises a plate 287 shaped to follow the profile of the lid portion 281. A pair of securing studs 289 accommodates bolts to secure the ferromagnetic metal lid portion 288 within the underside of the lid portion 281. A pair of ferromagnetic metal orthogonal side wings 285, 286 are arranged in use to be positioned immediately in from respective second and third induction coils 231, 232 in the side members 214, 215 of the cooking cradle 210. The wings preferably extend outside of the base portion 283 when the lid portion 281 is in place and are directly heated by the second and third induction coils 231, 232. The wings 285, 286 are in thermally conductive contact with the ferromagnetic metal lid portion 288 to transfer heat to the lid portion 288 by convection heating. It is to be understood that the ferromagnetic metal lid portion 288 may also be heated directly by one or more of the oscillating magnetic fields as well as receiving conduction heating from the orthogonal side wings 285, 286.

Figure 50:
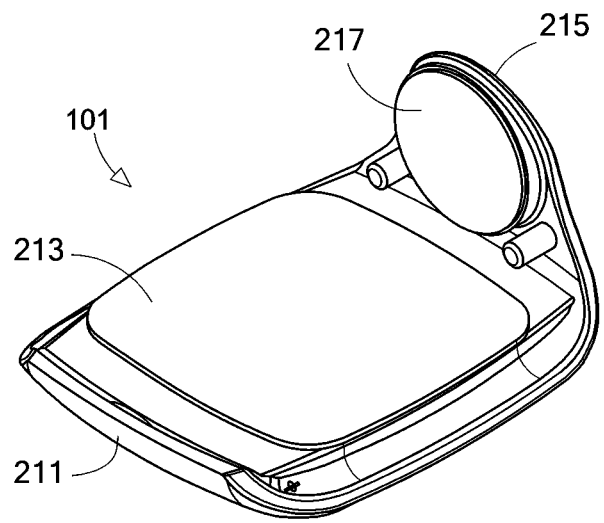
FIG. 50 is a perspective view of an induction cradle.
Figure 51:
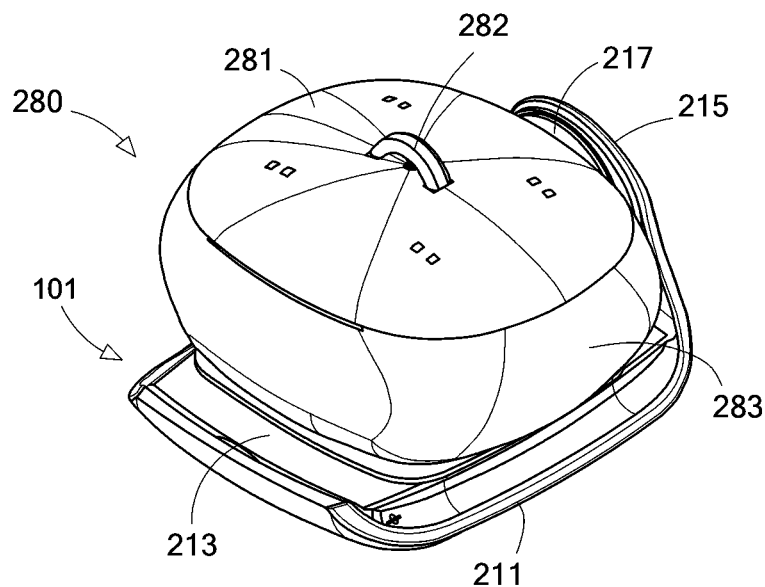
FIG. 51 is the induction cradle of FIG. 50 in combination with a cooking vessel.
Figure 52:
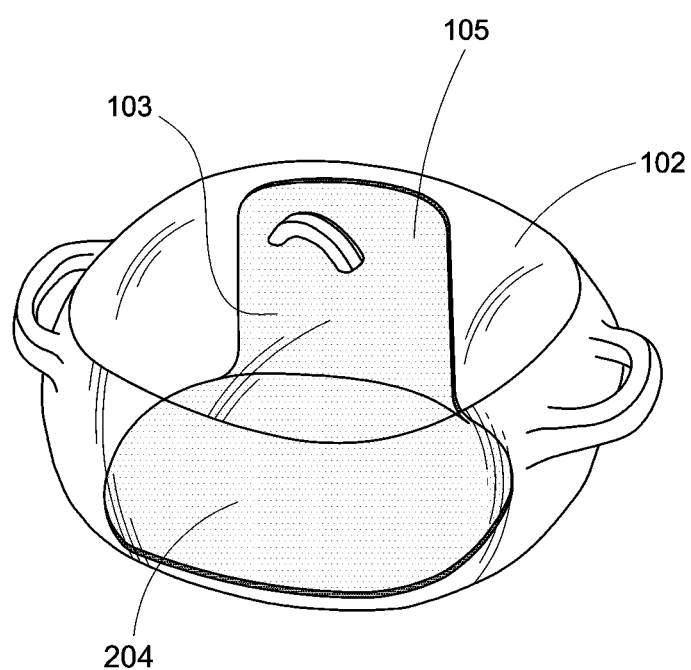
FIG. 52 is a perspective view of a cooking vessel.

FIGS. 50 and 51 illustrate an embodiment of an induction cooking cradle 101 according to the invention, which is substantially the same as the embodiments described above, but which has only a second induction coil located in the single side member, thus relying to a greater extent on convective heat transfer round the rides of the vessel base to heat all sides. Such an embodiment is simpler and cheaper to manufacture and provides many of the convective and radiant heating benefits in the upper and top of the cooking vessel provide by both second and third induction coils 231, 232 of the induction cradle of FIG. 39. FIG. 52 illustrates yet a further embodiment of a cooking vessel for use with the invention. In such an embodiment a non-ferromagnetic metal vessel, such as a glass or ceramic vessel 102 is provided with a removable ferromagnetic metal cooking plate 103 which positions in the vessel to be heated by the associating magnetic fields. The ferromagnetic metal cooking plate 103 comprises a base portion 204 and a side portion 105 extending substantially orthogonal to the base portion 204. When located within the non-ferromagnetic metal vessel 102 the base portion is heated by the base induction coil and the side portion is heated by the second induction coil. Such an embodiment of the vessel in combination with the ferromagnetic metal cooking plate 103 is simpler and cheaper to manufacture and provides many of the convective and radiant heating benefits in the upper and top of the cooking vessel provide by both second and third induction coils 231, 232 of the induction cradle of FIG. 39. The ferromagnetic metal cooking plate 103 can be sold or provided for use in conventional non-ferromagnetic metal vessel so that such vessels may be used with an induction cooking cradle of the invention. For example a metal cooking plate 103 can be provided with an induction cradle so that users can use their current non-ferromagnetic cookware with the induction cradle.

Figure 53:
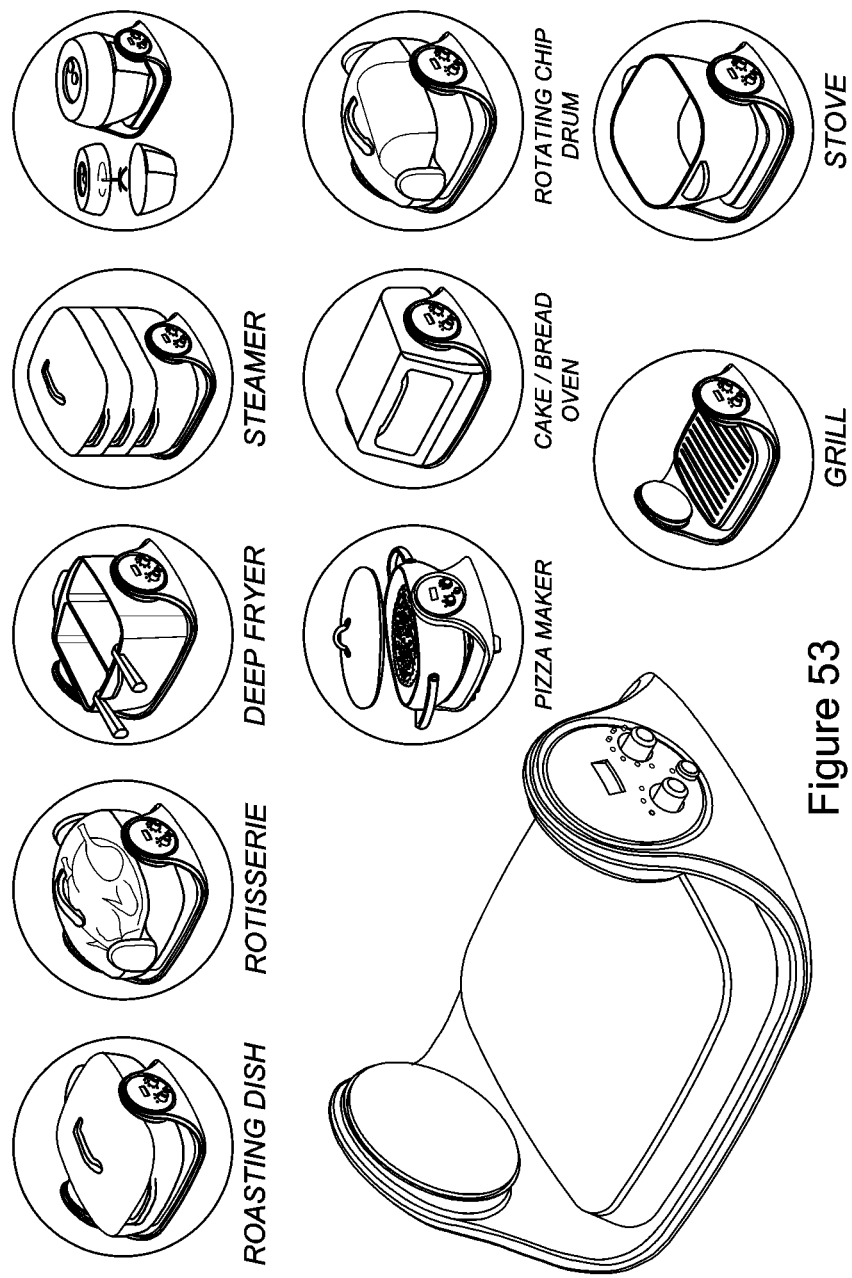
FIG. 53 is an illustration of various cooking vessels for use with an induction cradle.

Although preferred embodiments of a cooking vessel have been described, as illustrated in FIG. 53, the cooking vessel may be one of a roasting dish, a rotisserie, a deep fryer, a steamer, a soup maker, a pizza maker, an oven, a roasting drum, a grill or a pot. The cooking vessels of the invention do not have any electrical components and thus are easily cleaned by submersion in water or a dishwasher. Further, a combination of the induction cradle 210 and two or more of such cooking vessels provides a useful and versatile induction cooking system. The second and third induction coils in combination with a cooking vessel having upper ferromagnetic metal heating portions provides more even heating within the cooking vessel resulting in more even cooking and browning of food items. Such an arrangement of the invention may also be used to provide an oil-less deep fryer cooking chamber.

Figure 56:
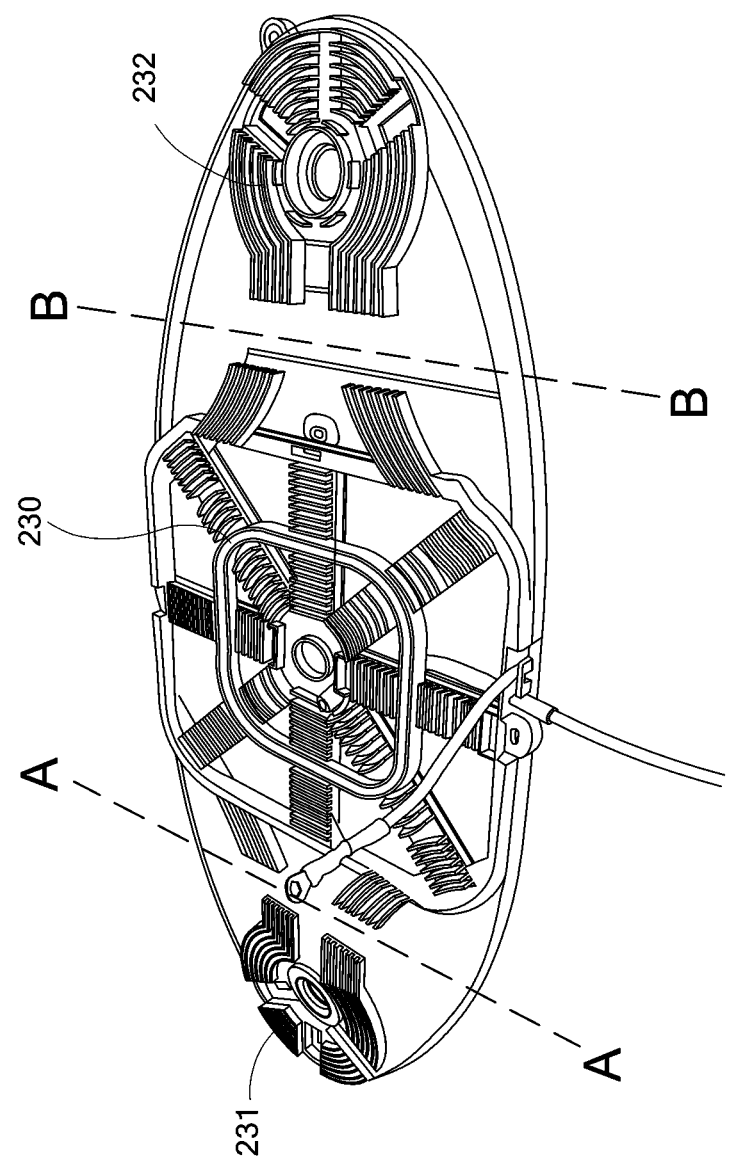
Figure 57:
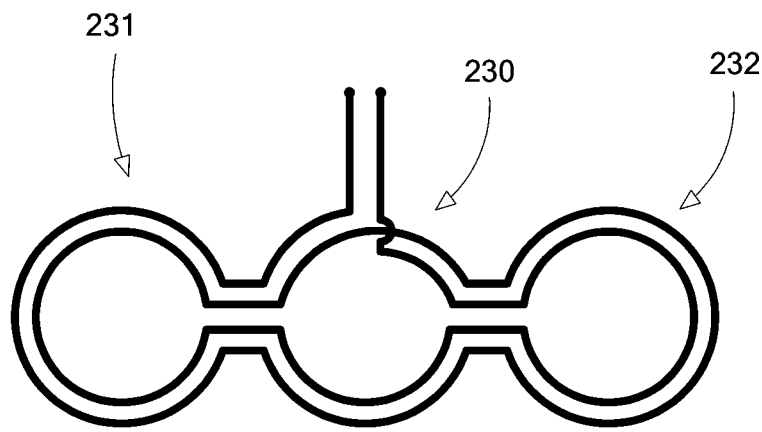
Figure 58:
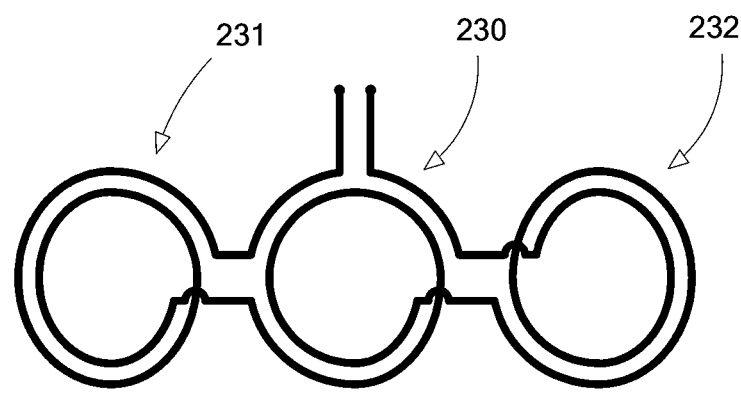

In the above described embodiments each coil 230, 231, 232 is individual and has its own control module 104, decision module 108 and a driver module 110 mounted on a common or separate PCBs. In one embodiment of an induction cradle according to the invention all coils are wound in series so as to be operable from a single control module 104, decision module 108 and a driver module 110 set. FIGS. 55 through 58 illustrate the coil arrangement for such an embodiment. All three (or two as the case may be) induction coils 230, 231 and 232 are wound as a single series electrical circuit. FIGS. 57 and 58 illustrate alternative winding arrangements for series coils. Only two turns are shown for each coil for clarity. In the winding arrangement of FIG. 57 each turn of the three coils is would consecutively with a turn of an adjacent coil. That is to say, a turn is wound on the first coil 230, a turn is wound on the second coil 231 and a turn is wound on third coil 232, then a second turn is wound on each of the first, second and third coils etc. In the winding arrangement of FIG. 58 each turn on each coil is wound consecutively and then the three coils are connected in series. By winding the three coils in series using either winding arrangement only a single control module 104, decision module 108 and a driver module 110 set is needed, which represents a significant cost saving in design. Although all coils operate at the same current all the time, if there is no ferromagnetic metal cooking plate in proximity of any one coil, that coils acts merely as a conductor not contributing to the induction cooking effort. FIG. 56 illustrates a method of winding all three coils in series. A coils former is provided in a plat plan which can be easily wound by hand of an automated winding machine. After winding the wings of the former can be folded or bend through 90-degrees about reference lines A-A and B-B for example such that at least two coils having orthogonal to the field directions.

Figure 59:
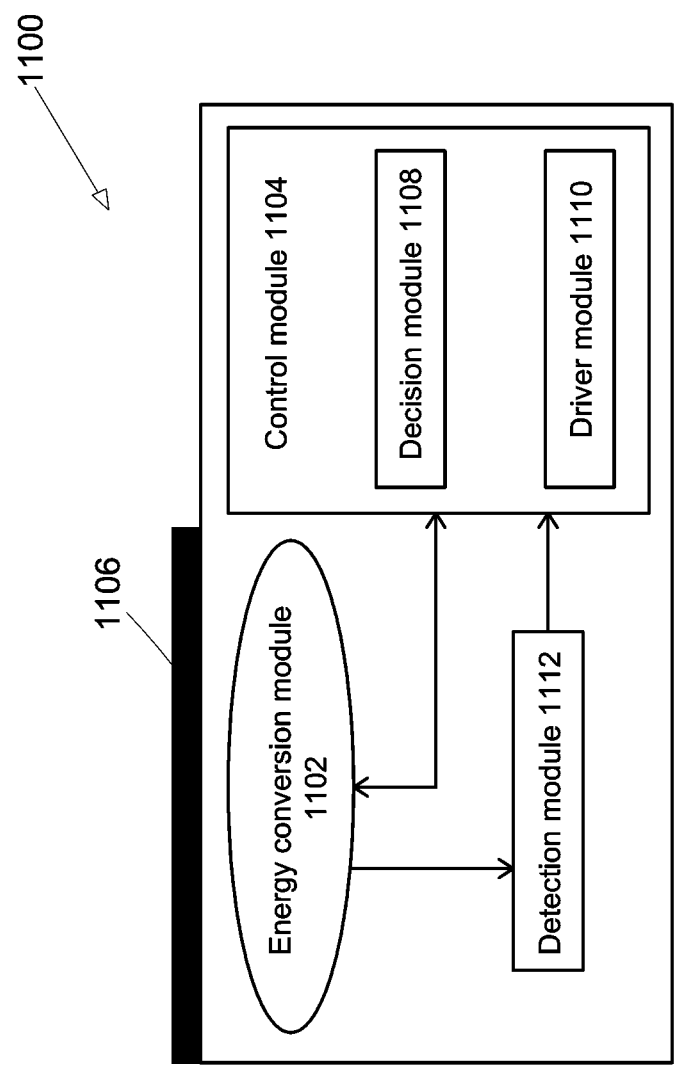
FIG. 59 is a block diagram showing an electrical heating apparatus.

Referring now to FIGS. 59 to 65, in FIG. 59, there is illustrated an electrical heating apparatus 1100 comprising an energy conversion module (e.g. a coil) 1102 arranged to convert electrical energy to magnetic energy; and a control module 1104 arranged to control the conversion of the electrical energy by the energy conversion module 1102. The control module 1104 is further arranged to protect the energy conversion module 1102 and/or the control module 1104 from being damaged by an additional energy supplied to the energy conversion module 1102, by for example an additional electromotive force (emf) induced in the energy conversion module 1102 by a proximate or adjacent varying magnetic field.

In this embodiment, the electrical heating apparatus 1100 is an induction heater, and the energy conversion module 1102 comprises a metal coil arranged to convert electrical energy to a magnetic flux. As appreciated by a person skilled in the art, when a changing or varying electrical current passes thru a metal coil or a winding, a magnetic flux is generated.

The magnetic flux may then be transmitted (coupled) to a metallic component 1106 such as a ferrous plate or cookware, inducing an electric current in the metallic component 1106 causing the metallic component 1106 to heat up. Preferably, the metallic component 1106 consists of a ferromagnetic metal such as cast iron or stainless steel, and is arranged to repeatedly produce eddy currents within the metallic component 1106 in response to a repeatedly varying magnetic flux generated by the adjacent metal coil 1102. Due to the electrical resistance of the ferromagnetic metal, the metallic component 1106 is heated by joule heating.

The control module 1104 may comprise various components arranged to convert an input power delivered to the induction heater 1100 to an electrical energy in a suitable form so as to precisely control the output of the energy conversion module 1102, and hence control the temperature and/or the heating pattern of the induction heater 1100. For example, the control module 1104 may comprise a converter arranged to convert the input power to an alternating current which may be further fed to the metal coil 1102 such that a repeatedly varying magnetic flux will be generated. The control module 1104 may also include a microcontroller or a microprocessor for controlling the different electrical/electronic components of the induction heater 1100 so that the heater 1100 may operate appropriately as desired. In addition, the control module 1104 may include or connect to different sensors and/or detectors so as to monitor the operations and/or the conditions of the heater 1100, and to protect the heater 1100 from various improper operations such as improper power supply, improper cookware, and other improper working condition such as overheating and high humidity.

Preferably, the control module 1104 may further comprise a decision module 1108 for use in a protection mechanism. The control module may also comprise a driver module 1110 arranged to drive the metal coil 1102. In addition, a detection module 1112 connected to both the metal coil 1102 and the control module 1104. These modules will be further described in detail in the later parts of this disclosure.

Figure 60:
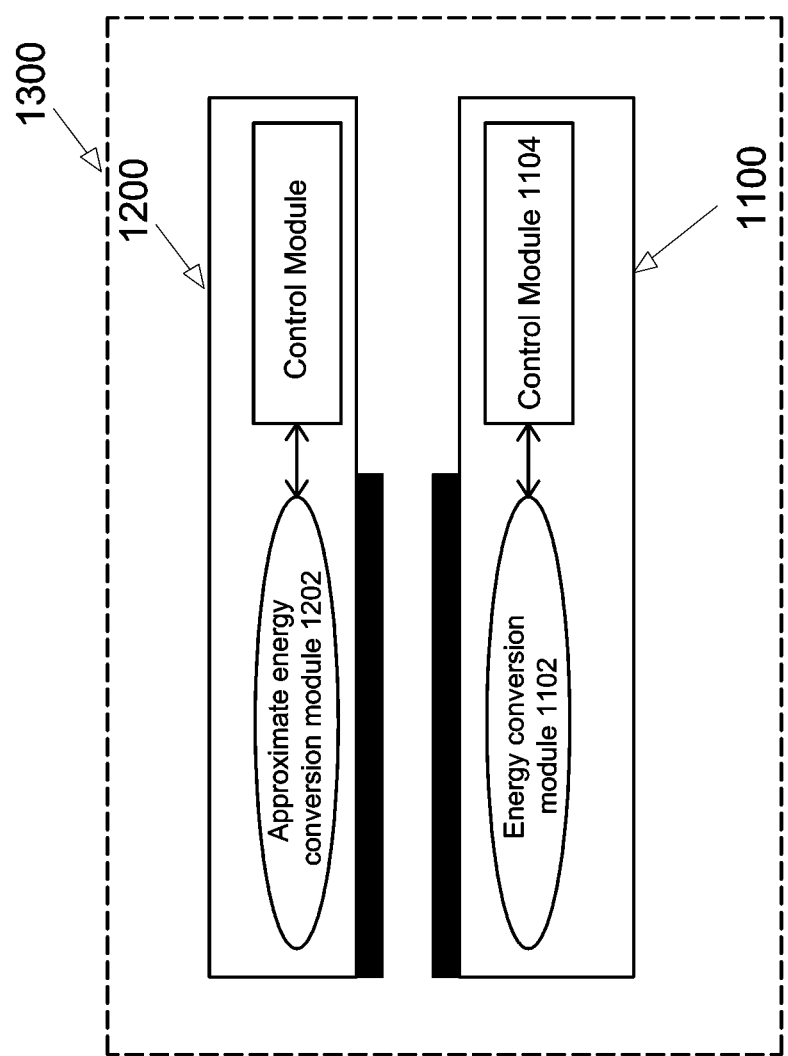
FIG. 60 is an illustration showing two adjacent electrical heating apparatuses of FIG. 59.

With reference to FIG. 60, there is shown an embodiment of an electrical heating apparatus 1100 placed approximate or adjacent to another electrical heating apparatus 1200. In this embodiment, the energy conversion module 1102 of the first induction heater 1100 is near an approximate energy conversion module 1202 of the second induction heater 1200. Such an arrangement is used, for example, in a contact grill where food items are located between upper and lower grill platens (grill plates) and in contact with both the upper and lower grill platens for cooking both sides of the food simultaneously. In this case, the magnetic flux generated by the proximate second energy conversion module 1202 of the operating second induction heater 1200 may induced an emf in the first energy conversion module 1102 of the first induction heater 1100 and visa-versa. Such induced additional emf in the energy conversion module 1102, 1202 contributes an additional voltage and/or an additional current supplied to the energy conversion modules 1102, 1202.

If the first induction heater 1100 is also operating at the same time, such additional energy supplied by the proximate energy conversion module 1202 to the energy conversion module 1102 will superimpose to the original energy generated by the first energy conversion module 1102 in which the total amount of energy may exceed the rated limit of the first energy conversion module 1102. For example, the voltage across the energy conversion module 1102 and/or the connected first control module 1104 is unexpectedly high, or the current passing through the first energy conversion module 1102 and/or the connected control module 1104 may exceed the working limit of the modules, and may cause damages to the energy conversion module 1102 and/or the control module 1104.

With reference to FIGS. 61 to 64, there is shown two possible embodiments of the electrical heating apparatus 1100 in accordance with an embodiment of the present invention, however the invention is not limited to such embodiments and other embodiments will be or become apparent to the skilled person from the description. Referring to the drawings, the control module 1104 is arranged to prevent a voltage and/or a current exceeding a rated limit of the control module 1104 and/or the energy conversion module 1102 from being supplied to the control module 1104 and/or the energy conversion module 1102. Preferably, the electrical heating apparatus 1100 fur comprises a detection module 1112 arranged to detect a voltage and/or a current supplied to the energy conversion module 1102.

Figure 61:
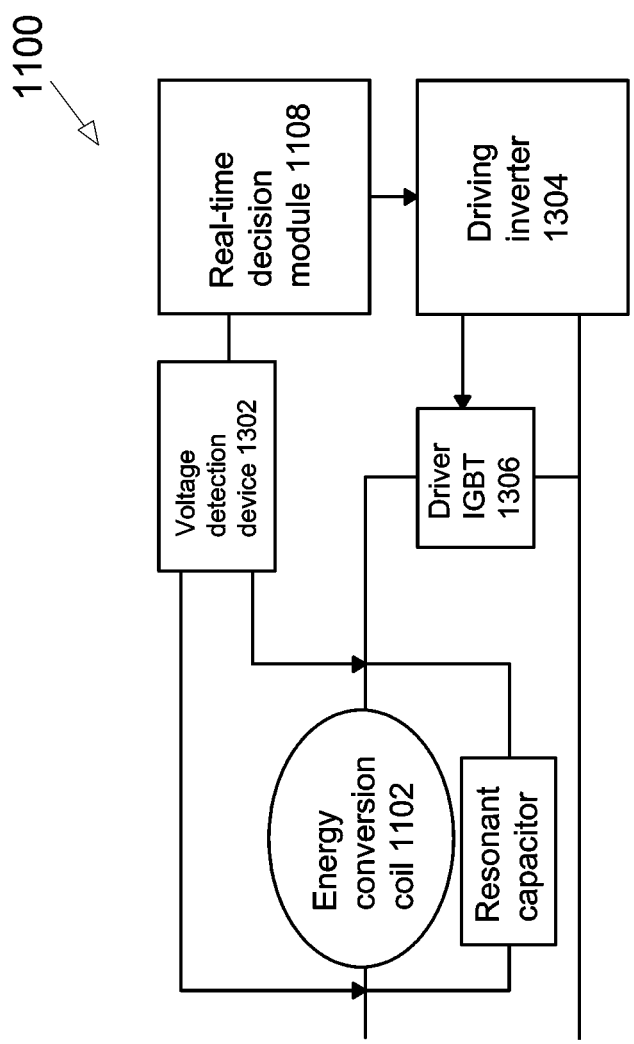
FIG. 61 is a block diagram showing a first configuration of the electrical heating apparatus of FIG. 59.
Figure 62:
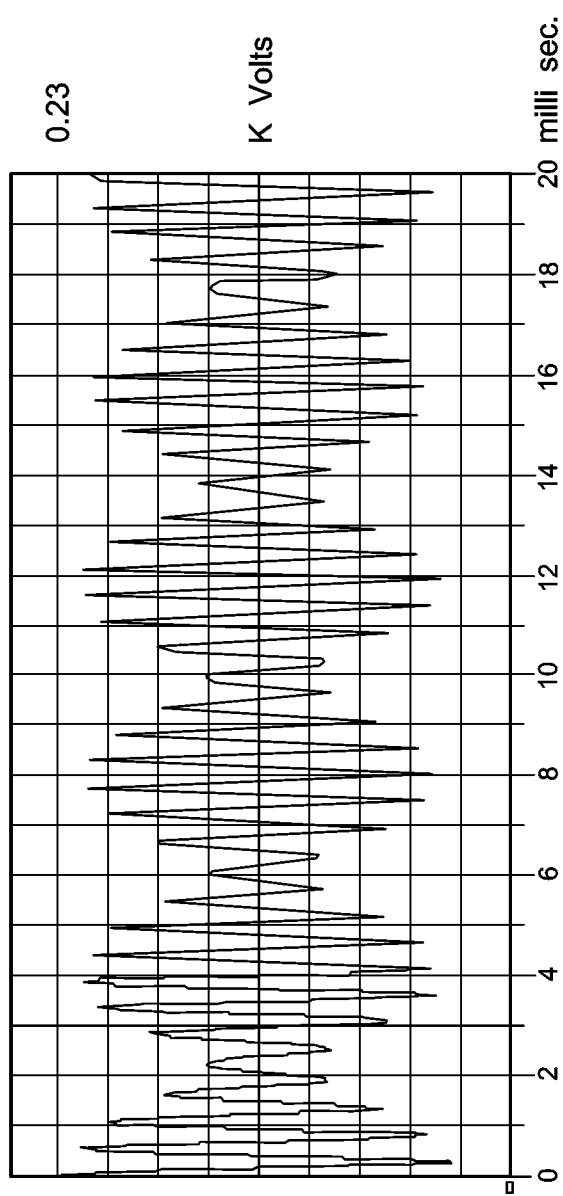
FIG. 62 is a plot showing a waveform of a voltage signal across the energy conversion module of the electrical heating apparatus of FIG. 61 influenced by an adjacent magnetic flux.

Referring to FIG. 61, the detection module 1112 comprises a voltage detection device 1302, and the voltage detection device 1302 is coupled across the energy conversion module or the energy conversion coil 1102 such that the voltage across the energy conversion coil 1102 may be detected by the voltage detection device 1302. In addition, the control module 1104 further comprises a decision module 1108 connected to the voltage detection device 1302. The decision module 1108 may process the real-time voltage value provided by the voltage detection device 1302, and accordingly controls the conversion of the electrical energy to heat by the energy conversion module 1102 based on the detection of the supplied voltage. For example, upon a detection of a voltage supplied the energy conversion module 1102 exceeding a predetermined limit, the control module 1104 may utilize the decision module 1108, and may be arranged to shut down or suspend the driver module 1110 (which may include the driving inverter 1304 and the IGBT driver 1306) arranged to drive the energy conversion module 1102, and hence the conversion of the electrical energy by the energy conversion module 1102 is suspended. It is shown in FIG. 62 an example waveform of the voltage level across the energy conversion coil 1102 measured by the voltage detection device 1302.

Figure 63:
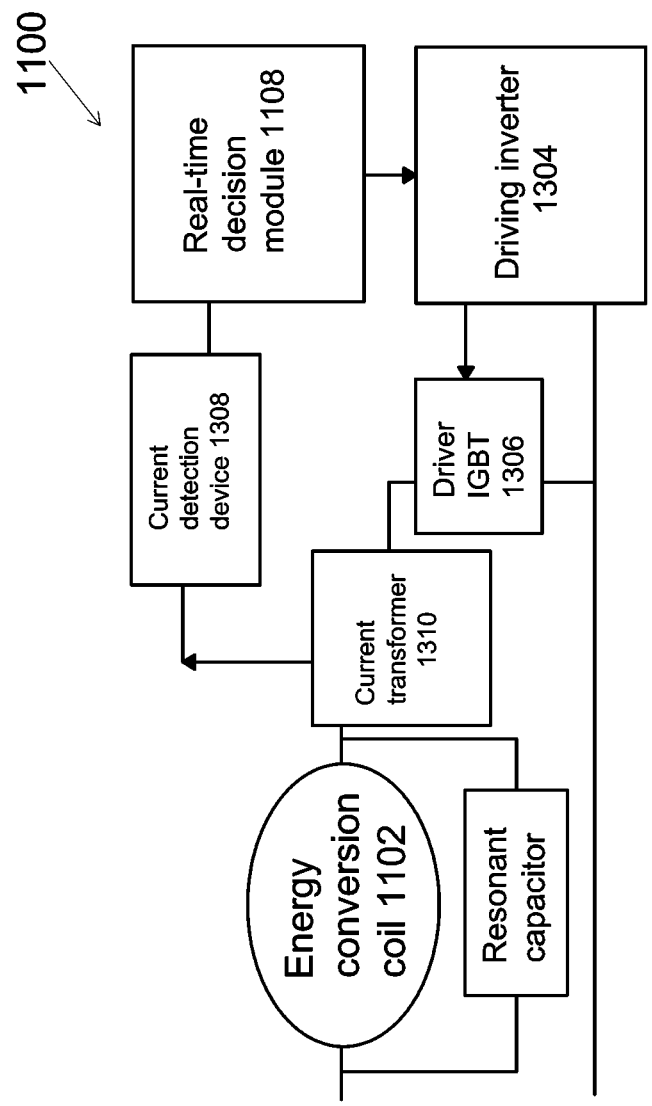
FIG. 63 is a block diagram showing a second configuration of the electrical heating apparatus of FIG. 59.

Referring to FIG. 63, alternatively or additionally, the detection module 1112 comprises a current detection device 1308, and the current detection device 1308 is arranged to detect the current passing thru the energy conversion module 1102. In one example embodiment as shown in FIGS. 59 to 65, the current detection device 1308 is coupled to a current transformer 3110 such that the current measured by the current detection device 1308 represents an actual real-time current signal passing through the energy conversion module 1102 associated with a predetermined ratio. Alternatively, the current detection mechanism may be implemented in any other configuration as known by a person skilled in the art.

Figure 64:
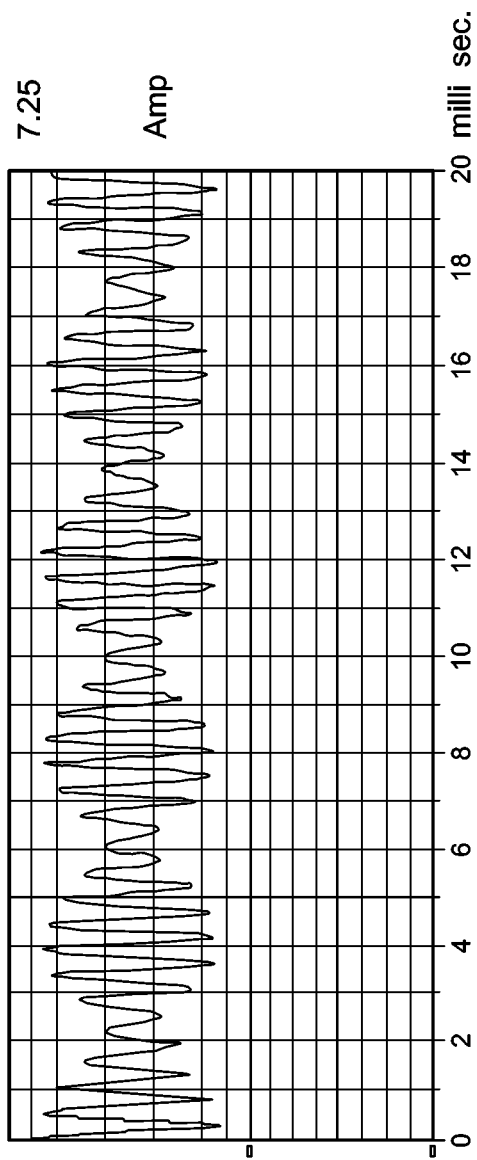
FIG. 64 is a plot showing a waveform of a current signal through the energy conversion module of the electrical heating apparatus of FIG. 63 influenced by an adjacent magnetic flux.

Similarly, the control module 1104 further comprises a decision module 1108 connected to the current detection device 1308. The decision module 1108 may process the real-time current value provided by the current detection device 1308, and accordingly controls the conversion of the electrical energy to heat by the energy conversion module 1102 based on the detection of the supplied current. For example, whereupon a detection of a current supplied the energy conversion module 1102 exceeding a predetermined limit, the control module 1104 may utilize the decision module 1108, and may be arranged to shut down or suspend the driver module 1110 (which may include the driving inverter 1304 and the IGBT driver 1306) arranged to drive the energy conversion module 1102, and hence the conversion of the electrical energy by the energy conversion module 1102 is suspended. It is shown in FIG. 64 an example waveform of the current level across the energy conversion coil 1102 measured by the current detection device 1308.

Alternatively, the control module 1104 may be arranged to employ a tactic to attempt to drive the energy conversion module 1102 at a time of no superimposition of the additional energy is detected.

In the above examples, the predetermined limit may be a safe or maximum operating limit of the voltage and/or current supplied to the energy conversion module 1102 or the metal coil. Alternatively, the predetermined limit may represent a normal operation parameter of the electrical heating apparatus 1100, such as a rated operating voltage and/or current supplied to the energy conversion module 1102. In addition, since the components of the control module 1104 also includes a safe or maximum operating limit, by suspending the driver module 1110 and hence the energy conversion module 1102, both the energy conversion module 1102 as well as the connected control module 1104 may be protected from being damaged by the additional energy induced by the energy conversion module 1102.

Besides detecting a voltage value or a current value exceeding a predetermined value, the detection module 1112 may be arranged to detect an existence of an additional magnetic flux. The detection is based on the measured waveform obtained from the voltage and/or the current detection device. In general, it is unlikely that two magnetic fluxes generated by two induction heater will include an identical working frequency and phase, and a beat frequency condition (as shown in the waveforms in FIGS. 62 and 64) occurs when two electrical signals with different frequency and phase superimpose. Thus, a beat frequency condition in a measured voltage and/or current waveform indicates the existence of an additional magnetic flux. In addition, the intensity of the additional magnetic flux re represented by an amplitude of the beat frequency condition. The decision module 1108 may also be arranged to control the energy conversion module 1102 in response to the detection of the additional magnetic flux based on the measured beat frequency condition.

In one particular embodiment one or other of the first and/or second control modules may be arranged to vary the phase of the alternating voltage or current to the respective first or second energy conversion module thereby phase shifting the resultant magnetic flux so as to maintain the total of the control power plus induced emf/current of the adjacent energy conversion module within predetermined limits. That is to say, by controlling the phase of the supply signals and resultant magnetic flux of the respective energy conversion modules the effect of magnetic coupling between the two energy conversion modules can be ameliorated.

Figure 65:
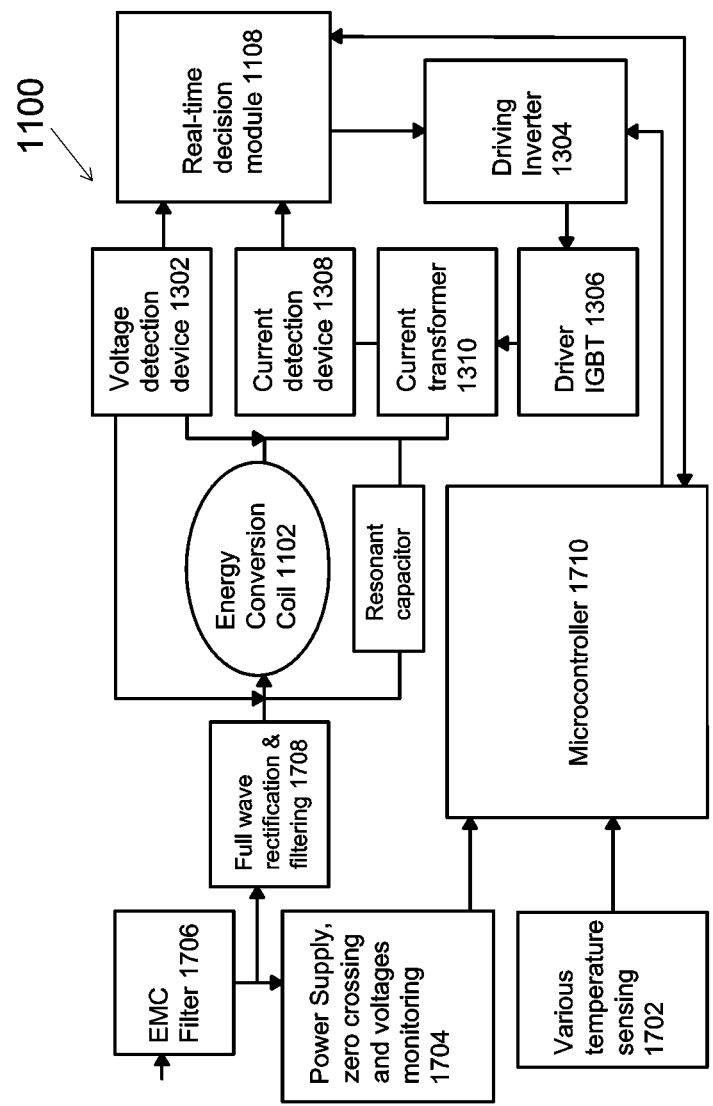
FIG. 65 is a block diagram showing a third configuration of the electrical heating apparatus of FIG. 59.

With reference to FIG. 65, there is shown an alternative embodiment of an electrical heating apparatus 1100. In this embodiment, the electrical heating apparatus 1100 comprises a voltage detection device 1302 and a current detection device 1308 both coupled to the decision module 1108, such that the control module 1104 is arranged to control the energy conversion module 1102 based on both the measured voltage and current value obtained by the detection module 1112. In addition, the electrical heating apparatus 1100 comprises other essential components such as temperature sensors 1702, power supply monitors 1704, EMC filters 1706, rectifiers and filters 1708, and a microcontroller 1710. The microcontroller 1710 may be coupled to user operation panels and display for receiving user input and providing displayed information to the user. The microcontroller 1710 may be arranged to monitor and/or control the operation environment of the electrical heating apparatus. In addition, the microcontroller may be arranged to control the heating pattern based on different pre-set programs.

These embodiments are advantageous in that an energy conversion module such as an induction coil as well as the connected controller or drivers are well protected from additional or external magnetic flux supplied to the induction heater or the metal coil in the induction heater, such that multiple induction heating elements may be included in a single electrical heating apparatus. The manufacturers may not necessary to consider the alignment or misalignment of the different metal coils.

For example, in one embodiment as shown in FIG. 60, an electrical heating apparatus 1300 may comprise both an energy conversion module 1102 as well as the proximate energy conversion module 1202. Such electrical heating apparatus 1300 with dual induction heaters (1200 and 1100) at the top and the bottom may be employed to provide more flexible cooking technique.

Figure 66:
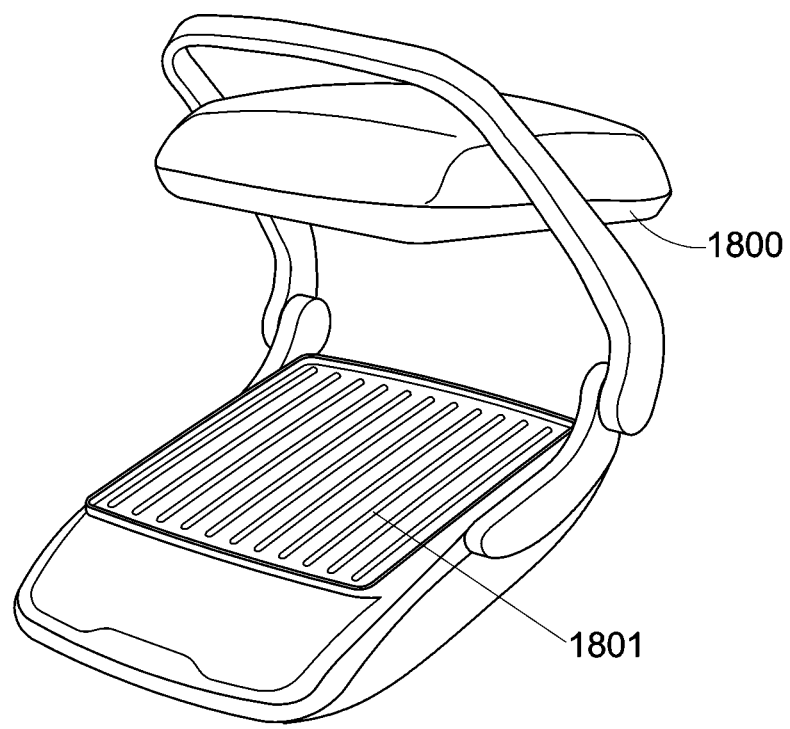
FIG. 66 illustrates a contact grill having upper and lower heated platens pivotally connected and adapted to, in use, be in contact with respective upper and lower sides of food being cooked.

FIG. 66 Illustrates a contact grill having upper and lower heated platens 1800 and 1801 pivotally connected and adapted to, in use, be in contact with respective upper and lower sides of food being cooked. The upper and lower heated platens are heated by induction heating means as herein described.

The invention claimed is:

1. A motorized induction device for mixing and heating a vessel, the motorized induction device comprising:
    a base member for supporting the vessel;
    a side member extending orthogonal to a side of the base member;
    a non-magnetic rotational spindle located in the base member;
    a driving member rotationally coupled to and driving the non-magnetic rotational spindle;
    a first induction coil located in the base member and extending around the non-magnetic rotational spindle for producing a first magnetic field having a first field direction, wherein the base member heats the vessel by magnetic induction;
    a second induction coil located in the side member for producing a second magnetic field having a second field direction orthogonal to the first field direction; and
    an adapter assembly adapted to engage a rotational shaft of the vessel and rotationally couple the non-magnetic rotational spindle and the rotational shaft of the vessel;
    wherein the first induction coil and the second induction coil are connected in series.

2. The motorized induction device of claim 1, wherein the driving member is spaced apart from the non-magnetic rotational spindle by at least 25 mm.

3. A system comprising:
   a vessel having at least a first ferromagnetic metal heating portion and a rotational shafted; and
   a motorized induction device of claim 1 for mixing and heating the vessel.

4. The system of claim 3, wherein the vessel further has a second ferromagnetic metal heating portion orthogonal to the first ferromagnetic metal heating portion.

5. The system of claim 3, wherein the vessel further includes a blade assembly.

6. The system of claim 3, wherein the vessel is selected from the group consisting of a blender vessel, a dough mixer vessel, a single cup, a chopper vessel, and a stirrer vessel.

7. The system of claim 3, wherein the vessel does not have any electrical components.

8. The system of claim 3, wherein the side member is adjacent to a side of the vessel when the vessel is supported by the base member.

9. The system of claim 3, wherein the vessel further includes a stirrer provided on the rotational shaft.

\* \* \* \* \*